(12) United States Patent  (10) Patent No.: US 9,147,239 B2
Pau et al.  (45) Date of Patent: Sep. 29, 2015

(54) COMPUTING THE MASS OF AN OBJECT

(71) Applicant: STMicroelectronics S.r.l., Agrate Brianza (IT)

(72) Inventors: Danilo Pietro Pau, Sesto San Giovanni (IT); Daniele Masala, Turin (IT); Xinfeng Bao, Eindhoven (NL)

(73) Assignee: STMicroelectronics S.r.l., Agrate Brianza (IT)

( * ) Notice: Subject to any disclaimer, the term of this patent is extended or adjusted under 35 U.S.C. 154(b) by 203 days.

(21) Appl. No.: 13/727,483

(22) Filed: Dec. 26, 2012

(65) Prior Publication Data

US 2013/0163836 A1    Jun. 27, 2013

Related U.S. Application Data

(60) Provisional application No. 61/630,989, filed on Dec. 23, 2011.

(51) Int. Cl.
*G06K 9/00* (2006.01)
*G06T 7/00* (2006.01)
*G06T 7/60* (2006.01)
*G06T 17/00* (2006.01)

(52) U.S. Cl.
CPC ............. *G06T 7/00* (2013.01); *G06T 7/0012* (2013.01); *G06T 7/602* (2013.01); *G06T 17/00* (2013.01); *G06T 2207/10072* (2013.01); *G06T 2207/30016* (2013.01); *G06T 2210/21* (2013.01); *G06T 2210/41* (2013.01)

(58) Field of Classification Search
None
See application file for complete search history.

(56) References Cited

U.S. PATENT DOCUMENTS

| | | | | |
|---|---|---|---|---|
| 4,905,148 A | * | 2/1990 | Crawford | 382/131 |
| 5,900,880 A | * | 5/1999 | Cline et al. | 345/423 |
| 7,724,254 B1 | * | 5/2010 | Lorach | 345/424 |
| 2006/0280351 A1 | * | 12/2006 | Luping et al. | 382/128 |
| 2008/0118133 A1 | * | 5/2008 | Sirohey et al. | 382/131 |
| 2008/0123927 A1 | * | 5/2008 | Miga et al. | 382/131 |
| 2009/0074272 A1 | * | 3/2009 | Lu et al. | 382/128 |
| 2011/0229002 A1 | * | 9/2011 | Arnold et al. | 382/131 |
| 2012/0219200 A1 | * | 8/2012 | Reeves et al. | 382/131 |

OTHER PUBLICATIONS

Sio, Chak Chi et al., "Volume Rendering with Marching Cube Algorithm," University of Southern California, date Feb. 11, 2011.*

(Continued)

*Primary Examiner* — Jon Chang
*Assistant Examiner* — Oneal R Mistry
(74) *Attorney, Agent, or Firm* — Seed IP Law Group PLLC

(57) ABSTRACT

The mass of an object may be estimated based on intersection points of a representation of a surface in an image space with cubes defining the image space, the surface representing a surface of an object. The representation may be, for example, based on marching cubes. The mass may be estimated by estimating a mass contribution of a first set of cubes contained entirely within the representation of the surface, estimating a mass contribution of a second set of cubes having intersection points with the representation of the surface, and summing the estimated mass contribution of the first set of cubes and the estimated mass contribution of the second set of cubes. The object may be segmented from other portions of an image prior to estimating the mass of the object.

28 Claims, 41 Drawing Sheets
(13 of 41 Drawing Sheet(s) Filed in Color)

(56) References Cited

OTHER PUBLICATIONS

Lewiner et al., "Efficient Implementation of Marching Cubes' Cases with Topological Guarantees," *Journal of Graphics Tools*, vol. 8(2), 2003, pp. 1-15.

"BET: Brain Extraction Tool," retrieved from URL=http://www.fmrib.ox.ac.uk/analysis/research/bet/, download date Dec. 19, 2012, 1 page.

Ababneh et al., "An Automated Content-Based Segmentation Framework: Application to MR Images of Knee for Osteoarthritis Research," IEEE International Conference on Electro/Information Technology (EIT), pp. 1-4, May 20-22, 2010.

Albers et al., "Three-Dimensional Reconstruction and Validation of Volumetric Tomographic Image Data: A Study in Pig Hearts," *Computers in Cardiology* 25:737-740, 1998.

Aslan et al., "A Novel, Fast, and Complete 3D Segmentation of Vertebral Bones," IEEE International Conference on Acoustics Speech and Signal Processing (ICASSP), pp. 654-657, Mar. 14-19, 2010.

Atkins et al., "Difficulties of T1 brain MRI segmentation techniques," *Proceedings of SPIE* 4684:1837-1844, 2002.

Ayres et al., "Segmentation and Estimation of the Histological Composition of the Tumor Mass in Computed Tomographic Images of Neuroblastoma," Proceedings of the $23^{rd}$ Annual EMBS International Conference, pp. 2700-2703, Oct. 25-28, 2001.

Bourke, "Polygonising a scalar field," retrieved from URL=http://paulbourke.net/geometry/polygonise/, download date Dec. 20, 2012, 15 pages.

Chernyaev, "Marching Cubes 33: Construction of Topologically Correct Isosurfaces," European Organization for Nuclear Research, presented at GRAPHICON'95, Saint-Petersburg, Russia, Jul. 3-7, 1995, 9 pages.

Dong et al., "Automatic Extraction of Femur Contours From Calibrated X-Ray Images: A Bayesian Inference Approach," IEEE International Symposium on Biomedical Imaging: From Nano to Macro, pp. 57-60, May 14-17, 2008.

Faisan et al., "Segmentation of Head Bones in 3-D CT Images From an Example," IEEE International Symposium on Biomedical Imaging: From Nano to Macro, pp. 81-84, May 14-17, 2008.

Glanznig et al., "Locally adaptive marching cubes through iso-value variation," Proceedings of the International Conference in Central Europe on Computer Graphics, Visualization and Computer Vision, pp. 33-40, Feb. 2009.

Hall et al., "Accurate SUV determination for small solitary pulmonary nodules using CT-based lesion volume estimates," *IEEE Nuclear Science Symposium Conference Record* 6:3426-3429, Oct. 16-22, 2004.

Han et al., "Topology Correction in Brain Cortex Segmentation Using a Multiscale, Graph-Based Algorithm," *IEEE Transactions on Medical Imaging* 21(2):109-121, Feb. 2002.

Li et al., "Partial Volume Segmentation of Medical Images," *IEEE Nuclear Science Symposium Conference Record* 5:3176-3180, Oct. 19-25, 2003.

Lorensen et al., "Marching Cubes: A High Resolution 3D Surface Construction Algorithm," *Computer Graphics* 21(4):163-169, Jul. 1987.

Naini et al., "Estimation of Lung's Air Volume and Its Variations Throughout Respiratory CT Image Sequences," *IEEE Transactions on Biomedical Engineering* 58(1):152-158, Jan. 2011.

Péchaud et al., "BET2-MRI-Based Estimation of Brain, Skull and Scalp Surfaces: FMRIB Technical Report TR06MP1," Oxford University Centre for Functional MRI of the Brain (FMRIB), Feb. 6, 2006, 14 pages.

Pettersson et al., "Some Issues on the Segmentation of the Femur in CT Data," Proceedings of the SSBA Symposium on Image Analysis, pp. 158-161, Mar. 2004.

Revol-Muller et al., "Bone MRI Segmentation Assessment Based on Synchrotron Radiation Computed Microtomography," *IEEE Transactions on Nuclear Science* 49(1):220-224, Feb. 2002.

Rizzo et al., "Integration of CT/PET Images for the Optimization of Radiotherapy Planning," Proceedings of the $23^{rd}$ Annual EMBS International Conference, Istanbul, Turkey, pp. 2756-2758, Oct. 25-28, 2001.

Rueda et al., "Partial Volume Estimation of Brain Cortex From MRI Using Topology-Corrected Segmentation," International Symposium on Biomedical Imaging: From Nano to Macro, pp. 133-136, Jun. 28-Jul. 1, 2009.

Ségonne et al., "Geometrically Accurate Topology-Correction of Cortical Surfaces Using Nonseparating Loops," *IEEE Transactions on Medical Imaging* 26(4):518-529, Apr. 2007.

Ségonne et al., "Topological Correction of Subcortical Segmentation," Medical Image Computing and Computer-Assisted Intervention—MICCAI 2003, LNCS 2879, pp. 695-702, 2003.

Sled et al., "A Nonparametric Method for Automatic Correction of Intensity Nonuniformity in MRI Data," *IEEE Transactions on Medical Imaging* 17(1):87-97, Feb. 1998.

Smith, "BET: Brain Extraction Tool: FMRIB technical Report TR00SMS2b," FMRIB (Oxford Centre for Functional Magnetic Resonance Imaging of the Brain), 25 pages, 2002.

Smith, "Fast Robust Automated Brain Extraction," *Human Brain Mapping* 17:143-155, 2002.

Toennies et al., "Feature-Based Stereological Volume Estimation in Sectional Images," IEEE/EMBS Proceedings of the $19^{th}$ International Conference, Chicago, Illinois, pp. 1468-1471, Oct. 30-Nov. 2, 1997.

Wang et al., "Model and Simulation Research of Tissue Based CT Images," Proceedings of the 2006 IEEE International Conference on Mechatronics and Automation, Luoyang, China, pp. 1387-1391, Jun. 25-28, 2006.

Xia et al., "Mass Detectability in Dedicated Breast CT: A Simulation Study with the Application of Volume Noise Removal," $8^{th}$ IEEE International Conference on BioInformatics and BioEngineering, pp. 1-6, Oct. 8-10, 2008.

* cited by examiner

| BEA | Processing Time | Correct Boundary | Pertinent Boundary | Misclassified Tissue |
|---|---|---|---|---|
| SPM | 50 min | 42.9% | 47.9% | 4.0% |
| BET | 40 sec | 46.9% | 53.7% | 10.9% |
| McStrip | 75 min | 65.7% | 72.7% | 2.4% |
| BSE, Subject-Specific | 3-15 min | 18.7% | 24.3% | 5.2% |
| BSE, Fixed | 1 min | 17.1% | 21.9% | 20.2% |

Fig. 23

COMPUTING THE MASS OF AN OBJECT

BACKGROUND

1. Technical Field

This disclosure is generally related to techniques to process data produced by three-dimensional ("3D") scanners, such as, for example, magnetic resonance scanners.

2. Description of the Related Art

Three-dimensional volume scanners, such as magnetic resonance imaging ("MRI") scanners, computed topology ("CT") scanners, computed axial tomography ("CAT") scanners and positron emission tomography ("PET") scanners produce three-dimensional images of an object, such as an image of a human brain, an image of a bone, etc. The data produced from such scans may be represented by a data set of points, each point having an associate value, such as an intensity gray-scale value. Pseudo-three-dimensional images in two dimensions may be produced using various techniques, including volume-based techniques, such ray-casting, texture-based methods, surface-based algorithms, such as Marching Cubes, etc.

BRIEF SUMMARY

In an embodiment, a system comprises: a memory; and one or more processing devices configured to: determine intersection points of a representation of a surface in an image space with cubes defining the image space, the surface defining a surface of an object; and determine an estimated mass of at least a portion of the object by: determining an estimated mass contribution of a first set of cubes contained entirely within the representation of the surface; determining an estimated mass contribution of a second set of cubes having intersection points with the representation of the surface; and estimating a mass of the at least a portion of the object based on the estimated mass contribution of the first set of cubes and the estimated mass contribution of the second set of cubes. In an embodiment, the one or more processing devices are configured to determine the intersection points by: defining an initial representation of the surface in the image space; refining the initial representation of the surface in the image space; and determining the intersection points of the refined representation of the surface with the cubes defining the image space. In an embodiment, refining the initial representation of the surface in the image space comprises segmenting the object and refining the initial representation to correspond to a segmented portion of the object. In an embodiment, refining the initial representation comprises applying a marching cubes algorithm to the segmented portion of the object. In an embodiment, refining the initial representation comprises deforming the initial representation. In an embodiment, the one or more processing devices are configured to process an image dataset associating vertexes of the cubes defining the image space with intensity values indicative of density and the defining the initial representation comprises: determining a maximum intensity threshold based on the dataset; determining a minimum intensity threshold based on the dataset; and determining an intensity threshold based on the maximum and minimum intensity thresholds. In an embodiment, refining the initial representation comprises deforming the initial representation by iteratively applying local movement vectors to vertexes of a plurality of triangles defining the surface. In an embodiment, a local movement vector u of a vertex of a triangle is defined by: $u = u_1 + u_2 + u_3$, where $u_1$ is a vector component representing local movement within the surface, $u_2$ is a vector component representing local movement along surface normal, and $u_3$ is a vector component representing local movement deforming the surface toward a surface of the segmented object. In an embodiment, the object is one of a human brain and a human femur. In an embodiment, the one or more processing devices are configured to determine the estimated mass, Mass, of the at least a portion of the object according to:

$$\text{Mass} = \sum_1^n V_{bc} d_a + \sum_1^m V_p d_{ati},$$

where n is a number of cubes in the first set of cubes, $V_{bc}$ is a volume of a cube in the first set of cubes, $d_a$ is an average density of the cube in the first set of cubes, m is a number of cubes in the second set of cubes, $V_p$ is a volume of a portion of a cube in the second set of cubes contained within the surface, and $d_{ati}$ is an average density of the portion of the cube in the second set of cubes. In an embodiment, determining the estimated mass contribution of a second set of cubes comprises representing a cube in the second set of cubes as a plurality of sub-cubes and $V_p$ is a total volume of the cube in the second set of cubes multiplied by a ratio of a number of sub-cubes of the cube in the second set of cubes determined to be within the at least a portion of the object to a total number of sub-cubes of the cube in the second set of cubes. In an embodiment, the total number of sub-cubes in the cube is four.

In an embodiment, a method comprises: determining intersection points of a representation of a surface in an image space with cubes defining the image space, the surface representing a surface of an object; and estimating a mass of at least a portion of the object, the estimating including: estimating a mass contribution of a first set of cubes contained entirely within the representation of the surface; estimating a mass contribution of a second set of cubes having intersection points with the representation of the surface; and estimate a mass of the at least a portion of the object based on the estimated mass contribution of the first set of cubes and the estimated mass contribution of the second set of cubes. In an embodiment, determining the intersection points comprises: defining an initial representation of the surface in the image space; refining the initial representation of the surface in the image space; and determining the intersection points of the refined representation of the surface with the cubes defining the image space. In an embodiment, refining the initial representation of the surface in the image space comprises segmenting the object and refining the initial representation to correspond to a segmented portion of the object. In an embodiment, the method comprises applying a marching cubes algorithm. In an embodiment, refining the initial representation comprises deforming the initial representation. In an embodiment, the method comprises processing an image dataset associating vertexes of the cubes defining the image space with intensity values indicative of density. In an embodiment, the estimated mass of the at least a portion of the object is:

$$\text{Mass} = \sum_1^n V_{bc} d_a + \sum_1^m V_p d_{ati},$$

where n is a number of cubes in the first set of cubes, $V_{bc}$ is a volume of a cube in the first set of cubes, $d_a$ is an average density of the cube in the first set of cubes, m is a number of cubes in the second set of cubes, $V_p$ is a volume of a portion of a cube in the second set of cubes contained within the surface, and $d_{ati}$ is an average density of the portion of the cube in the second set of cubes. In an embodiment, estimating the mass contribution of a second set of cubes comprises representing a cube in the second set of cubes as a plurality of sub-cubes and $V_p$ is a total volume of the cube in the second set of cubes multiplied by a ratio of a number of sub-cubes of the cube in the second set of cubes determined to be within the at least a portion of the object to a total number of sub-cubes of the cube in the second set of cubes.

In an embodiment, a non-transitory computer-readable memory contains instructions configured to cause a processing device to estimate a mass of an object by performing a method, the method comprising: determining intersection points of a representation of a surface in an image space with cubes defining the image space, the surface representing a surface of an object; and estimating a mass of at least a portion of the object, the estimating including: estimating a mass contribution of a first set of cubes contained entirely within the representation of the surface; estimating a mass contribution of a second set of cubes having intersection points with the representation of the surface; and estimating a mass of the at least a portion of the object based on the estimated mass contribution of the first set of cubes and the estimated mass contribution of the second set of cubes. In an embodiment, determining the intersection points comprises: defining an initial representation of the surface in the image space; refining the initial representation of the surface in the image space; and determining the intersection points of the refined representation of the surface with the cubes defining the image space. In an embodiment, refining the initial representation comprises deforming the initial representation. In an embodiment, the estimated mass of the at least a portion of the object is:

$$\text{Mass} = \sum_{1}^{n} V_{bc} d_a + \sum_{1}^{m} V_p d_{ati},$$

where n is a number of cubes in the first set of cubes, $V_{bc}$ is a volume of a cube in the first set of cubes, $d_a$ is an average density of the cube in the first set of cubes, m is a number of cubes in the second set of cubes, $V_p$ is a volume of a portion of a cube in the second set of cubes contained within the surface, and $d_{ati}$ is an average density of the portion of the cube in the second set of cubes.

In an embodiment, a system comprises: a memory; and one or more processing devices configured to: define an initial representation of a surface in an image space having cubes defining the image space, the surface representing a surface of an object; and deform the initial representation of the surface by iteratively applying local movement vectors to vertexes of a plurality of triangles defining the surface, wherein a local movement vector u of a vertex of a triangle is defined by: $u=u_1+u_2+u_3$, where $u_1$ is a vector component representing local movement within the surface, $u_2$ is a vector component representing local movement along surface normal, and $u_3$ is a vector component representing local movement deforming the surface toward a surface of the segmented object. In an embodiment, the system is configured to: segment the object in the image space; refine the initial representation to correspond to a segmented portion of the object; and apply a marching cubes algorithm to the refined representation.

In an embodiment, a method comprises: defining an initial representation of a surface in an image space having cubes defining the image space, the surface representing a surface of an object; and deforming the initial representation of the surface by iteratively applying local movement vectors to vertexes of a plurality of triangles defining the surface, wherein a local movement vector u of a vertex of a triangle is defined by: $u=u_1+u_2+u_3$, where $u_1$ is a vector component representing local movement within the surface, $u_2$ is a vector component representing local movement along surface normal, and $u_3$ is a vector component representing local movement deforming the surface toward a surface of the segmented object. In an embodiment, the method of claim 27 comprises: segmenting the object in the image space; refining the initial representation to correspond to a segmented portion of the object; and applying a marching cubes algorithm to the refined representation. In an embodiment, the object is one of a human brain and a human femur.

In an embodiment, a system comprises: means for defining an initial representation of a surface in an image space having cubes defining the image space, the surface representing a surface of an object; means for iteratively applying local movement vectors to vertexes of a plurality of triangles defining the surface to produce a refined representation of the surface; and means for estimating a mass of the object based on the refined representation of the surface.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 23 illustrates a comparison of results of an embodiment of a brain extraction tool results of other brain extraction algorithms.

DETAILED DESCRIPTION

Figure 1:
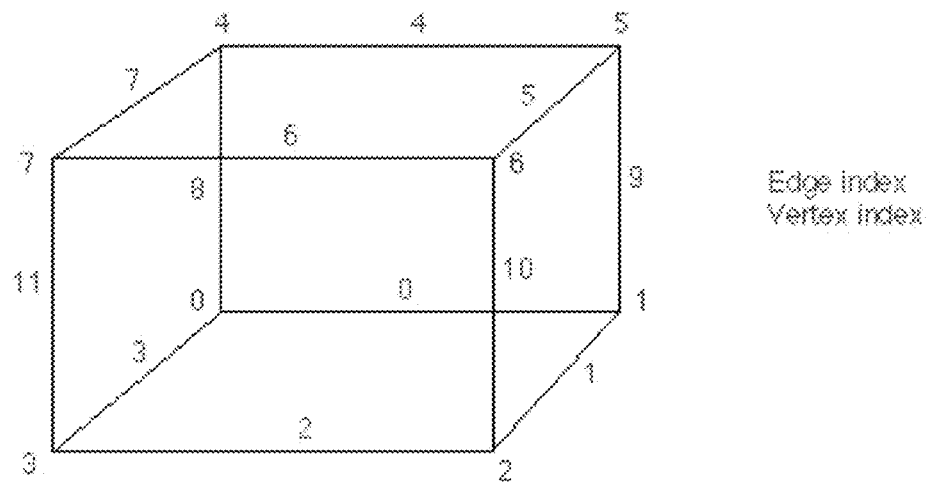
FIG. 1 illustrates a cube of an embodiment of a method of illustrating a surface using a Marching Cubes algorithm.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, volume scanners, processors, controllers, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claims.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

An embodiment is generally related to a tool capable of visualizing a tridimensional image elaborated by an available dataset, for example, a medical dataset based on a Magnetic Resonance of a brain. The inventors have realized that such data sets and visualizing techniques may be employed in techniques to estimate the mass of an object, for both medical and non-medical applications. An embodiment determines the mass of an object described by a file containing data representative of density samples of the object. The file may be produced by a 3D volume scanner, for example a magnetic resonance scanner. An embodiment comprises an application of an embedded system, such as a modern PDA, which may give to medical staff a portable, fast and good quality tool to use in a diagnostic process. An embodiment employs tridimensional reconstruction from medical scanners as MRI, CT, CAT or PET. An embodiment may be employed in a systematic way in a medical or industrial pipeline, for example as a diagnostic tool, a quality control tool, etc.

Among the factors considered are trade-offs in terms of computational time and quality of the results, since the resources available in a portable device may be limited and it may not be feasible or desirable to wait a long time for valid results. For example, a tool producing results close to real-time may be desired.

One rendering method that may provide quality image results is a ray-casting algorithm. Unfortunately, a ray-casting algorithm may be very CPU-intensive, and may not provide real-time frame rates even when using a server to run the ray-casting algorithm. On the contrary, a ray-casting algorithm may take several seconds (or minutes or hours depending on the available hardware) to elaborate just one frame.

Another rendering method employs a texture-based algorithm, which visualizes a tri-dimensional object as simply a collection of bi-dimensional ones. For example, in medical field an exam may be a collection of slices. In texture-based rendering, those slices are used to create a tridimensional shape. Text-based methods may provide a fast, near real-time, way to render a tridimensional object. The quality is not so poor. However, text-based rendering does not add any information to what was given by the bi-dimensional slices, it simply returns a global vision.

The two embodiments of algorithms described above are called volumetric, since the algorithms are directed to visualizing the entire volume of an object. Another class of algorithms comprises surface-oriented algorithms. One surface-oriented algorithm is the Marching Cubes (MC) algorithm. MC is directed to visualizing a surface rather than a volume. Thus, a surface-based algorithm may produce from a single dataset many outputs, for example, as many as the number of surfaces forming a volume, using a surface visualizer such as MC.

The inventors recognized that the MC algorithm has some really interesting features which may be employed for the purposes of estimating the mass of an object: for each surface to visualize, an MC algorithm may use a limited amount of time to run (for example, less than 5 min) and then the image may be shown at real-time frame-rate; the MC is an algorithm suitable for parallel processing, which may facilitate integration in hardware (e.g., in a graphics processing unit); and the quality of the surface is generally sufficiently good. Another really interesting point in an MC embodiment is that, with a very limited human intervention, an MC algorithm may be employed as a rough segmentation tool, since it may be used to divide a particular surface from the rest of an examined object.

Embodiments are described herein with reference to a medical examination space. However, embodiments may be employed in other situations and for other purposes, such as examination of products, infrastructure (e.g., wiring, piping, concrete thicknesses), etc.

The input format file for an embodiment of a Marching Cube implementation is a flow of scalar values (called voxels), each voxel being associated with a position in 3D space, and which may be viewed as representing the density of the matter present in that portion of space. The Marching Cube algorithm creates a polygonal mesh (triangles usually) that represent an iso-surface. For example, if the intensity values in a data set range from zero to one, when an iso-value equal to, for example, 0.5 is chosen, the MC algorithm visualizes a surface comprised of the points in the data set having the value 0.5.

The MC algorithm divides the three dimensional space in which the surface to visualize is inserted into small volumes, such as cubes, which may be referred to as basic cubes in this document. The size of the cube may be fixed if working with a discrete dataset, as in the case of an image scan. The MC algorithm estimates whether and how an iso-surface passes through a cube (with which shape within the cube, cutting which edges of the cube, etc.).

The computation proceeds cube by cube (this is the reason why MC is called marching cubes), and when the eight corners of a cube show values both above and below the threshold in input, the isosurface to visualize crosses that cube. Depending on the positions of those values, a set of triangles is added to the complete mesh. Note that just the eight values at basic cube's corners may be employed. The hypothesis behind this procedure is that the field inside the cube varies trilinearly.

The original implementation of MC had some issues in defining the possible cases with which the surface could cross the basic cube. Later contributions helped to solve those issues, defining what they are called internal and external ambiguities and providing mathematical tools (asymptotic decider, for example) to select among all the (increased) number of the possible set of triangles for each basic cube.

Many other contributions for improving MC algorithm are available, for increasing the execution speed, for allowing the visualization of a mixed isosurface or for improving the quality of the triangle's shape, just to mention a few application fields.

Starting from this point the inventors developed an embodiment through which it is possible to compute the mass (volume multiplied by density) of the object of an examination, such as a medical examination, or of a portion of an object of an examination. In addition, the inventors developed further refinements to the MC algorithm to better define the meshes used to visual surfaces of objects.

As noted above, MC is a surface-rendering algorithm to build a mesh, such as a mesh comprising triangles. Those triangles form the boundary of a volume.

Density values frequently are already available in datasets for physical examinations. For example, the grayscale values in a medical examination dataset may be employed as the density values. Thus, the information to estimate the mass is available. In an embodiment, the computation of the mass may be inserted into the MC code, to exploit the MC code's strong parallelizability.

In this way the total mass may be computed by the summation of the contribution given by each basic cube.

In an embodiment, two types of basic cubes may be employed to estimate the mass: cubes which based on the grayscale values are entirely within the surface (e.g., cubes which have at their corners all grayscale values within the isosurface, or between two isosurfaces), and cubes that are crossed by the isosurface.

The first type gives a mass contribution that is easy to compute in an embodiment: it is generally sufficient to multiply the three resolutions (defined in this case as the distances between a voxel and the following one in each of the three planes) and the average between the eight corner grayscale values.

The second type may be used with a more accurate analysis in an embodiment. The basic cube is divided into a number of smaller cubes. Each smaller cube is evaluated to decide if the smaller cube lies inside or outside the surface. A density value is computed for each smaller cube determined to be inside the surface through a trilinear interpolation of the basic cube eight values. Based on the number of smaller cubes inside the surface, the contribution given by that basic cube to the total volume may be estimated. Consequently, the basic cube's contribution to the total mass may be computed by multiplying the volume contribution by the arithmetic average of the sum of all density values trilinearly interpolated. Of course, when a larger number of smaller cubes is employed, a better estimate may be obtained, perhaps at the cost of a longer execution time.

This mass computation, as already mentioned, may be made for the entire object or for just a portion of the object (e.g., a portion between two isosurfaces, a portion having a density above a threshold, etc.).

The applications of embodiments of determining the mass of an object could have a number of practical applications. For example, in the medical field, determining the mass according to an embodiment may be employed to compute the strength of a bone, to prevent or diagnose osteoporosis, or determine the mass of a tumor, etc. Of course, embodiments may be employed in other fields, and employed with other types of density datasets.

MC algorithms have been employed to render images. See Paul Bourke, *Polygonising a scalar field* (1994). The 3D space is divided into small adjacent cubes. A convention using indexing of edges and vertexes is shown in FIG. 1.

The eight vertexes of the cube each have a corresponding voxel. The voxels may be, for example, the values of a scalar field contained in a medical exam file. Based on those values, the vertexes of the cube which are inside the iso-surface and which are outside the iso-surface are determined.

In an embodiment, a threshold value may be specified by a user at run-time for comparison to the voxel values at the vertexes of the cubes. If the value of a voxel at a vertex of the cube is above this threshold value, that vertex point is considered outside the iso-surface, and vice versa. Of course, in other embodiments, a point may be considered inside the iso-surface if the value at the vertex is above the threshold value, and vice versa.

Figure 2:
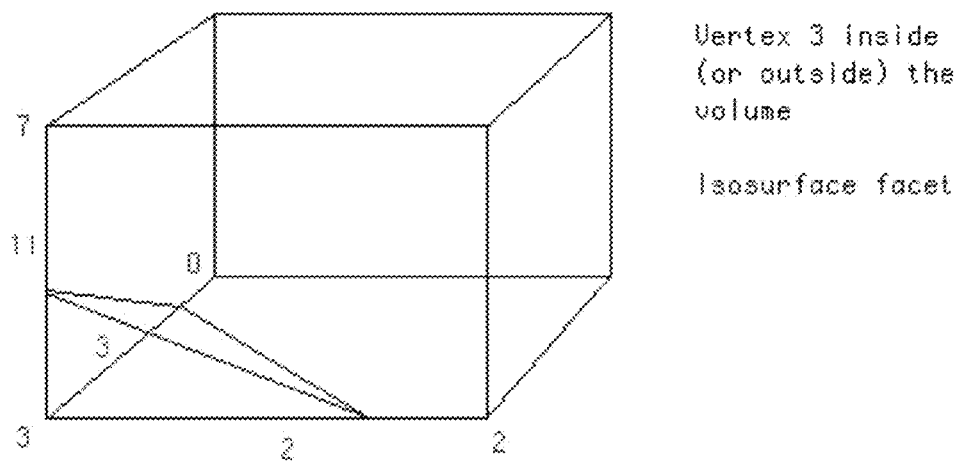
FIG. 2 illustrates a shape of part of a surface crossing a cube.

Consequently, the shape of the part of surface that crosses a cube may be estimated. For example, with reference to FIG. 2, if just vertex 3 is inside the surface, a shape 202 may be determined to be the shape of the part of the surface that crosses the cube.

Figure 3:
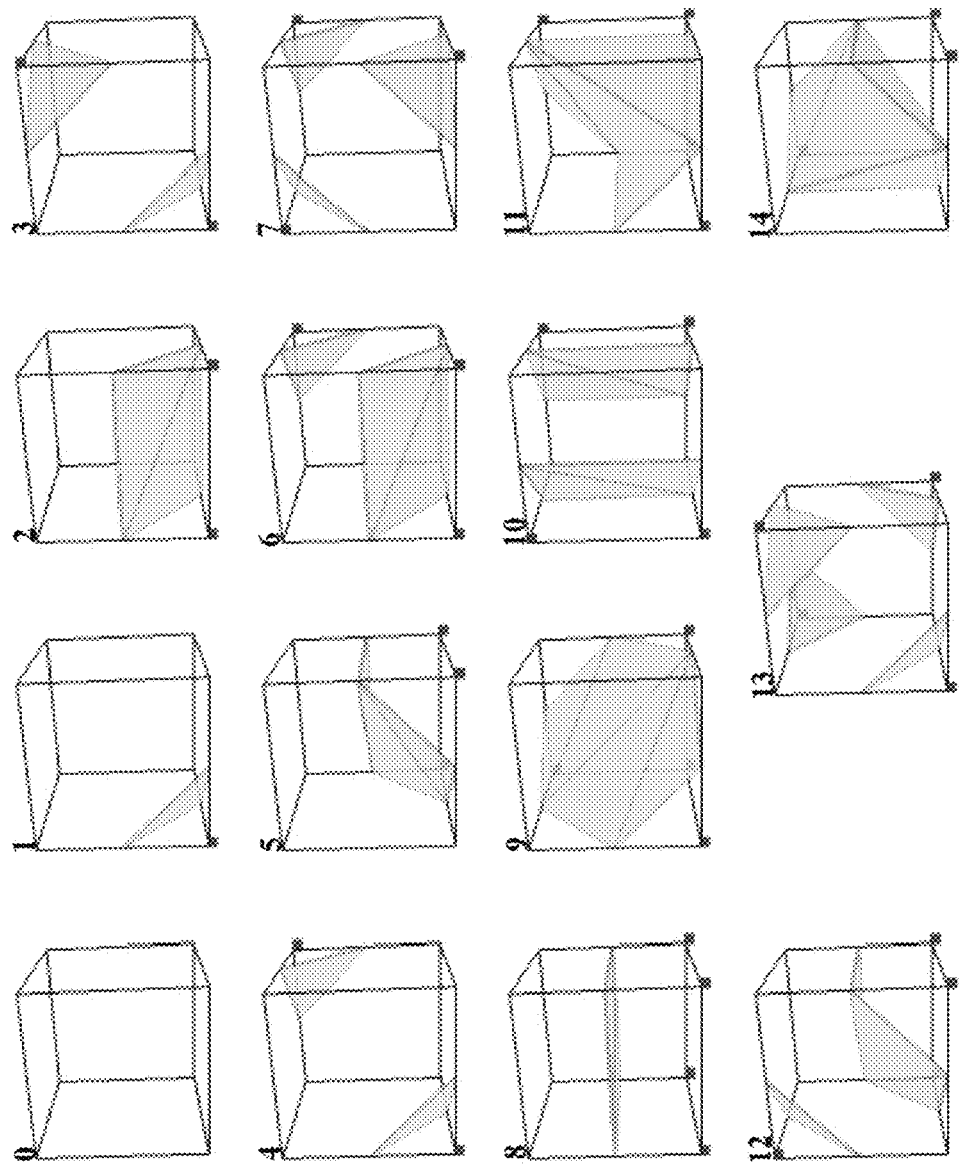
FIG. 3 illustrates a set of possible shapes of surfaces crossing a cube.

Since there are 8 vertexes in the cube, and the possibilities are just 2 for each vertex (inside/outside), there are 256 possible combinations, and for any of these there will be a possible shape for the surface that crosses the cube. Excluding configurations that are symmetric, rotated or mirrored, the basic configurations are just 15, as shown in the set of shapes crossing a cube of FIG. 3.

Note that there is a biunivocal correspondence between which points are inside or outside the surface and the cutting edges of the cube and the number of triangles composing the surface. Thus, it is possible to build one or more Look-Up Tables ("LUT") to speed up the execution of the program.

To retrieve a corresponding entry in the LUTs, an index is computed looking at the values of the vertexes. A zero is assigned to vertexes below the surface and a one to vertexes above it. The Bourke reference includes example code to compute an index.

An 8-bit index may point to a location in a table which stores 12-bit numbers. See FIG. 16. Those numbers describe which edges are cut, one bit each. As illustrated, a zero represents non-cut edges, and a one represents cut edges. Although the basic configurations are just 15, in the table of an embodiment all 256 possibilities are present, described in hexadecimal codes. The Bourke reference includes an example table.

Where the edges are crossed may be computed by linearly interpolating the intensity and the position values of the extreme points of the edge to cut with the formula:

$$P=P1+(\text{isovalue}-V1)(P2-P1)/(V2-V1)$$

where P1 and P2 are the positions of the points and V1 and V2 the values of the field in those points. A vector may be generated which includes all the interpolated values, one for each edge crossed.

The facets (triangles) of the surface crossing the cube are built. A triangulation LUT may be used to build the triangles. For every configuration, there are a determined number of triangles (5 at most) having as vertexes the cut edges. The first 8-bit index may be used again to point to the table which stores edges touched by the triangles.

A few lines of an embodiment of a triangulation table from Bourke appear below:

```
int triTable[256][16] =
{{-1, -1, -1, -1, -1, -1, -1, -1, -1, -1, -1, -1, -1, -1, -1, -1},
 {0, 8, 3, -1, -1, -1, -1, -1, -1, -1, -1, -1, -1, -1, -1, -1},
 {0, 1, 9, -1, -1, -1, -1, -1, -1, -1, -1, -1, -1, -1, -1, -1},
 {1, 8, 3, 9, 8, 1, -1, -1, -1, -1, -1, -1, -1, -1, -1, -1},
 {1, 2, 10, -1, -1, -1, -1, -1, -1, -1, -1, -1, -1, -1, -1, -1},
 {0, 8, 3, 1, 2, 10, -1, -1, -1, -1, -1, -1, -1, -1, -1, -1},
 {9, 2, 10, 0, 2, 9, -1, -1, -1, -1, -1, -1, -1, -1, -1, -1},
 {2, 8, 3, 2, 10, 8, 10, 9, 8, -1, -1, -1, -1, -1, -1, -1},
 ...
```

If the number of triangles needed is less than the maximum, the unused locations of the table may be set to indicate the locations is unused, for example, unused locations may be set equal to −1.

The last lines of code of an example presented in Bourke store into an array of structures the coordinates of the triangle vertexes.

The use of look-up tables allows a very fast computation, even in low performance machines, obtaining a good result.

Figure 16:
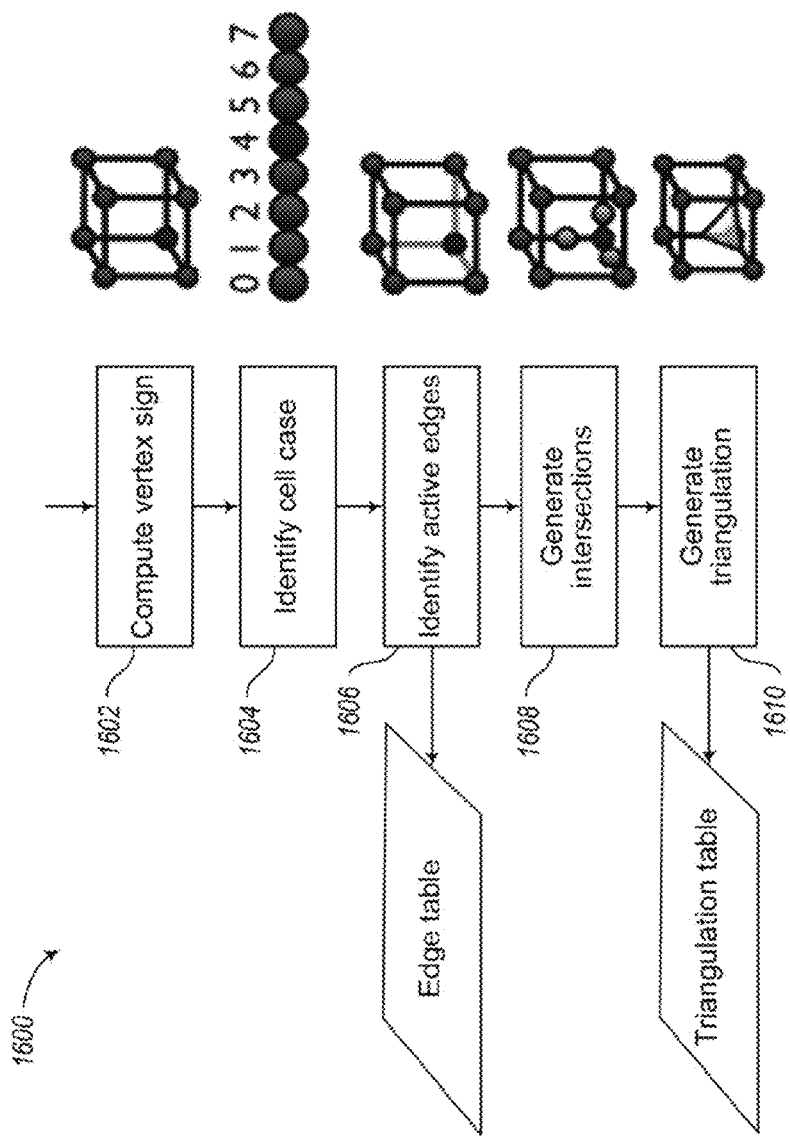
FIG. 16 illustrates an embodiment of a method of surface triangles for a cube cut by the surface based on edge and triangulation tables.

FIG. 16 illustrates an embodiment of a method 1600 to identify a surface cutting through a cube. At 1602, the threshold iso-value is subtracted from the value of the voxel or iso-value of each vertex of the cube and a sign for the vertex is determined. At 1604, the cell case is determined based on the vertexes which are inside the surface. Whether each vertex is inside or outside the surface may be determined based on the sign. For example, if a vertex is positive, the vertex may be considered outside the surface, and if the sign is negative, the vertex may be considered inside the surface. As illustrated, the blue vertex is determined to be inside the surface and the case is one of 256 cases corresponding to the case where this particular vertex is inside the surface while the other vertexes are outside the surface.

At 1606, an edge table is accessed using an index corresponding to the case of the cube (e.g., 00001000) to determine the active edges of the cube (e.g., based on which vertexes are determined to be inside the surface). As illustrated, the red edges are determined to be active based on the access to the edge table. Active edges are edges which interconnect two vertexes with opposite signs.

At 1608, the intersections belonging to active edges are determined, for example by using interpolation. The green intersection points are determined for the illustrated case.

At 1610, a triangulation table is accessed, using the same index used to access the edge table. Information retrieved from the triangulation table is used to determine how the intersections are to be connected to form one or more triangles for the surface crossing the cube.

The MC algorithm facilitates a high resolution renderer, since it is possible to use smaller cubes, depending on the characteristic of the dataset, without significant loss of performance. The flexibility to choose the preferred threshold value of iso-surface facilitates adding a segmentation step, and this is an advantage point for MC over volume-based rendering. In addition to user input thresholds, default threshold values may be employed, variable threshold values may be employed, multiple threshold values may be employed, etc., and various combinations thereof.

Figure 4:
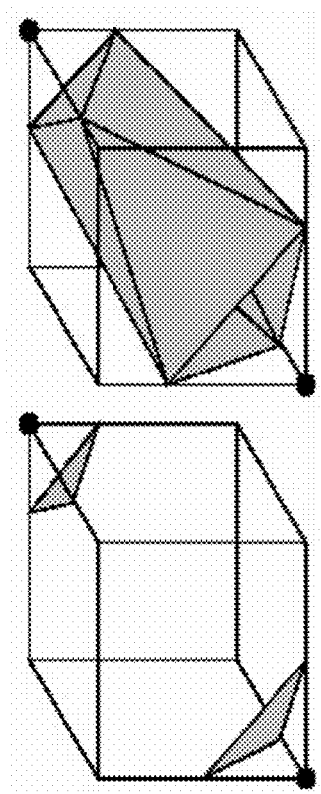
FIG. 4 illustrates example ambiguities in shapes of surfaces crossing a cube.
Figure 4:
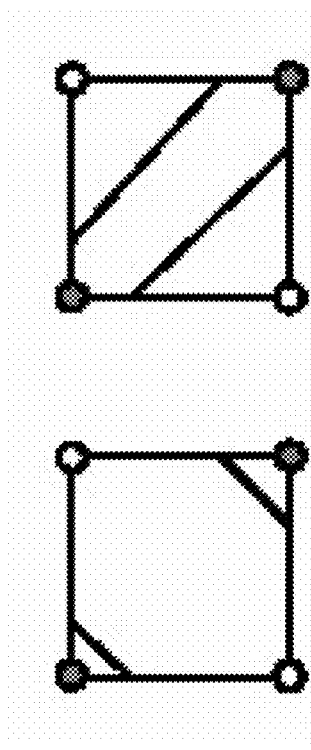

In an MC embodiment, there may sometimes be an ambiguity in the shape of the surface inside the cube. FIG. 4 illustrates examples of ambiguities in which the vertex points inside the surface are the same, but the shape is not. The left two cubes of FIG. 4 illustrate a face ambiguity, and the right two cubes illustrate an internal ambiguity. This may lead to imperfections in the rendered surface, in particular in creation of holes or in creation of surfaces which are not topologically correct, due to more than one choice when putting together two adjacent cubes. Resolving those problems increases the complexity of the algorithm. For example, there may be more than one set of cut edges and triangles for each configuration.

An improvement to MC to address the ambiguities has been proposed by Eugeny Chernyaev. See Eugeni V. Chernyaev, *Marching Cubes* 33: *construction of topologically correct isosurfaces* (1995).

Chernyaev explained that the Bourke implementation, in order to simplify the calculations, takes into account just one variant of the iso-surface topologies derivable from the trilinear interpolation formula. Chernyaev divided possible ambiguities into two groups: face ambiguities (when a face has 2 points above and 2 below the surface diagonally opposed) and internal ambiguities (when a similar situation arises in 3D space). See FIG. 4. Briefly, Chernyaev discussed possible topological configurations (33 in total) and some mathematical methods to choose among them. The most famous method is the so called asymptotic decider, used also in other MC variations.

This algorithm does not break the correspondence between the number of points under and over the surface and the cut edges, but it breaks with the number of triangles built. Practically, the asymptotic decider algorithm constructs a bigger look-up table and introduces computations to choose among the ambiguous cases.

The increasing of the size of the LUT does not generally affect the computational time, while the computations to choose in the ambiguous cases may increase the computational time. The increase generally is not a significant amount for at least two reasons: the first is that not all the original configurations are ambiguous (just 7 over 15) and the second is that the ambiguities arise quite seldom, for very particular shapes of surfaces. In addition, decreasing the size of the cube will result in those particular cases arising less and less frequently. Thus, use of an asymptotic decider algorithm may produce a significant improvement in the result with a negligible decrease in performance.

An embodiment of an implementation of MC modified to determine a mass of an object may include further refinements of MC, such as those elaborated by a collaboration between the University of Rio de Janeiro and the University of Sophia Antipolis, in France. See T. Lewiner, H. Lopes, A. Wilson Vieira, G. Tavares, *Efficient implementation of Marching Cubes cases with topological guarantees*, Journal of Graphics (2003). Lewiner, et al., heavily restarts from Chernyaev considerations, realizing a topologically correct LUT having 730 entries, and improving testing for internal ambiguity.

Another kind of improvement to MC that may be included in an embodiment is locally adaptive marching cubes. See M. Glanznig, M. M. Malik, M. E. Gröller, *Locally Adaptive Marching Cubes through Iso-Value Variation*.

Starting from the consideration that the data coming from a medical exam or captured by another sensor of density or an indication of density are implicitly noisy, the idea is to differentiate, locally, the iso-value of the surface, in order to balance noise effects, or more properly, to visualize a mixed iso-surface. This could be particularly useful for example if it is desired to render two different tissues in two different portions of the 3D space, with different iso-values. Of course, Glanznig implicitly employs defining the range of the iso-value and in which way the iso-value changes—linearly or gaussian—and in which plane of the space. This may be done, for example, by a user inputting ranges and changes to the iso-value. In an embodiment, changes may be limited, for example, to linear changes, such as varying the iso-value linearly along a direction.

Figure 17:
FIG. 17 illustrates a pseudo three-dimensional image of a femur.

The inventors have discovered that this feature may be particularly useful when applied to some types of datasets, such as to bones inserted in cement block. FIG. 17 illustrates an image of a femur in a concrete block which was generated by varying a threshold iso-value linearly along a direction. In this case, using this option, an embodiment facilitates visualizing just the external bone surface and not the block outside. In particular, rendering of the head of the bone was facilitated through use of locally adaptive setting of the threshold iso-value. Locally adaptive setting of the iso-threshold may be thought of as a smarter and more reliable way to segment an object using Marching Cubes.

MC is a surface renderer, what is produced in output is a definition, through a mesh composed generally of triangles, of the borders of a volume. In addition, the examinations, such as managed medical exams, often include density information. The inventors have released that, knowing the volume and the density, it is possible to compute the mass of the object delimited by the mesh produced by MC.

In an embodiment, the inventors have discovered a new numerical method to determine the mass of an object.

In an embodiment, the procedure is similar to that used by MC: proceeding in the computation cube by cube. Consequently the total mass value is the summation of the contribution given by all the basic cubes crossed by the surface and by the cubes completely inside that surface:

$$\text{Mass} = \sum_1^n V_{bc} d_a + \sum_1^m V_p d_{ati},$$

Figure 6:
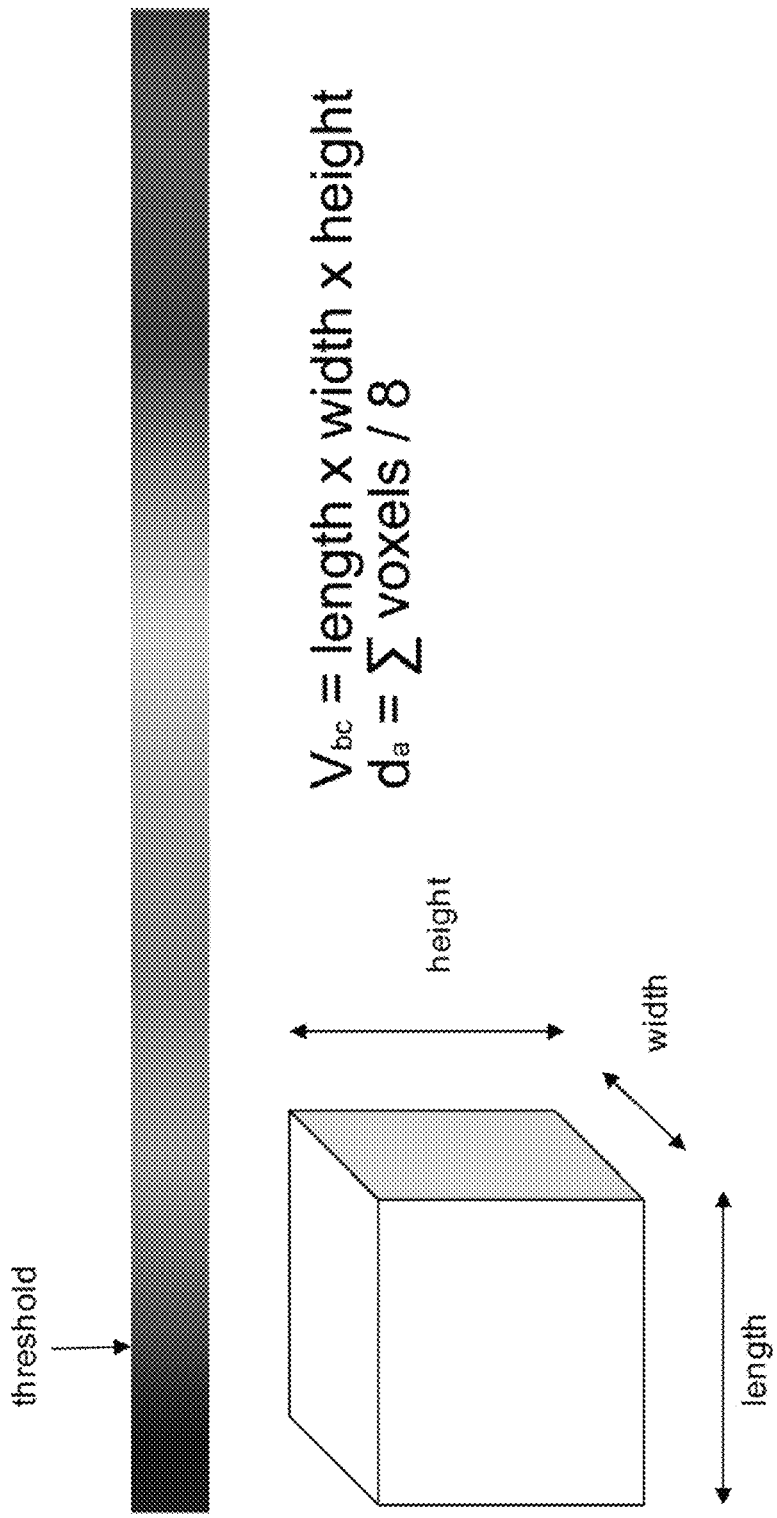
FIG. 6 illustrates a basic cube entirely within a surface.

The first summation involves the n cubes completely inside the surface. An example cube (or cuboid) is shown in FIG. 6. This is a significant difference with respect to MC. MC takes into account just those cubes crossed by the surface. It is noted that one or more scaling factors may be employed in some embodiments (e.g., the mass may be equal to a scaling factor multiplied by the sum of the contributions of the basic cubes crossed by the surface and by the cubes completely inside that surface, for example when the voxel values are proportional to the density at the corresponding point, scaling factors may be employed to determined the individual components of the summation, etc.).

The components of the above formula are discussed below, to explain how to compute the components if the components are not readily available according to an embodiment:

$V_{bc}$ (Volume of the basic cube) which may typically be equal for all the current cubes, is the multiplication between the three dimension's resolution (the distance between the center of a voxel and the following one in each of the three orthogonal directions). The information about resolutions is often already available, since this information is typically specified in or derivable from parameters contained in the header of datasets, such as medical datasets.

$d_a$ (density averaged) is the density value bound to the current basic cube. Since the entire cube lies inside the volume, and the initial hypothesis of the MC itself is that the density inside the basic cube varies trilinearly, this value may be computed through the arithmetical average of the eight corner voxels. For example, $V_{bc}$=length×width×height of the cube
$D_s$=the sum of the voxels of the corners of the cube/8.

In following lines an embodiment of a snippet of code that implements the computation for a single basic cube is set forth:

```
total_grid_value = 0;
for (i=0; i<7; i++) {
total_grid_value += grid.m_val_original[i];
}
average_grid_value = (float)total_grid_value / (float)8;
total_mass += glob->dists[0] * glob->dists[1] * glob->dists[2] *
                              average_grid_value;
```

Figure 8:
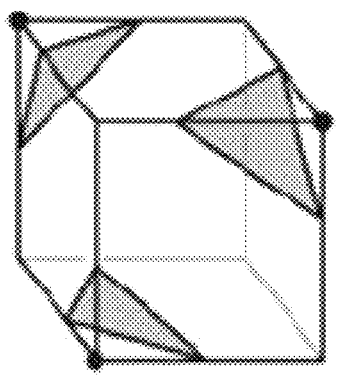
FIGS. 7 and 8 illustrate cubes crossed by a surface.
Figure 7:
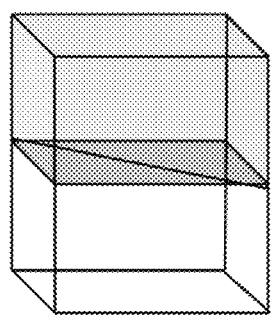

The second summation may represent a challenging part, since it involves those cubes m crossed by the surface, so the technique adopted to compute it may heavily influence the precision of the computation. FIGS. 7 and 8 illustrate examples of a cube crossed by one or more a surfaces of an object. In FIG. 7, the red area is inside the surface, represented by the two triangles in the middle of the cube.

Figure 10:
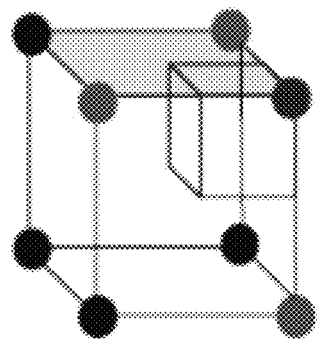
FIGS. 9 and 10 illustrate an embodiment of dividing a basic cube into smaller cubes.
Figure 9:
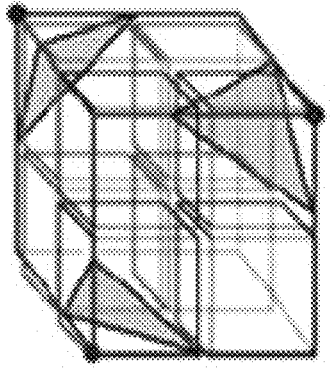

$V_p$ is the contribution given by a basic cube crossed by the surface to the total volume (e.g., the fraction of volume of the basic cube which is inside the surface). To compute this contribution the basic cube may be divided in a number of smaller cubes. FIG. 9 illustrate an example embodiment of dividing a basic cube into 8 smaller cubes, and is overlayed on the example of a cube crossed by a surface of FIG. 8. FIG. 10 illustrates a single smaller cube of a basic cube. The higher the number of the smaller cubes, the greater will be the accuracy and perhaps the longer the computational time. The number of smaller cubes may be a large number.

In an embodiment, a value of 10 smaller cubes per side may be chosen, for example, for a total of 1000 smaller cubes inside the basic cube. The total number of smaller cubes is t, and the subset of smaller cubes that lies inside the surface is p.

So $$V_p = \frac{p}{t} V_{bc}.$$

To compute p, an embodiment determines for each smaller cube whether the cube lies inside or outside the surface that crosses the basic cube. The procedure is really simple, and it reflects the mechanism already used by MC for building the tridimensional mesh. Every smaller cube is assigned with a density value, using for example trilinear interpolation of the four nearest voxels. In this way, under the hypothesis that the field varies linearly inside the basic cube, a density value may be determined for each smaller cube. The smaller cubes lying inside the surface are those having a density value above or equal to the iso-level threshold requested by the user.

In an embodiment using the locally adaptive option, even the iso-level may be interpolated (e.g., trilinearly interpolated), in order to have a particular value related to each smaller cube. A linear interpolation may be employed, for example, in an embodiment of the locally adaptive scenario where iso-level varies just along one direction.

$d_{ati}$ is the density as the average of the trilinear interpolations. Since now the basic cube is not entirely included inside the surface, the value of the density relative to the portion of volume involved in computation may not be accurate if it is determined by using the arithmetical average of the eight corner voxels, as it may vary depending on the placement inside the cube of its portion inside the surface.

Practically $d_{ati}$ may be the arithmetical average of all the density values assigned to each smaller cube determined to be within the surface. As already said each of the density values may be the trilinear interpolation between the 8 voxels belonging to the cube, each voxel being assigned a weight. The different weights assigned to the voxels for the smaller cube shown in FIG. 10 are illustrated as different colors (e.g., for the blue smaller cube, the blue voxel has the greatest weighting, the red voxels have an intermediate weighting, and the black voxels have the least weighting). So computation of the density value to link to each smaller cube of a basic cube is useful both to decide if a smaller cube lies inside the surface and to compute the average of the density of the relevant volume portion (the average density of the smaller cubes determined to be within the surface).

Note that even the threshold may be trilinearly interpolated if it has been expressed as a field of values, so that each cube's corner is compared with a different threshold value, as it may happen in a locally adaptive version of MC.

With reference to FIG. 10, to evaluate if the smaller cube lies inside or outside the surface, a density value to associate with the smaller cube may be computed by trilinearly interpolating the voxel values belonging to the cube. As discussed above, this interpolation may be weighted, so that the nearest voxel (blue one), will have an higher weight with respect to red ones, and red ones a higher weight with respect to black ones. If the iso-value is locally adaptive, it may be trilinearly interpolated too. Finally, if the density value associated with the smaller cube is below the threshold, the cube itself is inside the surface, and it will contribute to the mass computation. In this case the density of the volume portion interested will be evaluated as the arithmetic average of the densities associated with the smaller cubes.

Example lines of code that implement an embodiment of a procedure for determining the mass of the cubes crossed by the iso-surface are set forth at the end of this disclosure.

After $d_{ati}$ is computed, the mass of the object delimited by the surface may be computed, for example, by using the previously mentioned formula.

This type of computation could have an incredible number of practical applications. The inventors have implemented it using medical datasets that contain density information associated with spatial coordinates, and remaining in the medical field examples include the computation of the mass of a bone, the mass of a tumor, etc. This type of computation can be extended to other types of datasets that include density information.

The precision of the computation may be arbitrarily increased using a higher number of the smaller cubes inside the basic cube. However, it is noted that the accuracy degree is generally enhanced by the fact that there is generally compensation between false positive and false negative.

This characteristic leads to good results even using a very limited number of smaller cubes per side (2 or 4). In an embodiment, a trade-off between accuracy and computational time was achieved using values between 8 and 12, depending on the resolutions of the basic cubes (the smaller the resolutions are, the fewer number of smaller cubes needed to obtain sufficiently accurate results).

Note that a factor affecting the precision of the computation is the shape of the mesh: to compute the mass of an object it is desirable to create a mesh that is as close-fitting as possible to the borders of that object. This is in first instance a iso-value tuning issue. However, in some embodiments an object could be segmented before the mesh creation step to facilitate creating more accurate mesh shapes. For example, some human tissues have similar density values, and it may be desirable to segment an image so an object may be analyzed for purposes of determining the mass separate from other portions of an image.

The improvements to the original MC definition helped in building a more correct mesh and in performing some kind of rough segmentation. However, further refinements may be desired, such as in cases where it is desired to compute the mass of an object having a density value very similar to the density value of another object present in dataset (e.g., such as soft tissues in a human body).

After the creation of the mesh, the value obtained in output from an embodiment as a mass is the mass of the volume delimited by that mesh, which may be visualized with any mesh reader.

In order to improve this comparison, and to be sure that what is visualized is really the object for which it is desired to compute the mass, a post-processing step may be performed to correct the topology. For example, to eliminate sources of incoherence: such as holes, non-manifold edges, non-manifold vertices, etc. See Xiao Han, et al., "Topology correction in brain cortex segmentation using a multiscale, graph-based algorithm," Medical Imaging, IEEE Transactions on, vol. 21, no. 2, pp. 109-121, February 2002; Segonne, F., et al., "Geometrically Accurate Topology-Correction of Cortical Surfaces Using Nonseparating Loops," Medical Imaging, IEEE Transactions on, vol. 26, no. 4, pp. 518-529, April 2007.

Figure 5:
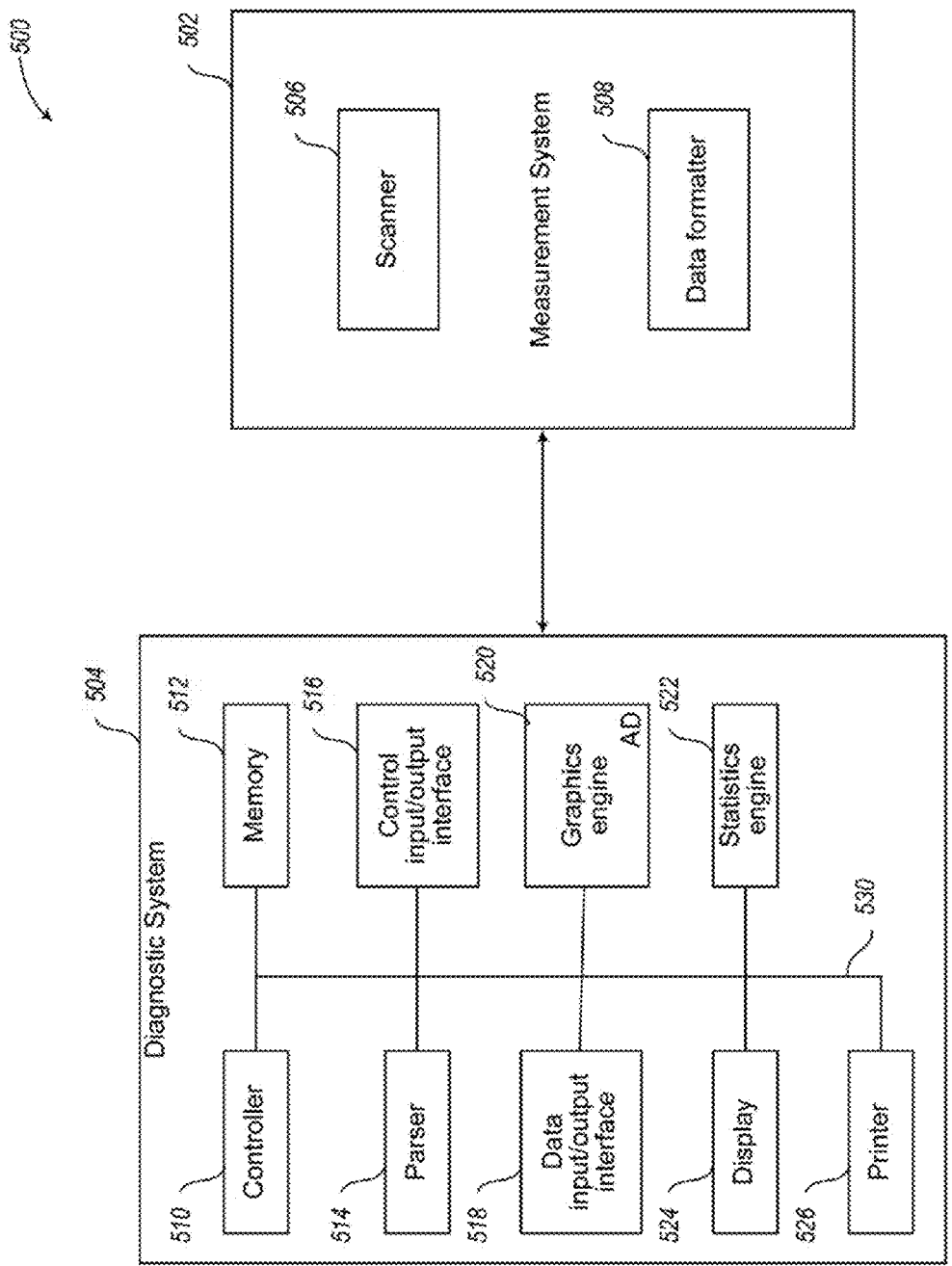
FIG. 5 illustrates an embodiment of a system to determine the mass of an object.

FIG. 5 is a functional block diagram of a system 500 implementing an embodiment of a system to determine a mass of an object. The system 500 comprises a measurement system 502 and a diagnostics system 504. The system 500 is configured to perform one or more of the methods disclosed herein to determine the mass of an object and/or render an image of an object based on data received from the measurement system.

The measurement system 502 measures characteristics of an object, and as illustrated comprises a scanner 506 and a data formatter 508. More than one scanner 506 may be employed, although usually the measurements for a particular sample would be taken with one instrument. Other measurement devices may be employed in the measurement system 502, such as other density sensing devices.

The measurement system 502 may contain a separate data formatter 508 to format the data collected by the measurement system 502. Alternatively, the data formatter 508 may be part of another component of the system 500, such as the scanner 506 or the diagnostic system 504. The data formatter 508 may, for example, format data collected by a scanner 506 into a standard data file format. The data formatting may format the data in a file format representing a set of points in a three-dimensional or other dimensional space, each point having a corresponding voxel representing a value of measured data at the corresponding point. The voxels may represent a density measurement. The measurement system 502 may comprise additional components, such as controllers, memories and/or circuitry and hardware.

The diagnostic system 504 analyzes data received from the measurement system 502, such as by using one or more of the methods discussed in more detail elsewhere herein. In the embodiment illustrated in FIG. 5, the diagnostic system 504 comprises a controller 510, a memory 512, a parser 514, a control input/output interface 516, a data input/output interface 518, a graphics engine 520, a statistics engine 522, a display 524, a printer 526 and a diagnostic system bus 530. The graphics engine may include an asymptotic decider AD. The diagnostic system bus 530 may include a power bus, control bus, and status signal bus in addition to a data bus. For the sake of clarity, however, the various diagnostic system buses are illustrated in FIG. 5 as the diagnostic system bus 530.

The diagnostic system 504 may be physically remote from the measurement system 502. The measurement system 502 may be coupled to the diagnostic system 504 via one or more communication links, such as the Internet, an extranet, and/or an intranet or other local or wide area networks. Similarly, components of the diagnostic system 504 may be physically remote from one another and may be coupled together via communication links, such as the Internet, an extranet, and/or an intranet or other local or wide area networks. There may be one or more diagnostic systems each coupleable to one or more measurement systems. Data from a measurement system may be stored on computer-readable medium and read from the computer-readable medium by the diagnostic system.

The diagnostic system 504 may be implemented in a variety of ways, including as separate subsystems. The diagnostic system 504 may be implemented as a digital signal processor (DSP), a state machine, discrete circuitry, an application-specific integrated circuit (ASIC), or the like, or as a series of instructions stored in a memory, such as the memory 512 and executed by a controller, such as the controller 510, and various combinations thereof. Thus, software modifications to existing hardware may allow the implementation of the diagnostic system 504. Various subsystems, such as the parser 514 and the control input/output interface 516, are identified as separate blocks in the functional block diagram of FIG. 5 because they perform specific functions (e.g., parsing data sets; receiving user input; etc.). These subsystems may not be discrete units but may be functions of a software routine, which will probably, but not necessarily, be separately callable and hence identifiable elements. Any suitable software or combinations of software may be used to implement the diagnostic system 504, including, for example, WinList and/or Java implemented with a Java Run Time Environment or a 3-D Java Run Time Environment. Look-up tables may be employed.

While the illustrated embodiment denotes a single controller 510, other embodiments may comprise multiple controllers. The memory 512 may comprise, for example, registers, read only memory ("ROM"), random access memory ("RAM"), flash memory and/or electronically erasable read programmable read only memory ("EEPROM"), and may provide instructions and data for use by the diagnostic system 504.

Figure 11:
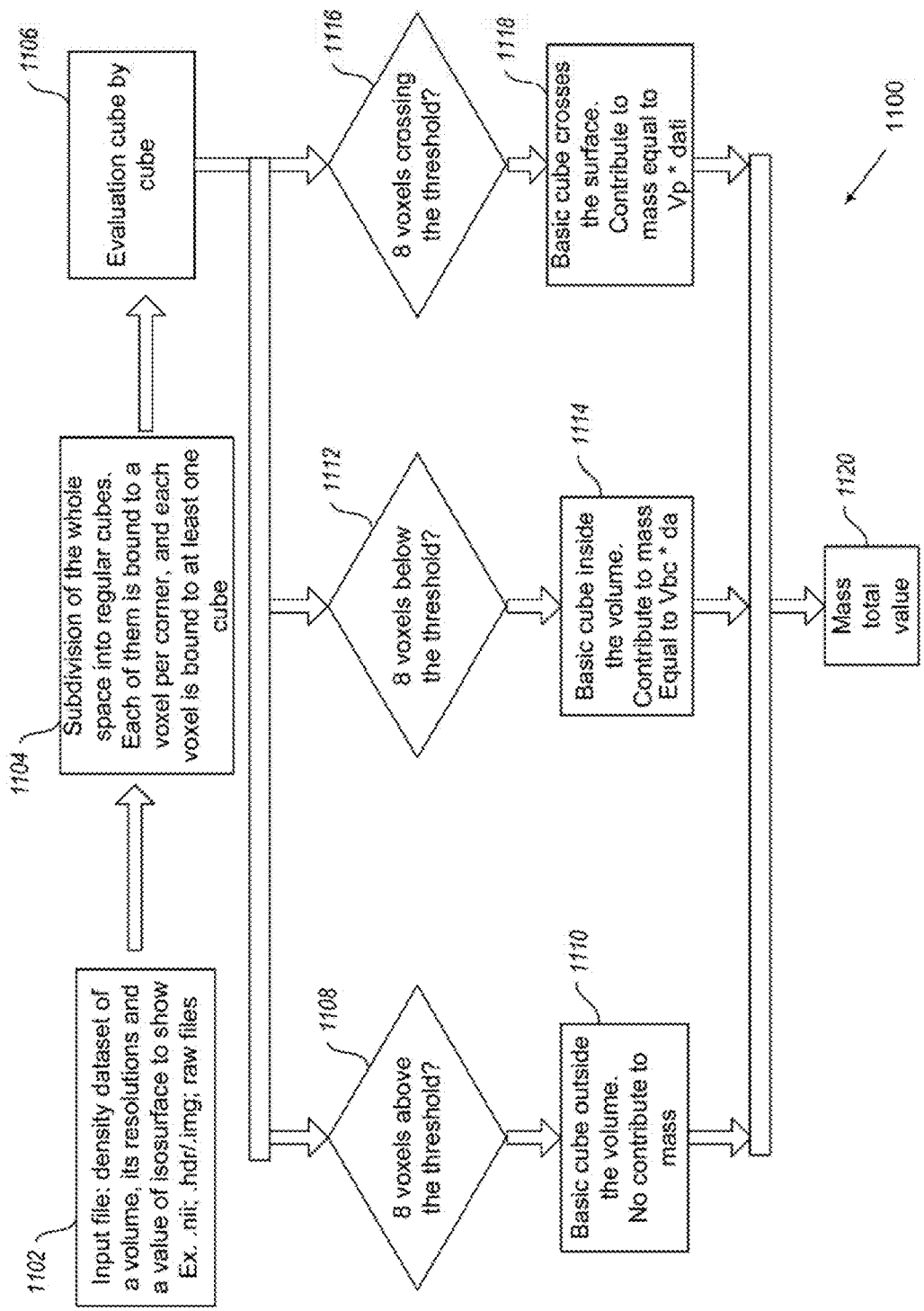
FIG. 11 illustrates an embodiment of a method of computing a mass of an object.

FIG. 11 illustrates an example embodiment of a method 1100 of computing a mass of an object. The embodiment of a method of FIG. 11 may be performed, for example, by using an embodiment of the system of FIG. 5. At 1102, input data is received or retrieved. At 1104, the data space is divided into regular cubes, each corner of each cube having an associated voxel, with each voxel associated with at least one cube. At 1106, each cube is evaluated to determine whether and how the cube contributes to the mass of the object. If it is determined at 1108 that a cube is outside the volume defined by the surface, the cube is determined not to contribute to the mass of the object at 1110. Whether the cube contributes to the volume may be determined by comparing the voxels of the vertexes of the cube with a density input threshold. For example, in some embodiments when all the voxels of the vertexes of a cube are above the threshold, the cube may be determined to not contribute to the density of the object. If it is determined at 1112 that a cube is entirely inside the volume defined by the surface, the cube is determined to contribute to the total mass of the object a mass equal to the volume of the cube times the average density of the cube at 1114. Whether the cube is entirely inside the volume defined by the surface may be determined by comparing the voxels of the vertexes of the cube with a density input threshold. For example, when all the voxels of the vertexes of a cube are below the threshold, the cube may be determined to be entirely inside the volume defined by the surface. If it is determined at 1116 that a cube is crossed by the surface, the cube is determined at 1118 to contribute to the total mass of the object a mass equal to a number of smaller cubes determined to be inside the volume times an average density of the smaller cubes determined to be inside the volume, as discussed in more detail elsewhere herein. Whether the cube is crossed by the surface may be determined by comparing the voxels of the vertexes of the cube with a density input threshold. For example, when some of the voxels of the vertexes of a cube are below the threshold and some of the voxels of the vertexes of the cube are above the threshold, the cube may be determined to be crossed by the surface. At 1120, the contributions of the cubes to the mass of the object are added together. In some embodiments, the contribution may be multiplied by a scaling factor to determine the mass of the object.

Figure 12:
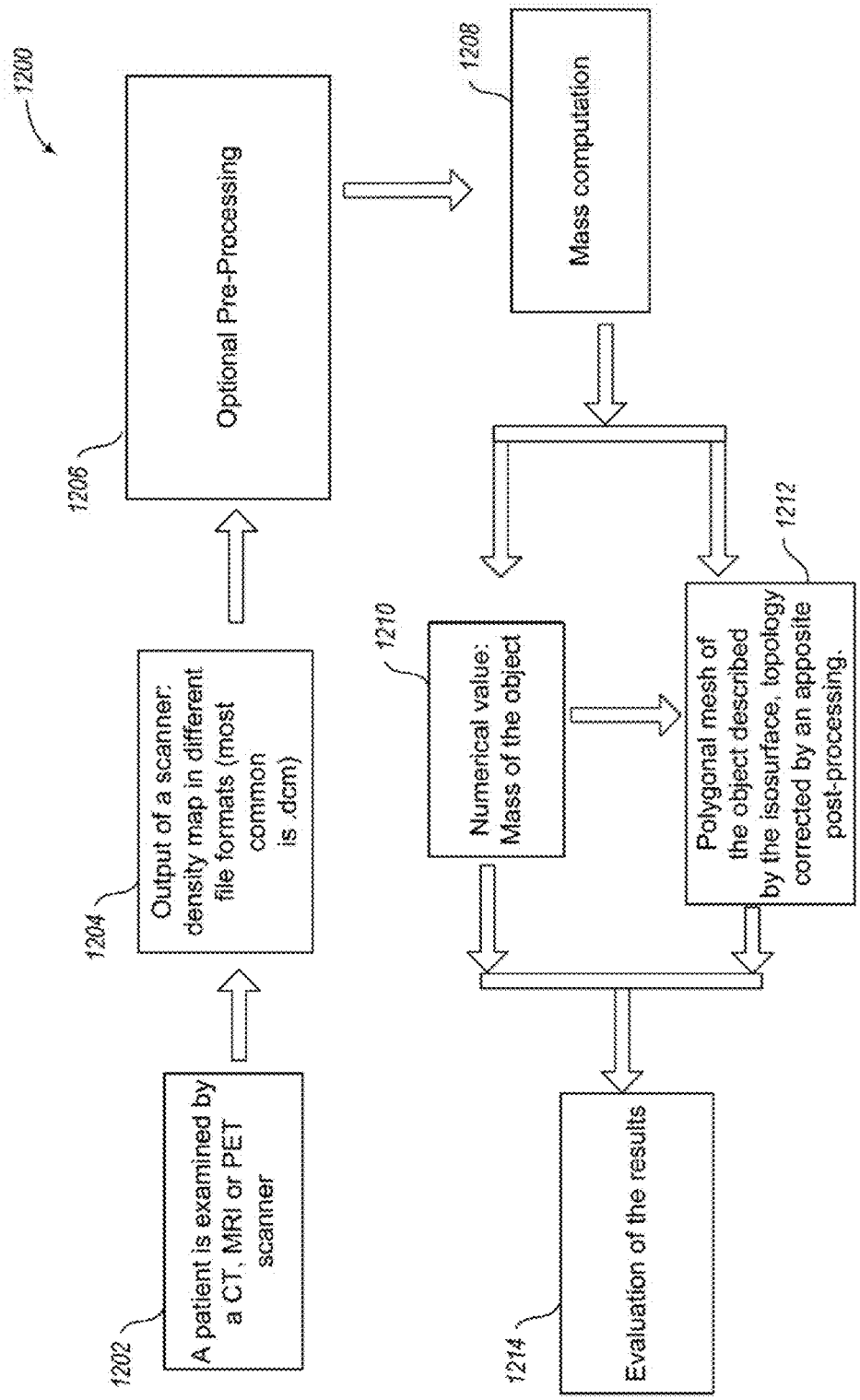
FIG. 12 illustrates an embodiment of a method of providing a mass and rendering an image of an object.

FIG. 12 illustrates an example of a method 1200 of providing a pseudo three-dimension image of an object together with an estimate of the mass of the object. The embodiment of a method 1200 of FIG. 12 may be performed, for example, using an embodiment of the system 500 of FIG. 5. At 1202, a patent or other object is examined using a technique which generates density information, such as a CT, CAT, MRI or PET scan. At 1204, an output of the scan is produced, for example in a .dcm (DICOM) file format. Other file formats may be employed, including hdr/.img (Analyze 7.5 format); .nii (NIfTI format); .PAR/.REC (Philips); .ima (Dicom-like); etc. These files may be produced directly by a scanning machine. The formats may save one file per slice, may save all the data regarding a scan in a single file, may divide a dataset into files related to the type of information stored (e.g., header information in one file and raw data in another), etc.

At 1206, optional pre-processing of the data file or files is performed, such as changing of the file formats, segmentation of the files, receiving user input, etc., and various combinations thereof. The pre-processing may be based at least in part on user input. For example, user input may be provided to set and/or to adjust the threshold. At 1208, the mass of the object is determined, for example by using the method 1100 of FIG. 11. At 1210 the mass of the object is provided. At 1212 a rendering of the object is provided, for example based on a marching cubes algorithm. Other and/or additional image rendering methods may be employed in some embodiments (e.g., a modified MC algorithm as disclosed herein may be employed to determine the mass, and a volume-based rendering method may be employed to render an image). At 1214, the results are evaluated. The evaluation may include automated and manual evaluations of the data, as well as combinations thereof. For example, masses below and/or above a threshold may be automatically disregarded, may automatically trigger an alarm, etc.

Example embodiments in the field of medical diagnostics are discussed below. In the described embodiments, further modifications are made to the MC methods. Some embodiments of the modified MC methods may also determine the mass of an object employing the methods disclosed herein, and the modified methods may be employed in non-medical applications.

Medical data sets generated, for example, by scanners are generally comprised of a set of slices, each of which is a gray-scale image. The grey-level of a voxel is generally proportional to a density of that portion of the space associated with the voxel. Thus, the datasets may be viewed as a density map of a portion of the space, comprising a flow of density values translated into a grey-level to facilitate viewing the datasets on a screen. Since MC builds a surface mesh, which can be considered a volume boundary. As discussed above, the inventors have realized it is possible to determine the mass of an object by modifying the MC algorithm.

Embodiment of a Brain Extraction Tool (BET)

1.1 Simple Description of the Processing Pipeline

Figure 13:
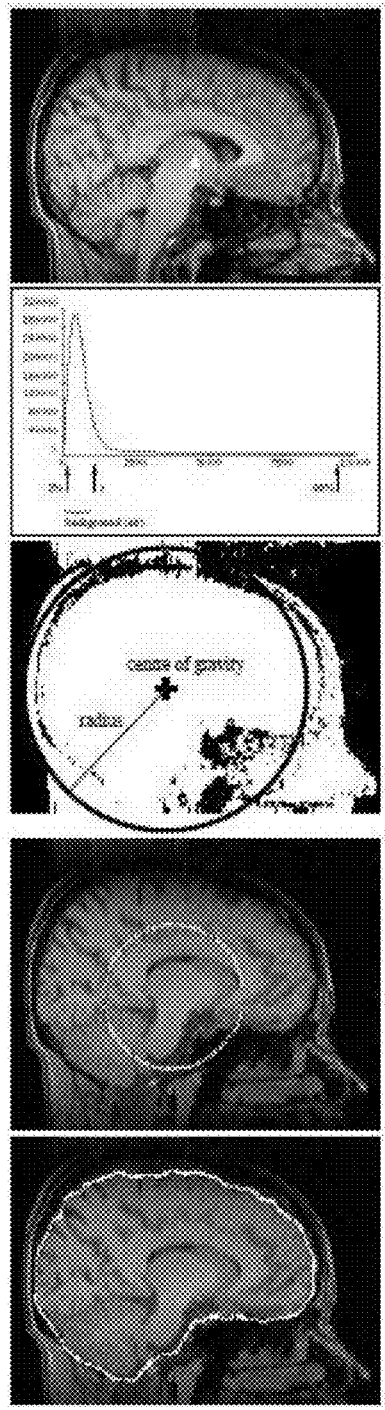
FIG. 13 illustrates an embodiment of a method of generating a mesh of a brain or a portion of a brain.
Figure 13:
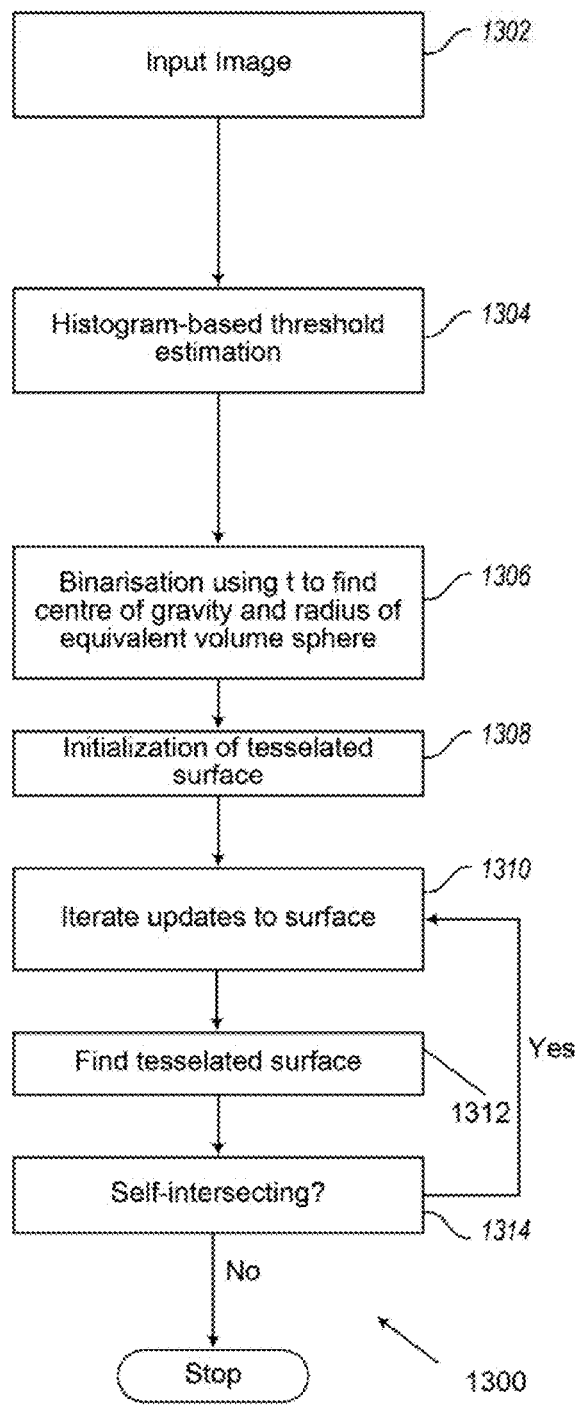

FIG. 13 illustrates an embodiment of a method of defining a mesh based on a dataset, for example, an MRI dataset of an image of a brain. An overview of an embodiment is first discussed with reference to FIGS. 13 and 14, and then examples of the steps are discussed in more detail. An MRI dataset (for example, a dataset generated by a measurement system such as the measurement system 502 of FIG. 5) is received or retrieved at 1302. At 1304, an intensity histogram over the dataset is calculated to find the lower and upper bound of intensity for the image and a rough threshold to distinguish brain/non-brain portions is computed based on the two boundary values. For example, a minimum intensity $t_2$ may be determined, a maximum intensity $t_{98}$ may be determined, and a rough threshold t may be determined based on the minimum $t_2$ and maximum $t_{98}$ intensities.

At 1306, the center of gravity (COG) of the 3-D head image is found, together with a roughly estimated radius r of the head in the image. The center of gravity COG may be estimated based on the voxels with intensities between t and $t_{98}$. The intensities of the voxels may be used as weighting factors for their positions. The radius r provides a rough estimate of the brain and head size. A medium intensity $t_m$ may be determined for all points lying within a sphere of radius r centered on the center of gravity COG.

Figure 14:
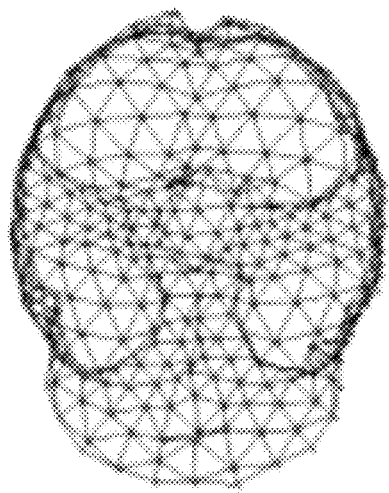
FIG. 14 illustrates an embodiment of forming a mesh of a brain using triangular tessellation.
Figure 14:
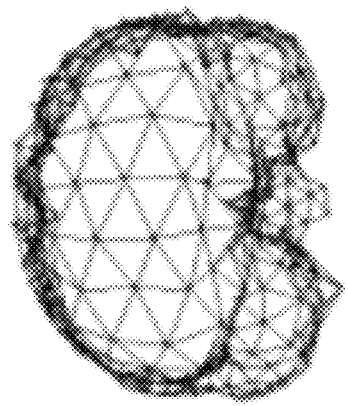
Figure 14:
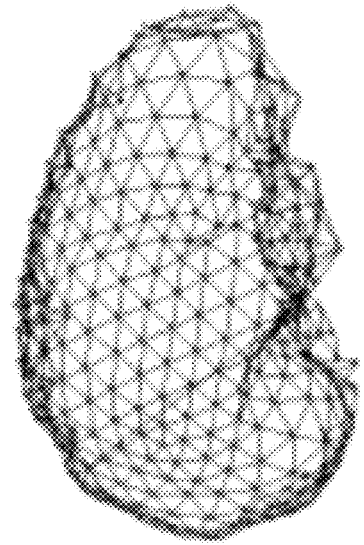

An initial sphere mesh is created inside of the brain and tessellated with triangles at 1308. For example, an initial sphere centered on the COG and having a radius r/2 may be employed. As shown in FIG. 14, triangular tessellation of the icosohedron may be performed. Each triangle may be subdivided into four triangles. The process may be repeated until the desired complexity is achieved.

At 1310, the mesh may be slowly deformed with one vertex at a time, for example following a pre-set update rule, towards to the edge of the brain, while keeping the surface well-spaced and smooth. Each vertex's distance from the center may be adjusted to form as spherical a surface as desired. After the deformation process is completed (e.g., after a selected number of iterations is completed, after an error criteria is satisfied, etc.), a tentative tessellated surface is defined for the brain at 1312. At 1314, an optional self-intersection test is applied. If a self-intersection appears in the outputs, the deforming process may be repeated, for example with a more strict smoothness constraint. If no intersection appears, the tessellated mesh may be determined to be the mesh representing the image (and the volume) of the brain. The mesh determined to represent the image of the brain may be employed to determine the mass of the object (e.g., using the modified MC process discussed herein to sum the mass contribution of cubes contained entirely within the tessellated mesh and the contribution of cubes cut by the surface of the tessellated mesh). The process may be applied to other objects, and modified as appropriate based on the characteristics of the objects (e.g., an initial radius may be set to be less and/or more than an expected radius of an object, such as a pipe or iron bar, embedded in concrete; a default number of iterations may be modified; etc.; and various combinations thereof).

Figure 15:
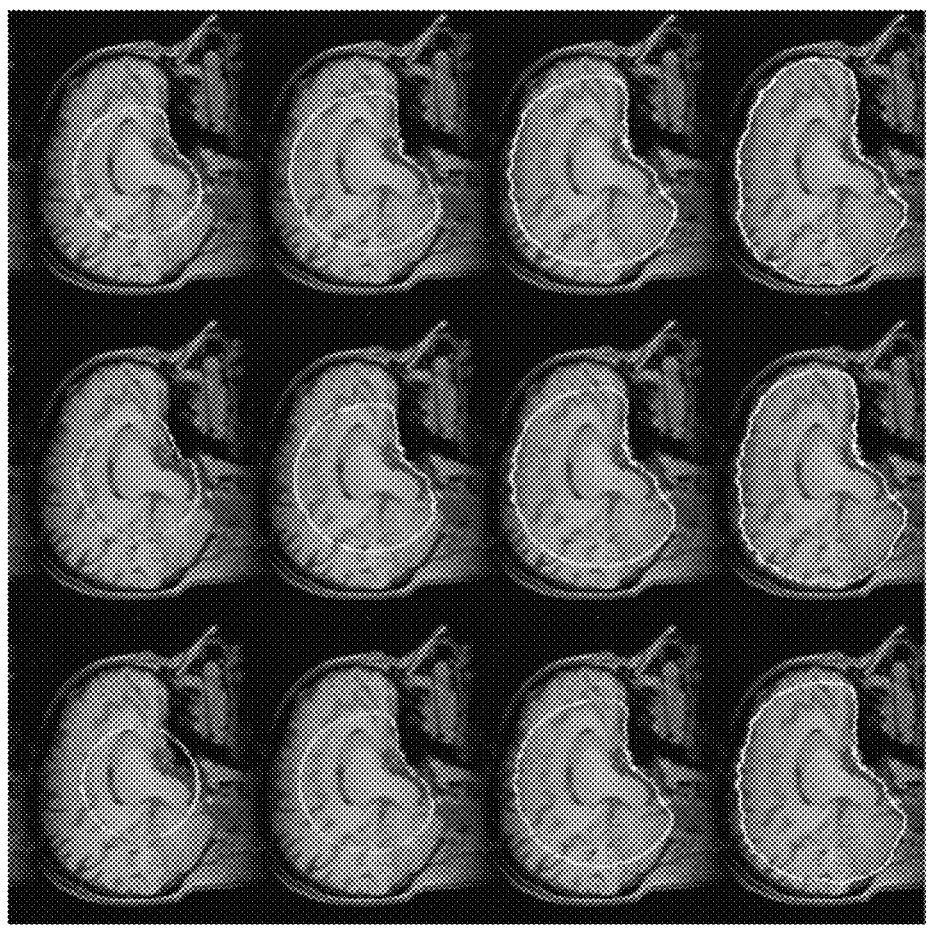
FIG. 15 illustrates example magnetic resonance head images with a white line tracking the outline of the portion of the brain.

FIG. 15 illustrates magnetic resonance head images with a white line tracking the outline of the portion of the brain through selected iterations of a tessellation process.

1.2 Initialization of 3-D Deformable Model According to an Embodiment 1.2.1 Estimation of Basic Image and Brain Parameters Based on the intensity histogram of the MRI dataset, a minimum and maximum intensity are estimated by ignoring the long tails of the two sides. For example, the minimum intensity $t_2$ is the intensity below which lies 2% of the cumulative histogram and the maximum intensity $t_{98}$ is the intensity above which lies 98% of the cumulative histogram. The two values are used to remove the unexpected high intensity "outlier" voxels; for example, a DC spike from image reconstruction, or arteries, which often appear much brighter than the rest of the image. The threshold t may be determined, for example, to be a value 10% of the distance between $t_2$ and $t_{98}$ as follows:

$$t = t_2 + 0.1(t_{98} - t_2)$$

The threshold t may be selected in other manners, such as based on user input, using a different percentage of the distance, etc., and various combinations thereof.

The rough brain region may estimated by including all the vertexes with intensities above t and the COG is estimated using all voxels inside the region with a standard weighted sum of positions. Then the radius of brain/head in the image is roughly estimated making no distinction between the brain or the head. All voxels with intensity greater than t are counted, and a radius is found, taking into account voxel volume, assuming a spherical brain. A median intensity $t_m$ is determined, for example by estimating all points within a sphere of the estimated radius and centered on the estimated COG.

1.2.2 Initialization of Surface Model

After locating the COG, the surface modeling is initialized by surface tessellation using connected triangles. The initialization starts with triangular tessellation of icosahedrons. Each triangle is iteratively divided into four smaller triangles (see FIG. 14), while adjusting each vertex to make the surface as spherical as possible, until the desired complexity is achieved. The spherical tessellated surface is initially centered on the COG; the radius is set to half of the estimated brain/head radius. To make incremental and small adjustments, the vertex positions may not be constrained to the voxel grid points, and may be real and floating positions. Interpolation may be employed to determine grayscale values to associate with vertex positions.

1.3 Deformable Rules for Tessellated Surface 1.3.1 Basic Vectors

To achieve a well-formed and smooth surface of brain, each vertex may be moved to a place estimated by update rules. The update may typically comprise many iterations and the adjustment of each pixel in each iteration may be very small, compared to the distance between neighboring vertices. In each iteration, a small movement vector u is determined for each vertex and applied. A well-formed surface may typically be achieved in 1000 iterations in an embodiment.

Figure 18:
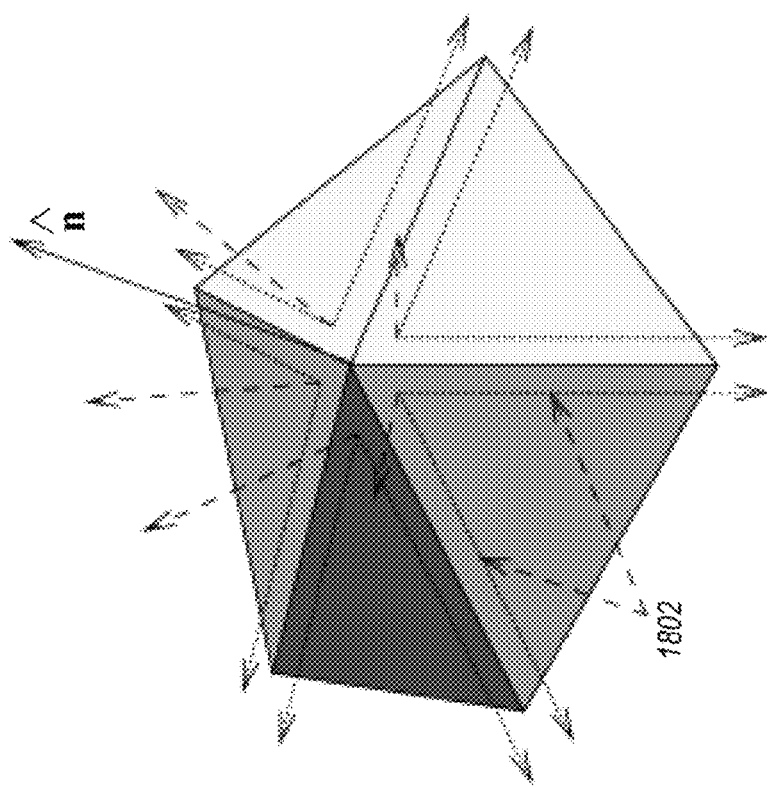
FIG. 18 illustrates vector pairs from a central vertex to consecutive neighboring vertexes.

In an update step, a tuple of neighboring vertex are considered: the operating vertex and its neighboring vertex. The local surface normal $\hat{n}$ is calculated by taking the product vector of the tuple of vectors and scaling to unity. FIG. 18 illustrates five pairs 1802 of vectors from the central vertex to consecutive neighboring vertices.

Figure 19:
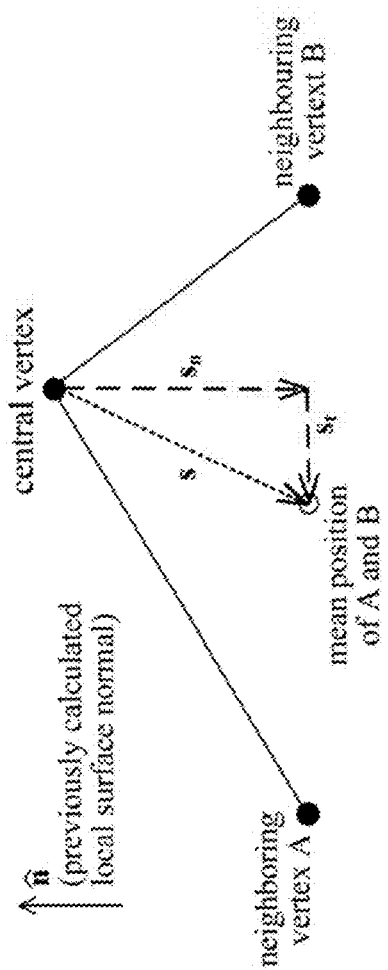
FIG. 19 illustrates normal and tangential components to a local surface.

The next step of an iteration is to calculate the mean position of all vertices neighboring the vertex in question. This is used to find a difference vector s, the vector that takes the current vertex to the mean position of its neighbors. This vector may be minimized for all vertices (by positional updates), which facilitates producing a smooth surface having equally-spaced vertexes. Also, due to the fact that the surface is closed, the surface may gradually shrink. Then, s is decomposed into orthogonal components, normal $s_n$ and tangential $s_t$ to the local surface, as shown in FIG. 19. The normal $s_n$ and tangential $s_t$ components may be determined as follows:

$$s_t = s - s_n \quad (1)$$

$$s_n = (s \cdot \hat{n})\hat{n} \quad (2)$$

1.3.2 Update Components

Based on the two orthogonal components $s_n$ and $s_t$, the update rule may be represented by 3 update components.

The first update component $u_l$ represents movement within the local surface, and facilitates keeping the vertices in the surface substantially equally spaced. Therefore, $u_l$ is only dependent on $s_t$. To achieve small and stable updates in every iteration, $u_l$ may be a rescaled value of $s_t$, which may be simply multiplied by a weighting factor, such as ½.

$$u_l = s_t/2 \quad (3)$$

Then, in each update iteration, the vertex tend to be placed with an equal distance in the surface.

The second component $u_2$ moves the vertex along the local surface normal, which is to adjust the current vertex in line with its neighboring vertex to enhance the smoothness of the surface. Thus, $u_2$ may be derived from $s_n$, multiplied by a weighting factor $f_2$.

$$u_2 = f_2 s_n \quad (4)$$

Figure 20:
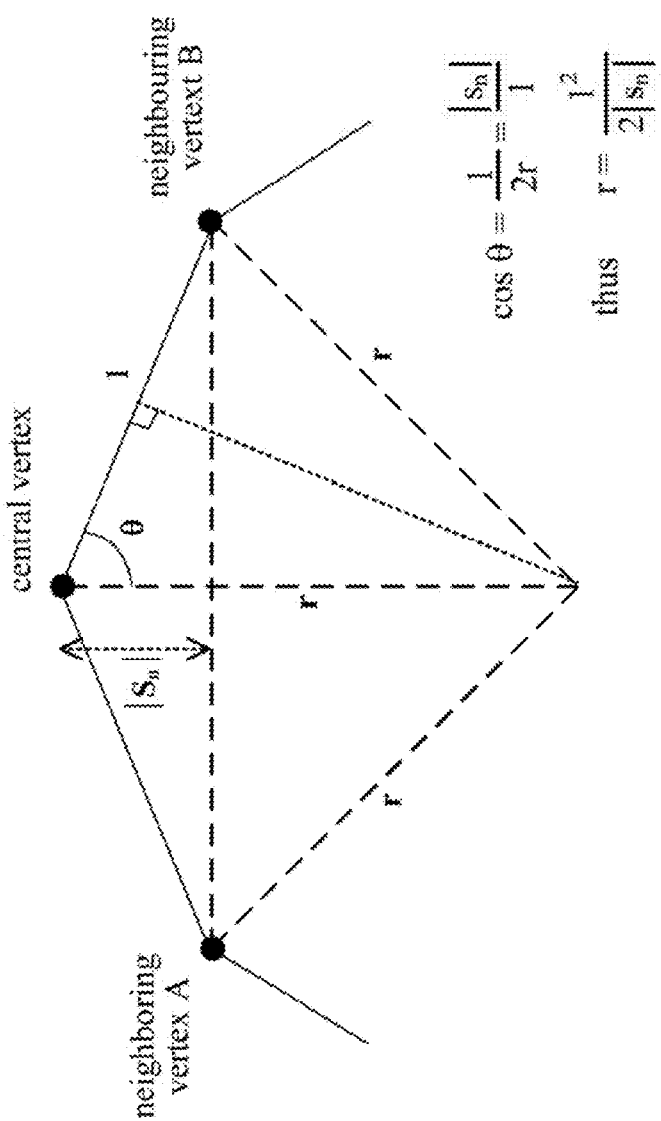
FIG. 20 illustrates a relationship between local curvature, vertex spacing and a perpendicular component of a difference vector.

For simplicity, $f_2$ can be set as a constant fraction like the case in the first update component. However, the real situation might be more complex. To avoid an undesired high curvature in the final model, an embodiment may over-weight the smoothing factor $f_2$ to the update component which assures a stable and smooth surface of the brain or other object of interest. The consequence of the emphasis on eliminating of high curvature may lead to an over-smoothed surface, in which the curvature is underestimated in some parts (the low curvature parts), e.g., "cutting of corners". In an embodiment, an improvement is to use a nonlinear equation for $u_2$, which smoothes high curvature in the surface model with a weak effect and low curvature with a strong effect. To explore a nonlinear function, the local radius of curvature r is determined, with:

$$r = \frac{l^2}{2|s_n|} \quad (5)$$

Where l is the mean distance from a vertex to its neighbor across the whole surface. The relationship between local radius of curvature r, vertex spacing l and the perpendicular component of the difference vector $|s_n|$ is illustrated in FIG. 20.

Now, the update function can be presented as a sigmoind function:

$$f_2 = (1 + \tan h(F^*(1/r - E)))/2 \quad (6)$$

Where E and F control the scale and offset of the sigmoid. A minimum radius $r_{min}$ and maximum radius $r_{max}$ of curvature is set: below the smoothing is heavy; whereas above $r_{max}$ the smoothing is light. This facilitates removing highly curved features while keeping the corners with low curvature. The value of $r_{min}$ and $r_{max}$ may be derived from empirical values (e.g., $r_{min} = 3.33$ mm and $r_{max} = 10$ mm) suited for typical geometries found in human brain. Other values for $r_{min}$ and $r_{max}$ may be selected for typical geometries of other objects of interest. Thus, E and F may be set as:

$$E = (1/r_{min} + 1/r_{max})/2 \quad (7)$$

$$F = 6/(1/r_{min} - 1/r_{max}) \quad (8)$$

The third component $u_3$ deforms the surface model fit to the real brain surface.

First, along a line pointing inward from the current vertex, the minimum and maximum intensities are found:

$$I_{min} = \text{MAX}(t_2, \text{MIN}(t_m, I(0), I(1), \ldots, I(d_1))) \quad (9)$$

$$I_{max} = \text{MIN}(t_2, \text{MAX}(t, I(0), I(1), \ldots, I(d_2))) \quad (10)$$

Where $d_1$ and $d_2$ determine respectively how far into the brain to search for the minimum and maximum intensity. For a human brain image, $d_1$ and $d_2$ may typically be set as $d_1 = 20$ mm and $d_2 = d_1/2$, and may be empirically optimized. The selected values reflect the relatively larger spatial reliability of the search for maximum intensity compared with the minimum. Thresholds $t_m, t_2$ and t are used to limit the effect of very bright or very dark voxels. Since intensities are described as floating in an MRI image dataset, nearest neighbor interpolation of intensity may be employed, which may be optimal compared to trilinear or higher order interpolations.

Now, a locally appropriate intensity threshold is used to distinguish between brain and background:

$$t_1 = (I_{max} - t_2) * b_t + t_2 \quad (11)$$

The threshold $t_1$ lies a determined fraction of the way between the global robust low intensity threshold $t_2$ and the local maximum intensity $I_{max}$, according to fractional constant $b_t$. This constant is a parameter that a brain extraction algorithm may receive as an input. A default value of 0.5 has been found to give excellent results for most input brain images. For certain image intensity distributions it may be varied (for example, in the range 0-1) to give optimal results. The necessity for this is rare, and for an MRI sequence that benefits from changing $b_t$, one value normally works well for all other images taken with the same sequence. A third fraction is calculated as:

$$f_3 = \frac{2(I_{min} - t_1)}{I_{max} - t_2} \quad (12)$$

The constant 2 is used to control the value of $f_3$ in the range of $-1$ to $1$. If $I_{min}$ is lower than $t_1$, it gives a negative value for $f_3$ and causes the surface to move inward at a current point; otherwise, the surface moves outward.

Meanwhile, the balance between the smoothness term and the intensity-based term may be found by simply multiplying another empirical factor $0.05f_3 l$, where the l represents the mean intensity-based inter vertex distance. Then, the third update component is:

$$u_3 = 0.05 f_3 l \vec{s}_n \quad (13)$$

From the above discussion, each components may be presented with appropriate weights before the two orthogonal components $s_n$ and $s_t$, given appropriate weights for each components, the components are combined and generate the update vector u:

$$u = 0.5 s_t + f_2 s_n + 0.05 f_3 l \vec{s}_n \quad (14)$$

1.4 Smoothness Increase

To increase the smoothness of the resulting sphere mesh, intersection checking may be employed. One option is to check for intersections after each iteration, for example by comparing the position of each vertex with that of every other vertex. This, however, may be computationally expensive. Another option is to perform the algorithm, and then perform a self-intersection check. If the surface is found to self-intersect, the algorithm may be re-run with, for example, higher constraints for the first 75% of the iterations. The remaining iterations are run with lower constraints (e.g., dropping down to the original level over the iterations). The checking for self-intersections and the re-running when a self-intersection is detected may be repeated until there is no self-intersection detected or some other error criteria is satisfied. It is noted that self-intersections were rarely detected. Thus, an embodiment may omit self-intersection checking.

Figure 21:
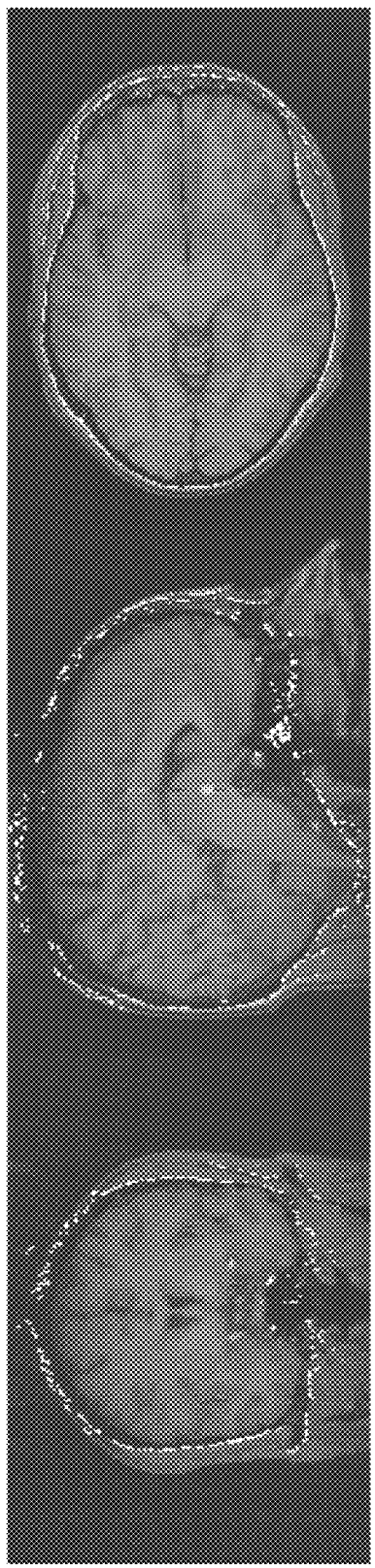
FIG. 21 illustrates examples estimates of the exterior surface of a skull.

In an embodiment, an estimate of the exterior skull surface may be provided. A search outward from the brain surface along a line perpendicular to the local surface is conducted. A maximum intensity and its position on the line are recorded, as well as a minimum intensity on the line. The search may be limited, for example, to a distance of 30 mm. If the maximum intensity is not greater than the threshold t, the search at this portion of the local surface may be discontinued, as this may be an indication of a signal loss at an image extreme, for example at the top of the head. A point at a greatest distance from the brain surface which has low intensity and which maximizes $d/30 - l(d)/(t_{98} - t_2)$ is identified. From the identified point, a search outward is conducted to the location of the maximum intensity. The point at which a first maximum intensity gradient is found is the estimated position of the exterior surface of the skull. The resulting set of points as the process is continued for additional local surfaces of the brain surface should be close to the exterior surface of the skull. FIG. 21 illustrates examples estimates of the exterior surface of a skull.

Figure 22:
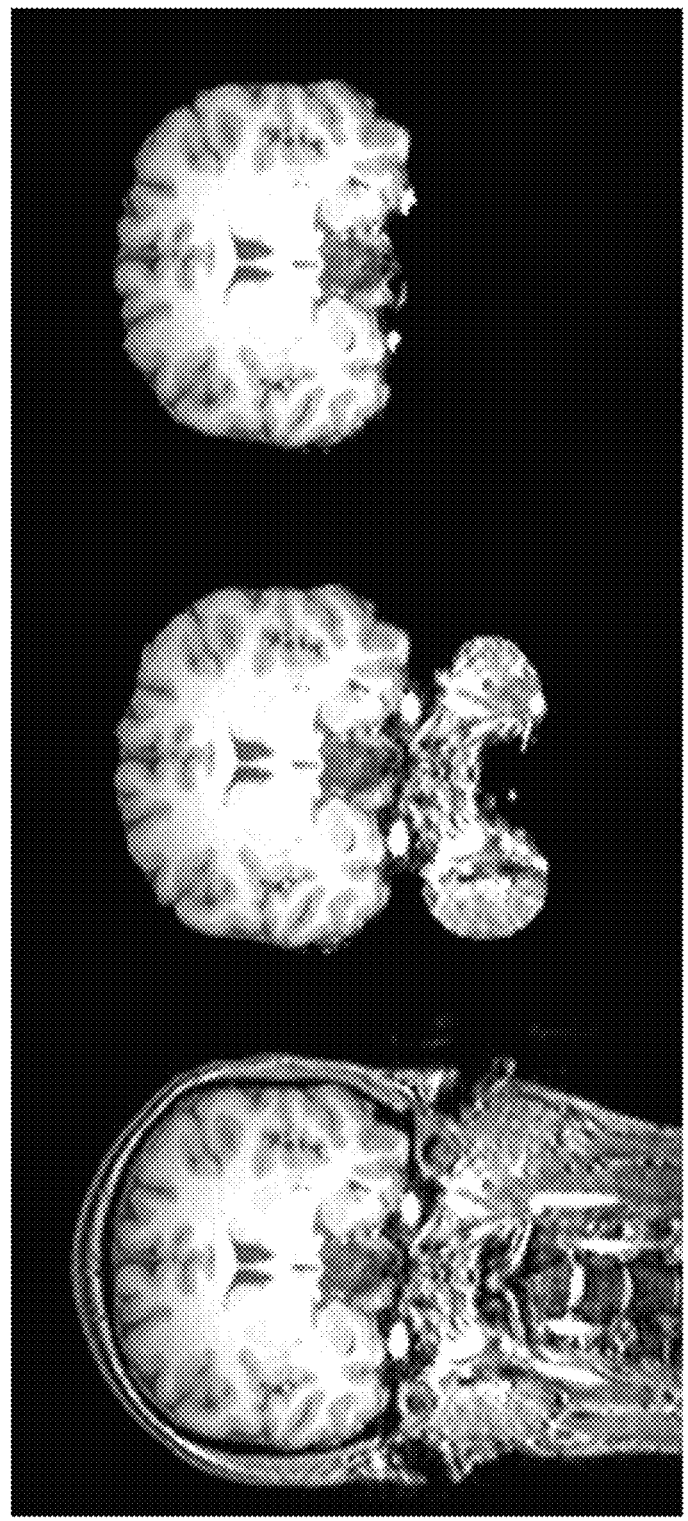
FIG. 22 illustrates application of a segmentation routine to an image.

Sometimes the brain center of gravity COG differs from the scan center of gravity. This may indicate the brain extraction tool has included unwanted tissues. For example, the scan field of view may be large enough to capture the whole head and some of the neck. A recursive algorithm may be employed in an embodiment to address this issue. The head image H is re-sliced into the axial plane. The COG coordinates x of H are set to a starting value $x_0$. The head image H is segmented with the COG equal to x. The brain may be segmented, for example based on user input, selection of one or more density threshold, application of the brain extraction algorithm, etc., and various combinations thereof. This produces an extracted brain B. The coordinates of the COG x' of the extracted brain B are determined and compared to the previous COG x. If an error criteria is satisfied, B is set as the segmentation. For example, if a Euclidean distance between x and x' is less than half the diagonal of an image voxel, the algorithm may terminate and B may be set as the brain segmentation. Otherwise, x is set equal to x' and the segmentation process is repeated. FIG. 22 illustrates application of the segmentation routine to an image, with an initial image on the left and a final segmentation on the right. The process may be further enhanced to reduce intensity inhomogeneity. See Sled, et al., "A nonparametric method for automatic correction of intensity non-uniformity in MRI data," IEEE Transactions of Medical Imaging 17, 1, 87-97 (1998).

FIG. 23 illustrates a comparison of the brain extraction tool of an embodiment to other brain extraction algorithms to process standard 256*256 medical datasets, such as Statistical Parameter Mapping ("SPM"), Minneapolis Consensus Strip ("McStripe"), Brain Surface Extractor, Subject Specific ("BSE"), and BSE, fixed. The embodiment of the brain extraction tool does not need pre-registration, and has a relatively high accuracy and speed, as shown in FIG. 23. As noted above, the brain extraction tool may be enhanced using image enhancement techniques, such as intensity inhomogeneity correction algorithms.

Figure 24:
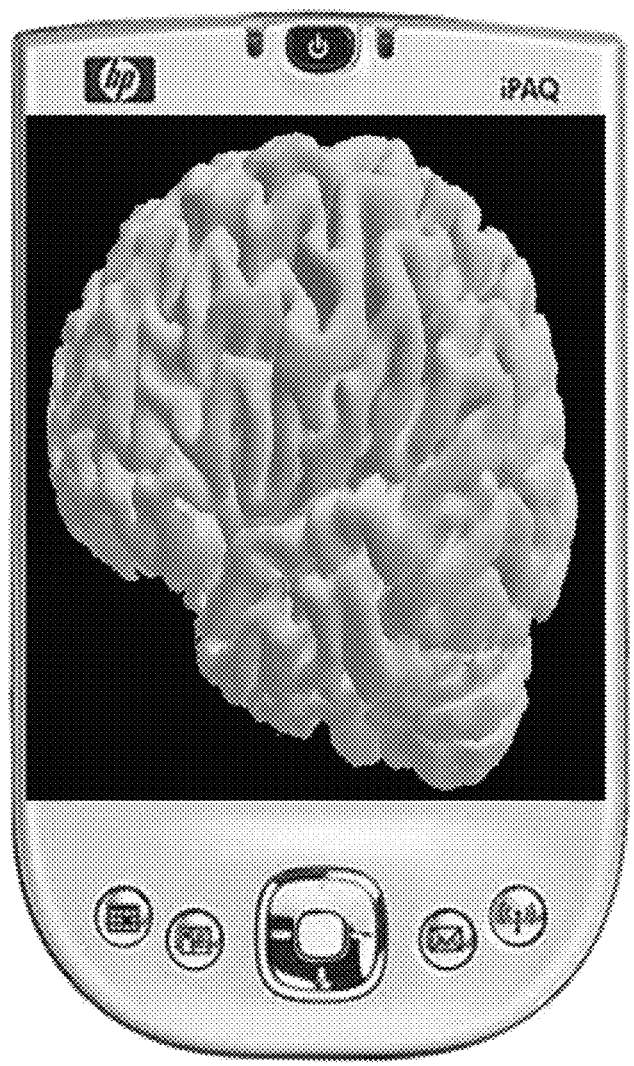
FIG. 24 illustrates a rendering of an image of a brain on a mobile device according to an embodiment.

FIG. 24 illustrates an image of a brain on a mobile device according to an embodiment.

In magnetic resonance imaging (MRI), accuracy of brain structures quantification may be affected by the partial volume (PV) effect. PV is due to the limited spatial resolution of MRI compared to the size of anatomical structures. When considering the cortex, measurements can be even more difficult as it spans only a few voxels. In tight sulci areas, where the two banks of the cortex are in contact, voxels may be misclassified. We propose a new PV classification-estimation method which integrates a mechanism for correcting sulci delineation using topology preserving operators after a maximum a posteriori classification. Additionally, we improved the estimation of mixed voxels fractional content by adaptively estimating pure tissue intensity. Accuracy and precision were assessed using simulated and real MR data and comparison with other existing approaches demonstrated the benefits of our method. Significant improvements in GM classification were brought by the topology correction. The root mean squared error diminished by 6.3% (p<0.01) on simulated data. The reproducibility error decreased by 9.6% (p<0.001) and the similarity measure (Jaccard) increased by 3.4% on real data. Furthermore, compared with manually-guided expert segmentations the similarity measure was improved by 12.0% (p<0.001).

In magnetic resonance imaging (MRI), accuracy of brain structures quantification may be affected by the partial volume (PV) effect. PV is due to the limited spatial resolution of MRI compared to the size of anatomical structures. When considering the cortex, measurements can be even more difficult as it spans only a few voxels. In tight sulci areas, where the two banks of the cortex are in contact, voxels may be misclassified. The inventors propose a new PV classification-estimation method which integrates a mechanism for correcting sulci delineation using topology preserving operators after a maximum a posteriori classification. Additionally, the inventors improved the estimation of mixed voxels fractional content by adaptively estimating pure tissue intensity. Accuracy and precision were assessed using simulated and real MR data and comparison with other existing approaches demonstrated the benefits of an embodiment of the BET method. Significant improvements in GM classification were brought by the topology correction. The root mean squared error diminished by 6.3% (p<0.01) on simulated data. The reproducibility error decreased by 9.6% (p<0.001) and the similarity measure (Jaccard) increased by 3.4% on real data. Furthermore, compared with manually-guided expert segmentations the similarity measure was improved by 12.0% (p<0.001).

An embodiment of this disclosure is directed to possible diagnosis techniques of osteoporosis, a disease that leads to bone mass loss, which affects particularly older people. The discussion herein focuses on femurs, but other embodiments may focus on other bones and/or non-medical uses.

In conventional analysis of the medical examinations to detect bone loss for the most part the post-processing work is performed manually and is complex and time consuming. In particular, segmentation to separate the soft tissues of the leg from the bone is complex and time consuming. The operator proceeds slice by slice and eliminates voxels not belonging to the bone. The complexity resides especially in finding the border of the bone, taking into account a certain quantity of noise present in an image and a certain number of "uncertain" voxels, when the operator has a doubt about its nature.

This job is extremely complicated due to the definition of the examinations. For example, a CT may typically have 1126 slices, with each slice having a definition of 512×512 voxels. An embodiment at least partially automates this process.

The second phase of this post-processing work-flow is to build a polygonal mesh that reflects, as much as possible, the shape of the external bone. This step may be executed resorting to both manual and automatic contributions, in order the improve the topology usefulness of the mesh itself, and in particular the absence of holes.

This disclosure relates to of a set of tools and algorithms to facilitate automating segmentation, producing as output results comparable with the results obtained conventionally.

Moreover, new and innovative steps are disclosed inside this tool-chain, integrated inside the flow, and example contributions in terms of helping the medical staff make a diagnosis are discussed herein.

In an embodiment, a femur extraction tool ("FET") receives as input a dataset obtained by a density medical scan (typically CT, MRI, etc.) in which the whole leg is present. The FET automatically separates the soft tissues and the bone, eliminating voxels belonging to the soft tissues.

Optionally, the bone may be further segmented in order to isolate the voxels that belong to an external mesh and the voxels that will form an internal mesh (e.g., into an external and an internal set of triangles).

The use of Marching Cubes facilitates building the separate meshes. For example, MC facilitates building a set of meshes one inside the other, like an onion. This facilitates dividing those meshes and choosing the desired mesh or meshes to visualize.

In addition, and as discussed above, during the execution of the Marching Cubes algorithm, the mass of the object lying inside the mesh (or between meshes) may be computed. This is an extremely useful tool for helping the diagnosis of the osteoporosis, since one of the first signals of this disease is a decrease of bone mass.

Figure 31:
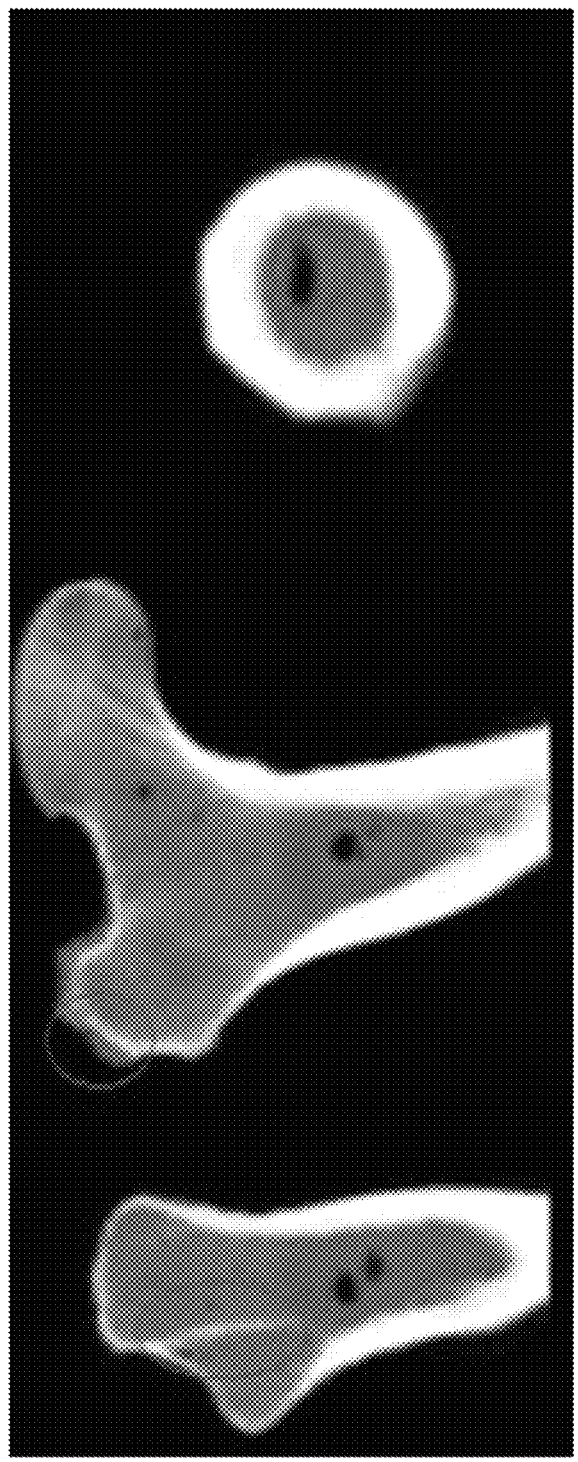
Figure 38:
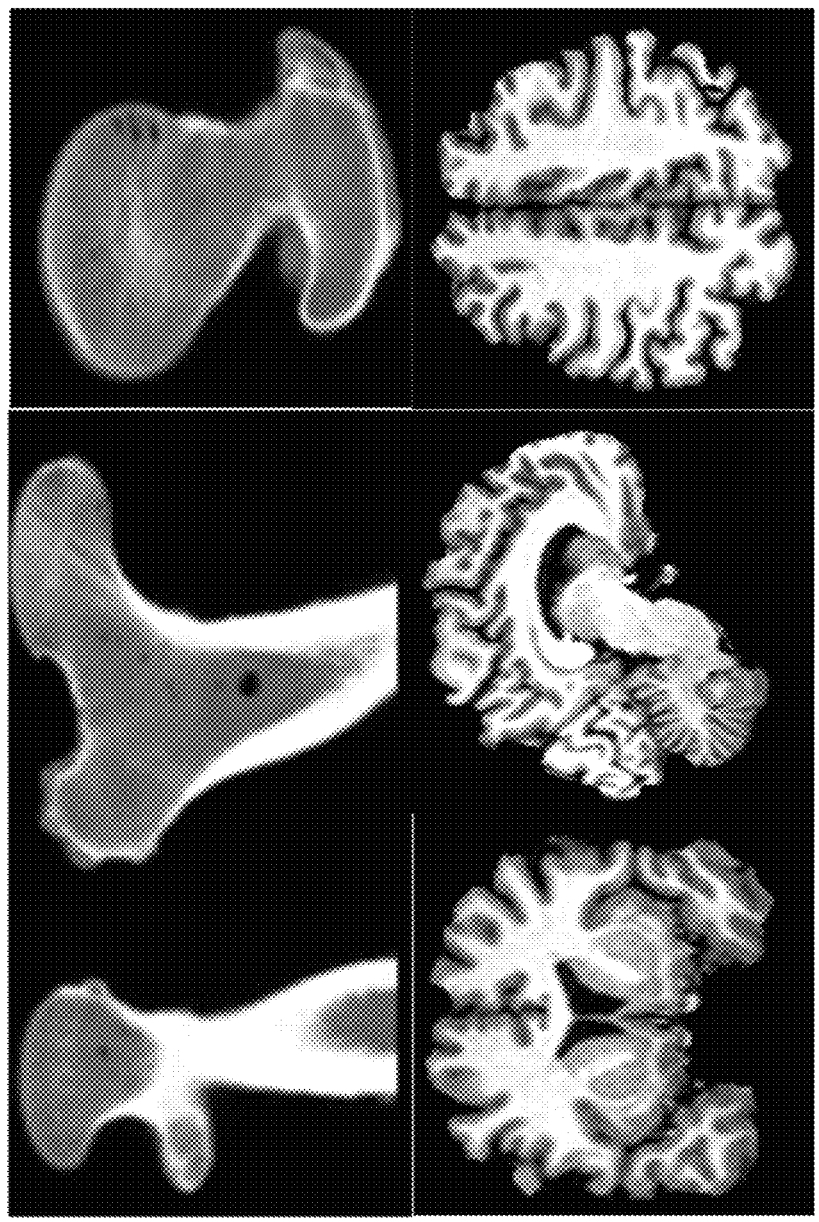
FIGS. 38 and 39 show images of human brains and femurs.
Figure 39:
Figure 39:
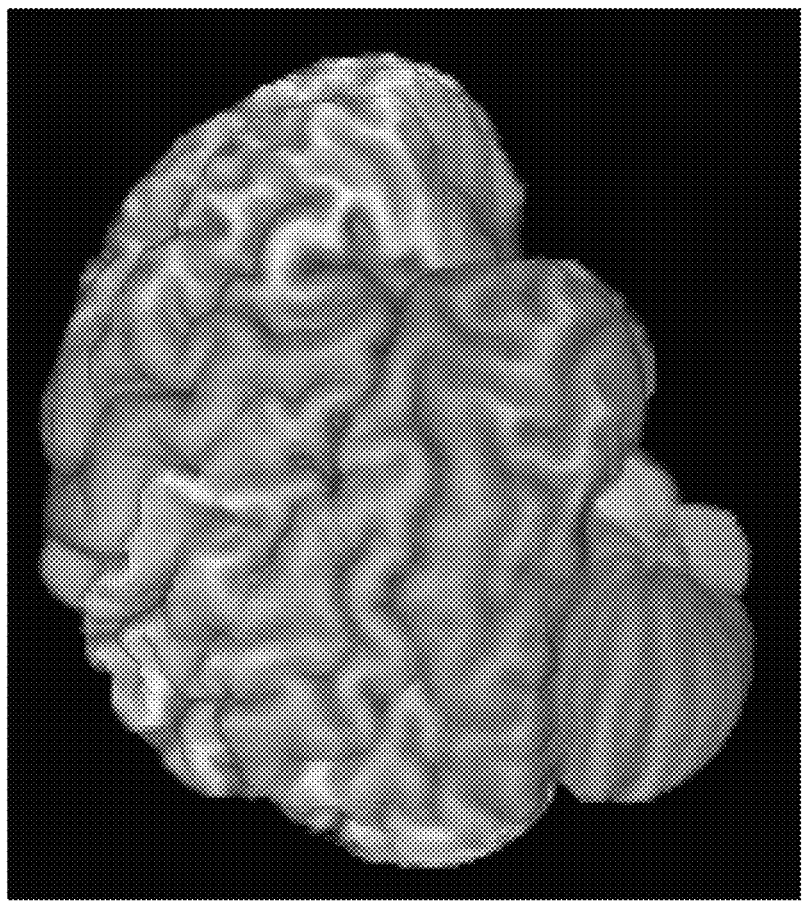

The FET may be viewed as a variation of the brain extraction tool (BET) discussed herein. Thus, the inventors considered some differences between the characteristics of bones and the characteristics of human brains. FIGS. 38 and 39 illustrate femur and brain images. The human brain typically is a sphere-like object with complex channels in the surface, while the human femur is typically a stick-like object with a protruding head and relatively flat body. The typical structure of the femur is an interior of loosely organized trabecular bone and a superficial shell of compact cortical bone. In a brain MRI, the gradient of intensity is generally contiguous from a brighter inside region to a darker surface (with the gray-scale representing density). FIG. 31 illustrates images of human femurs. The interior and superficial bones may have similar intensities in some places, interior bone structures may have similar intensities to as cortical bones, and, in osteoporosis and fracture areas, holes may scatter over the bone indicating very low intensities compared to the superficial shell. The inventors recognized the differences and modified an embodiment of the BET to apply to femur segmentation. For example, the inventors recognized that pre-processing of BET image data to reduce intensity inhomogeneity and to fill holes may produce better results. An embodiment of an FET is discussed in more detail below.

An Embodiment of a FET (Femur Extraction Tool)

The inventors analyzed the issues encountered by a human user manually segmenting bone image data, in particular the complexity and the length. An embodiment at least partially addresses both these issues, obtaining a result comparable with the human output in a reduced time span.

An embodiment modifies brain extraction algorithms, such as the BET discussed herein and those discussed in S. M. Smith, *Fast Robust Automated Brain Extraction, Human brain mapping*, Vol. 17, No. 3, pp. 143-155 (November 2002), based on the inventors' recognition of the differences between brain and bone images and to facilitate the diagnosis of osteoporosis.

An embodiment of an FET is the result of the adaptation of an embodiment of the similar BET in order to be applicable on human bones and on femurs in particular. The input may be a density file (e.g., .ply format, etc.). The FET starts from a simple deformable model that grows and shrinks in order to catch the borders of the bone and discard the voxels of soft tissues or whatever not belonging to the structure of the hard bone. Starting from an initial mesh, the FET may be executed iteratively, using the output of the previous iteration as input for the following one, in order to improve the shape of the resulting mesh and trying to letting the FET converge to an output. The output of an FET of an embodiment are basically two: the mesh of the model modified and as close as possible or as desired to the border of the bone (e.g., satisfying an error criteria), and a binary mask to be applied on the original dataset to decide which voxels should be discarded and which ones to be preserved.

Figure 25:
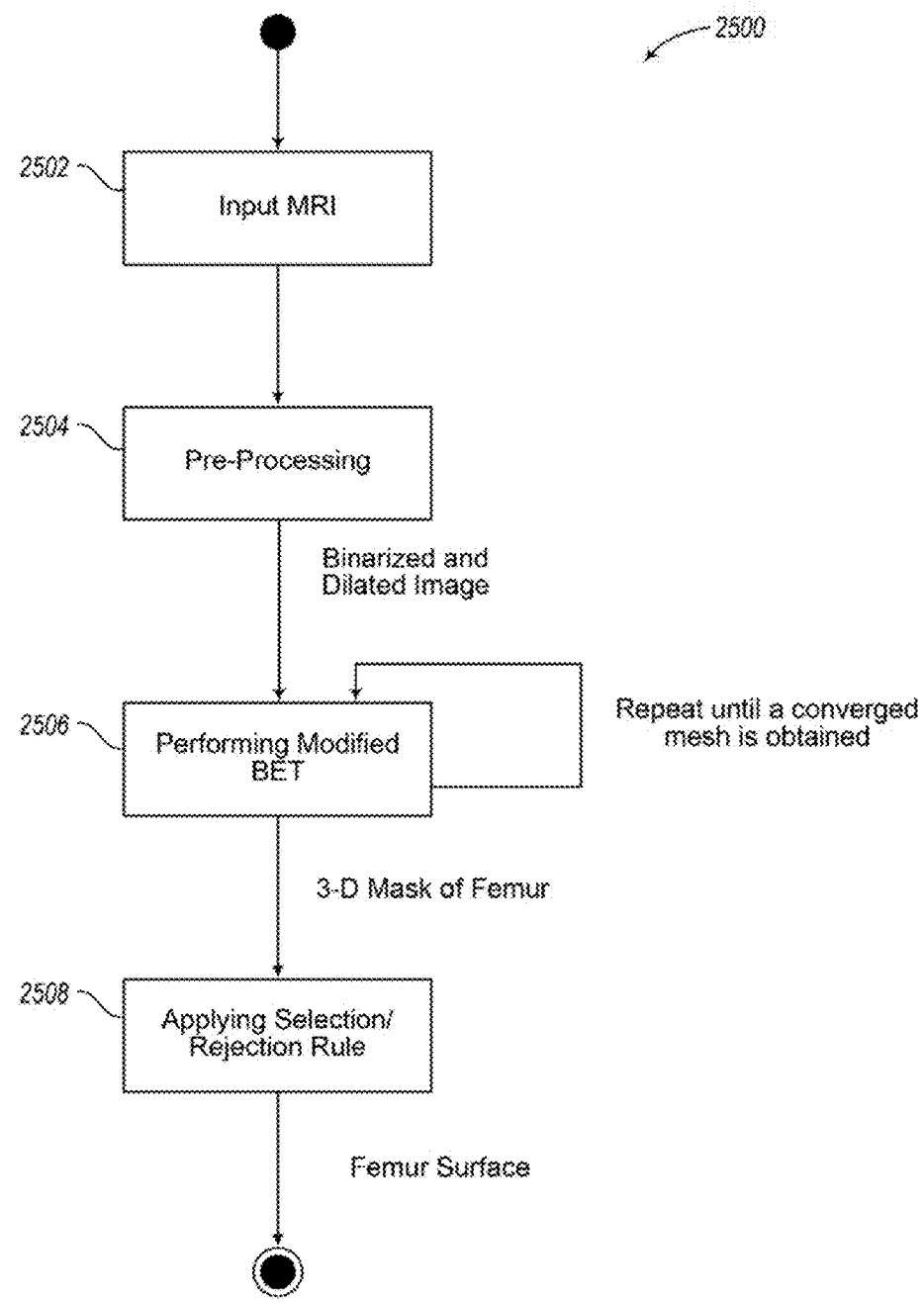
FIG. 25 illustrates an embodiment of a method of a femur extraction tool.

FIG. 25 illustrates an embodiment of a method 2500 of a femur extraction tool. At 2502, input data is received or retrieved, for example, an MRI image dataset is received. At 2504, pre-processing is performed before segmentation to address the low intensities of trabecular bones (which facilitates determining a global threshold for segmentation), and to file holes inside the interior (which facilitates identifying the bone surface). A minimum and a maximum intensity of the dataset is determined and a density threshold is determined based on the two intensities. The image is binarized using the determined density threshold and 3-D dilation is performed. The geometric center of the 3-D femur image is determined, together with a rough estimated radius of an equivalent cylinder representing the femur. An initial cylinder-like mesh with hemispherical caps is created inside of the femur and tessellated with triangles. At 2506, the mesh is slowly deformed, in a way similar to the BET embodiments discussed herein, with modifications of the update rules, such as the modification discussed below. When the deformation is complete, a temporary mesh is created representing the surface of the femur. The mesh is reused as an initial mesh of the deformable model and the modified BET at 2506 is repeated, until a convergence is reached when comparing the temporary mesh with the mesh obtained from the previous iteration, for example, in terms of Hausdorff Distance. Other error criteria, such as other comparison criteria, may be employed. The converged mesh is used to create a 3-D mask. At 2508, the mask is applied to the original MRI dataset with a simple selection/rejection rule to recover the 3-D shape of femur. The result is a Femur surface mesh.

Figure 26:
FIG. 26 illustrates images of a femur.
Figure 26:

FIG. 26 illustrates application of an embodiment of an FET with respect to a single slice of an MRI image. The left side of FIG. 26 shows a CT slice taken from a leg and the right side shows an example output of the FET, which has eliminated soft tissues, preserving the bone, which is the central body already visible in the first picture.

Figure 43:
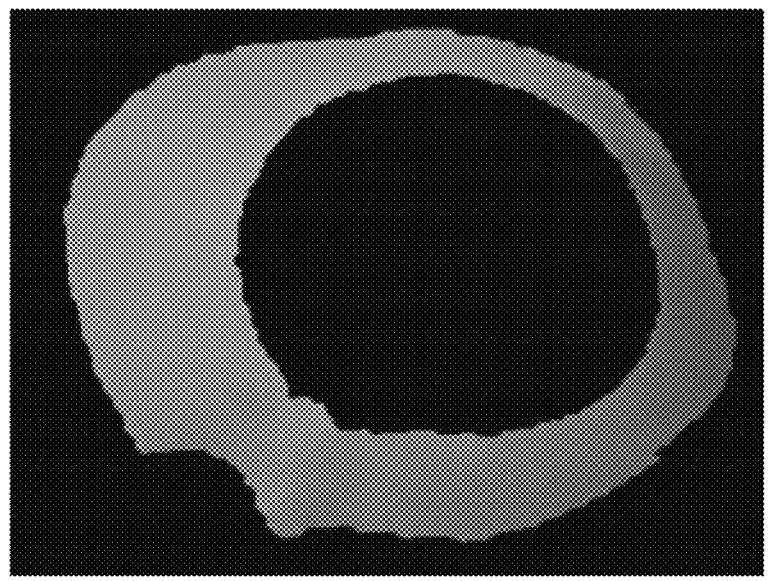
FIG. 43 shows an image of a femur slice.
Figure 43:
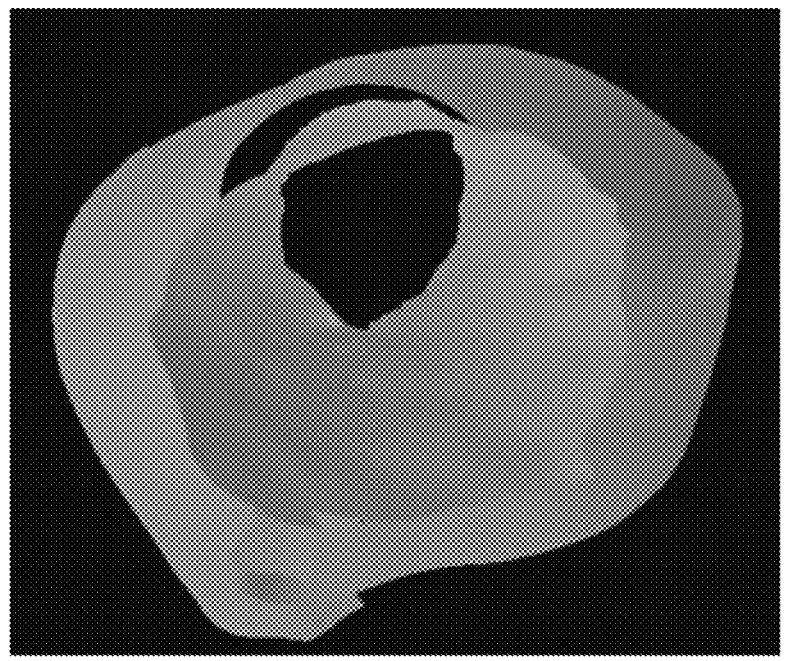

As previously discussed, one characteristic of MC, which may be used to create the refined mesh, is facilitating the creation of a mesh comprised of a set of surfaces, one inside the other, similar to an onion. For example, it may be desirable to visualize a structure to analyze the distance between the two surfaces (this could be particularly useful handling a brain). In general, it may be desirable to model the interaction between the various tissues and organs inside our body, visualizing, sectioning and in general managing them together. In other applications, it may be desirable to split and select all the possible layers present in the visualized image. FIG. 43 illustrates images produced by a MC algorithm. The left image is a MC image generated from a data set which was not pre-processed, in which the onion-like character of the image is shown. The right image shows a MC image generated from a pre-processed data set. The preprocessing may lead to better results as it allows for a simpler structure having fewer triangles to be generated.

Marching Cubes may produce an extreme large number of two-dimensional shapes (e.g., triangles), depending on the quality of the dataset. Decreasing the number of triangles produced, such as by simply eliminating the portion of the mesh which is not of interest, may result in increases in terms of computational speed of any kind of topology checker, the frame-rate of the visualized image, etc.

Another reason to segment an object of interest is the possibility to compare the mesh produced by MC with a mesh of the same object produced starting from the same input dataset and a different method. If this last method already tends to visualize a single surface, it may be desirable to uniform the two mesh shapes, since the metric used to compare two meshes may be, for example, a Hausdorff Distance ("HD"). HD may be evaluated in the following way: for every point of mesh A, it is computed the smallest distance for mesh B; then the final HD is the biggest of the computed smallest distances.

Given this definition, the presence in a mesh of triangles that represent a shape absent in the second mesh, may influence a result of this comparison (both negatively or positively).

In an embodiment, the dataset is divided into the basic cubes characteristic of the Marching Cubes algorithm. Then, according to the threshold chosen to visualize the related iso-surface, the FET divides the cubes into three categories, according to the eight corner voxels' values. The cubes with eight voxels below the threshold, eight voxels above the threshold and cubes a mix of voxels above and below the threshold.

Using a mask, the voxels belonging to cubes in which the threshold is crossed are preserved, while the voxels not involved in this computation are modified: for example, the other voxels are zeroed if below the threshold and brought to the maximum value allowed by the bit definition if above the threshold.

Of course some of those voxels belong to more than one cube, so it can happen that some voxels belong to different types of cube. In this case, the voxels for cubes crossed by the threshold are preserved.

Figure 27B:
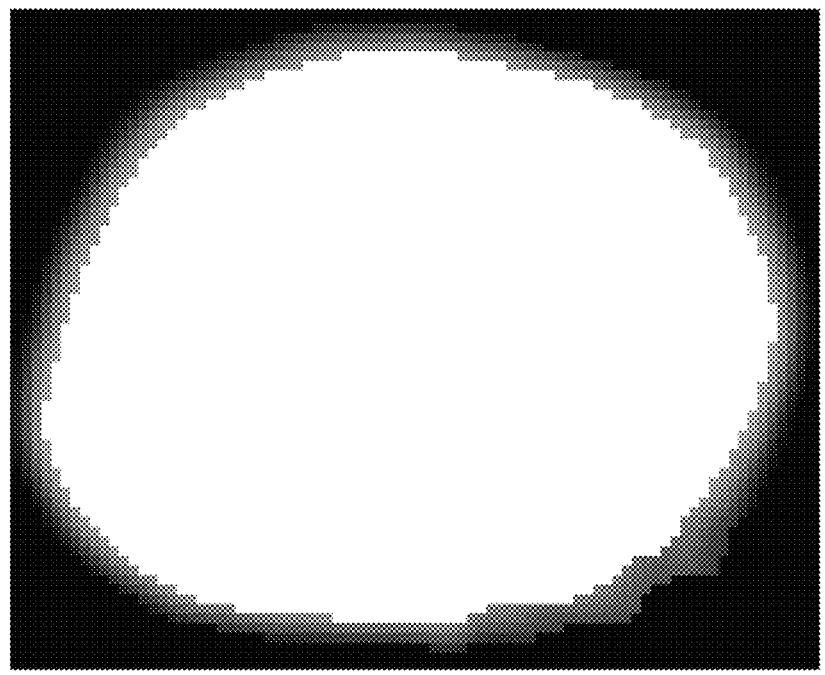
FIGS. 27A, 27B and 42 illustrate binarization of an image slice.
Figure 27A:
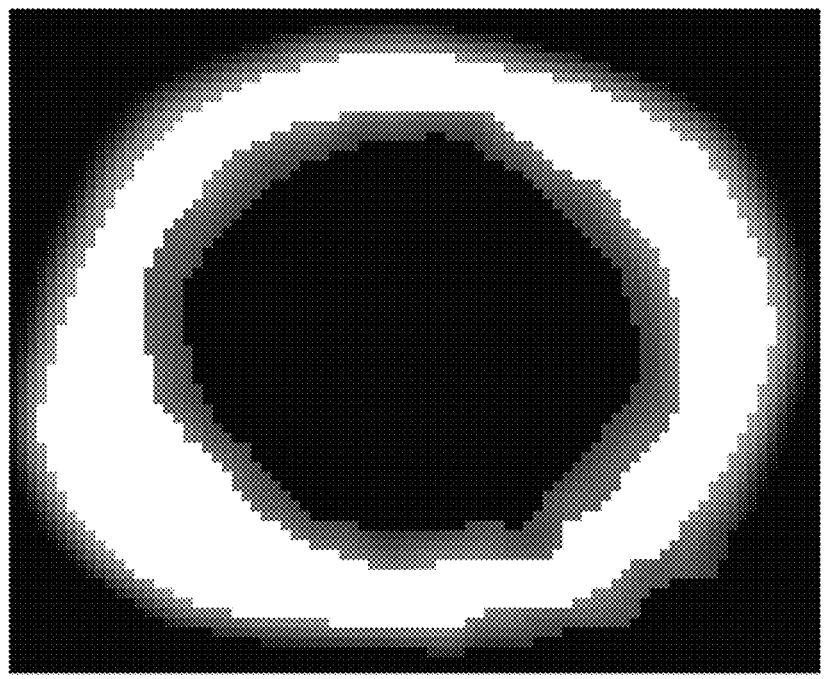
Figure 35:
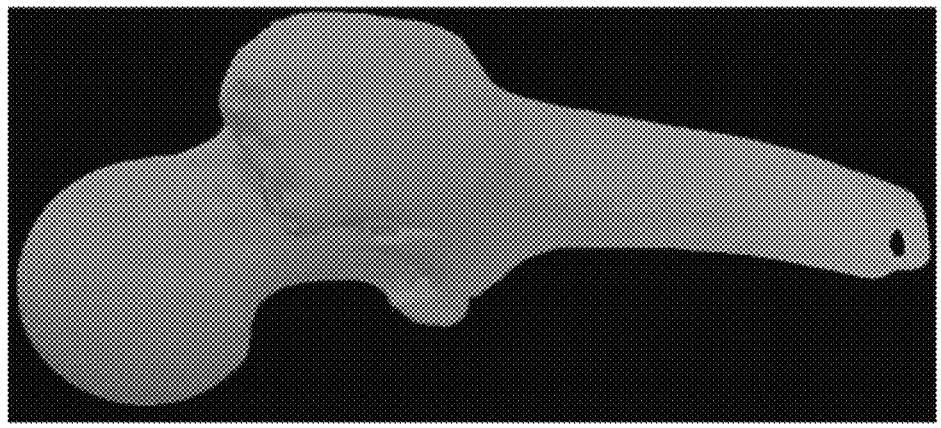
FIGS. 35 to 37 show images of femurs.

FIGS. 27A and 27B show the voxels before and after application of the mask in an embodiment. After the mask is applied the dataset comprises three types of voxels: the black ones (having a value equal to 0), the white ones (with a value equal to the maximum allowed by the bit definition) and all the others, remained equal with respect to the original dataset.

In order to divide the external mesh from the internal ones, an external border of the object is identified. This border may simply be the barrier comprising the white voxels that divide the unchanged external elements from the internal ones. The first set of elements will contribute to the building of the external mesh, as internal ones will do the same for the internal surface.

In this phase it may be desirable to facilitate that the border does not contain holes, in such a way that internal and external unchanged voxels enter in contact. This may be a challenging step. A clear demarcation line is useful to extrapolate the mesh. The Challenge results because unfortunately such holes may be quite large, and it is desirable to fill the holes without building (too many) artifacts and, without human intervention.

With reference to FIGS. 27A and 27B, an example of a slice after the first step of the algorithm: the white voxels represent the barrier between internal and external voxel involved by MC computation. In this case there are no holes to fill. To visualize the external mesh the voxels inside the border described above are set to white, obtaining the image of FIG. 27B. In FIG. 27A is a slice of a scan of the whole leg. It is evident the presence of the bone since it is the most dense part in the scan. FIG. 27B shows an example output, after the application of a binary mask that has decided which voxels to preserve and which to discard. It is possible to modify the dataset in order to visualize just the external mesh, as in FIG. 27B, or an internal mesh, and to compare the two visualizations. The initial mesh selection process improves the output of the MC algorithm.

Mesh Creation Through Marching Cubes

One of the valuable characteristics of the tri-dimensional medical exams is the possibility to have a global view of the object in 3D space.

There are many methods and algorithms through which it is possible to obtain a tridimensional model. Some of the methods have the purpose to visualize the volume of the object: in that case it is possible to section the object in order to look inside and inspect it slice by slice, following the three directions or even diagonally. Typically this kind of visualization is done resorting to texture based algorithms, that exploit the GPU parallelization without performing any type of post-processing on the images obtained by CT or MRI scans.

Figure 44:
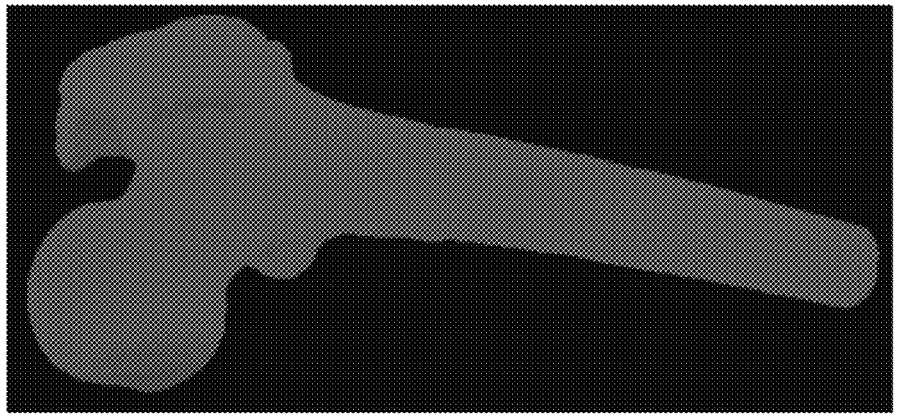
FIG. 44 shows images of femurs.
Figure 44:
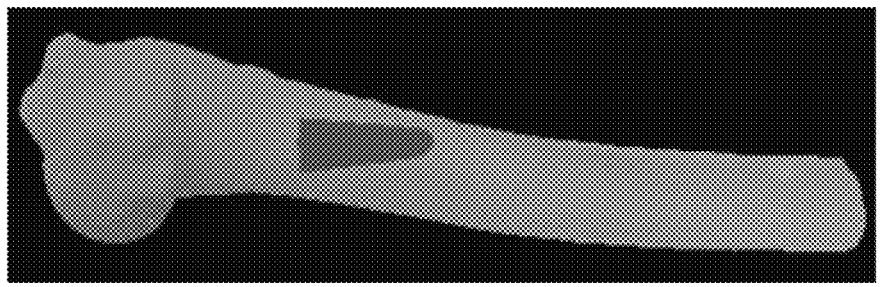
Figure 44:
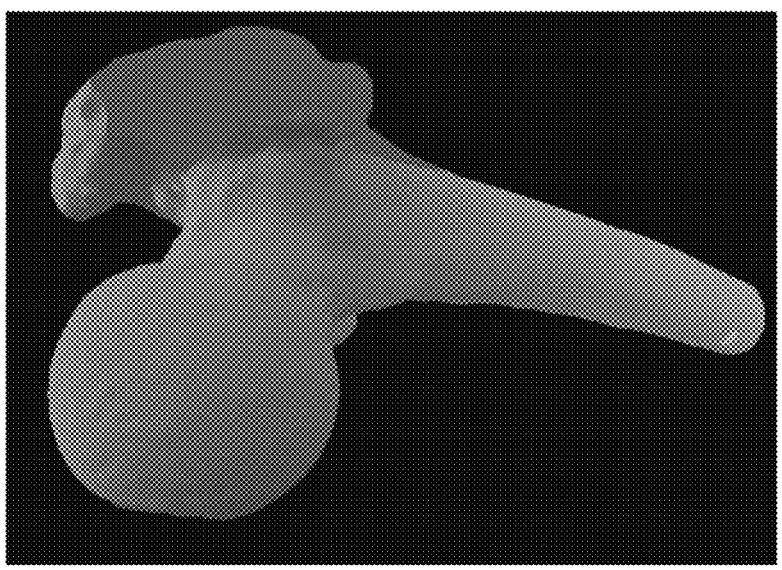
Figure 45:
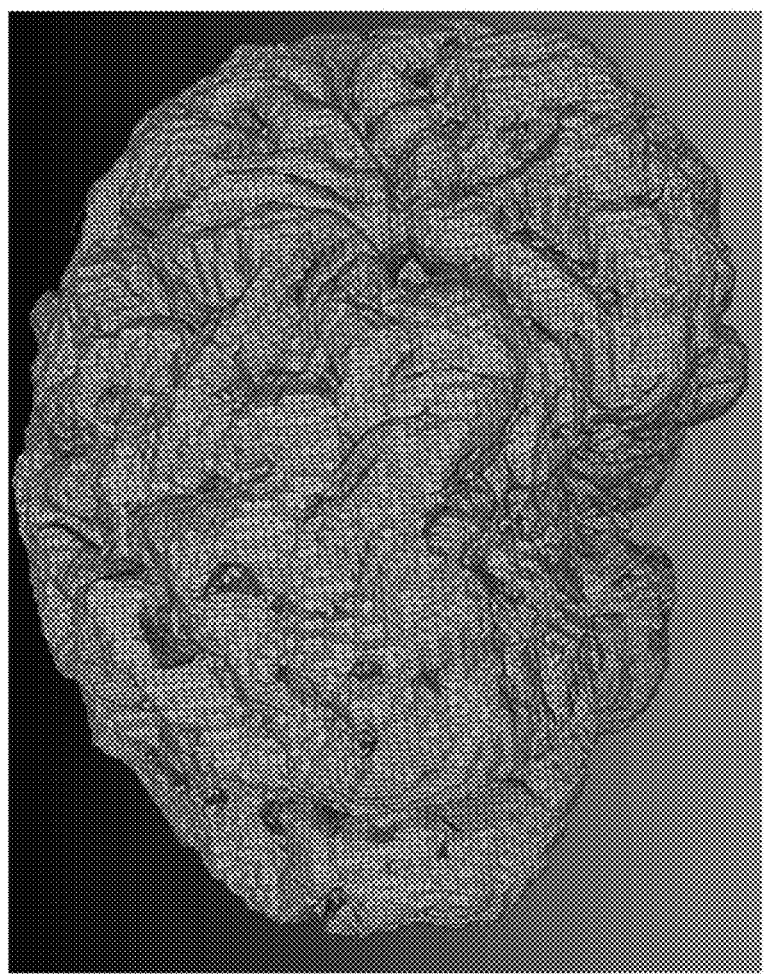
FIG. 45 shows an image of a brain.
Figure 46:
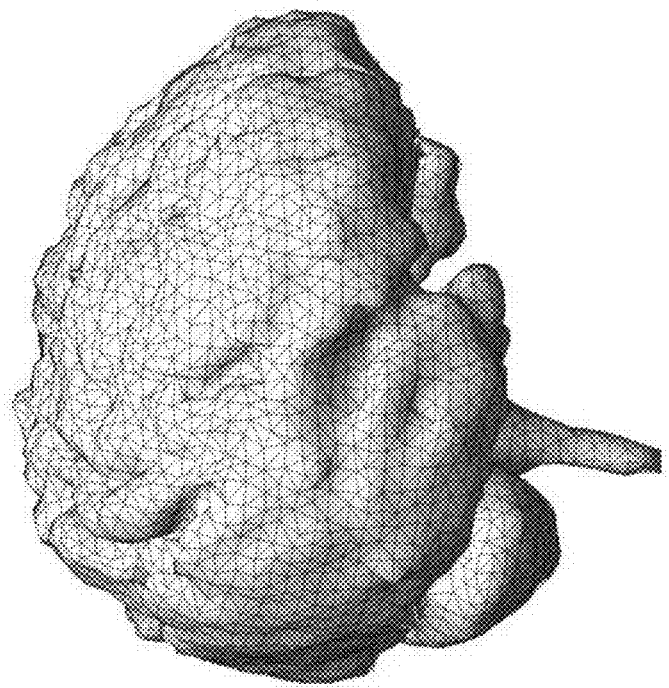
FIG. 46 illustrates the concept of marching cubes as applied to a human brain.
Figure 46:
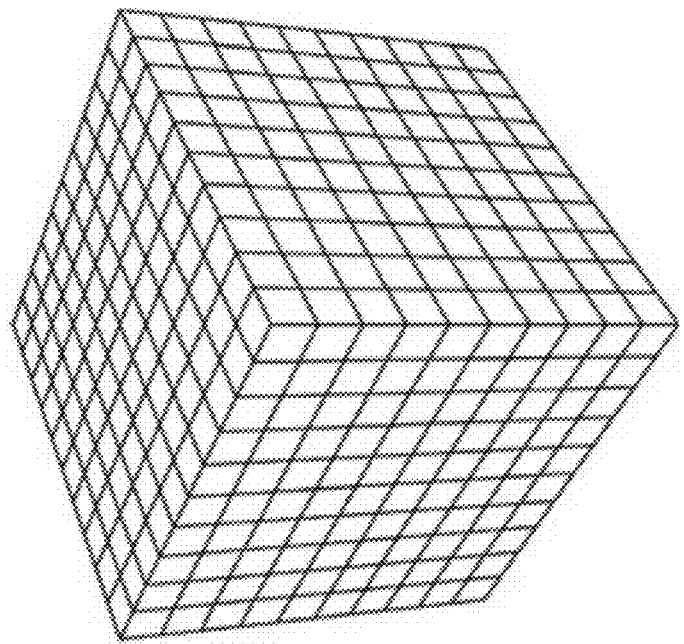

The approach of an embodiment is quite different, and facilitates visualize an object, obtaining better quality images through noise elimination, adjustment of the borders and other types of post-processing. An embodiment employs a modified MC to perform a rough segmentation, allowing the visualization of a certain number of surfaces using the same dataset, in such a way that it is possible to visualize separately different tissues. As previously discussed herein, MC may receive as input a dataset, a scalar field encoded as a stream of voxels, each voxel bound to a point in 3D space. Each voxel contains density information, sampled at the coordinates of the voxel. Since this value is scalar it is possible to translate a dataset into a greyscale image. A threshold is employed to visualize a surface comprising points having the threshold value. The dataset is divided into small cubes, each cube having a voxel associated with each of its vertexes. Given this description, there are two kind of cubes: the first where all the eight voxel values are below or above the threshold, and the second where there is a mix of them. Cubes having voxel values above and below the threshold are assumed to be crossed by the surface to visualize. At this point it is sufficient to trilinearly interpolate the spatial coordinates of the points through which the surface is more likely to pass, in order to build a reasonable set of triangles inside that cube having the role to model that part of surface in the best way possible. As discussed above, one or more look-up tables may be employed, as well as the improvements to the basic MC discussed herein. See, e.g., the Chernyaev, Lewiner and Glanznig references previously discussed, as well as the other modifications in the discussion of the BET herein. For an embodiment of a FET, it may be really useful to visualize two surfaces having different densities, present in the same dataset and not superimposed. FIG. 44 illustrates images generated using locally adaptive threshold values, with the different colors corresponding to threshold values.

Figure 29:
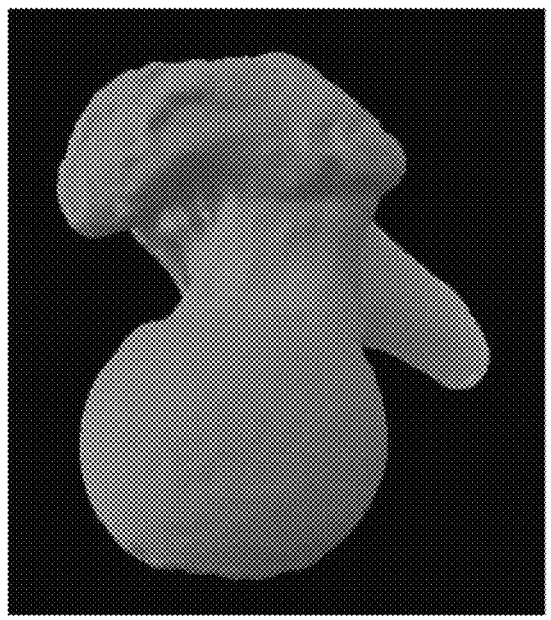
FIGS. 28 to 31 show images of femurs.
Figure 28:
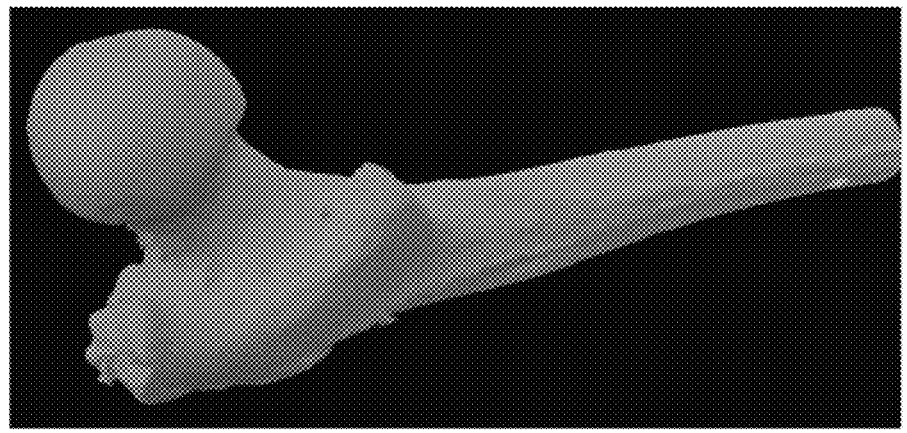

The inventors implemented a linear version of a locally modified threshold in an embodiment of an FET, which was really useful in managing some datasets of bones inserted in cement blocks, allowing the contemporary visualization of the top and the bottom of the bone without the block. See FIGS. 28 and 29, which illustrate two images obtained using Marching Cubes algorithm on bone datasets. The different colors indicate the threshold shift along a vertical direction in a locally adaptive variant of the FET.

Computing the Mass of an Object

Starting from MC in an embodiment a method is provided which facilitates computing the mass (volume times density) of the object of our medical examination, or of a portion of it. As previously discussed, MC is a surface-rendering algorithm to build a mesh, composed by triangles. Those triangles form the boundary of a volume. Density values are already available, since the voxel values contained in a dataset of an embodiment are expressed in Hounsfield Units, which are a density scale used for those types of medical scans. In an embodiment, estimation of the mass of an object is inserted into the MC, to exploit the MC's strong parallelizability. In this way the total mass to compute will be equal to the summation of the contribution given by each basic cube. For example, an embodiment of the method of computing the mass of an object discussed above may be employed (e.g., computing the summation of contributions from basic cubes inside the surface of the object and from contributions of basic cubes crossing the surface of the object). This computation, as already mentioned, could be made for the entire surface or for just a portion of it.

Figure 30:
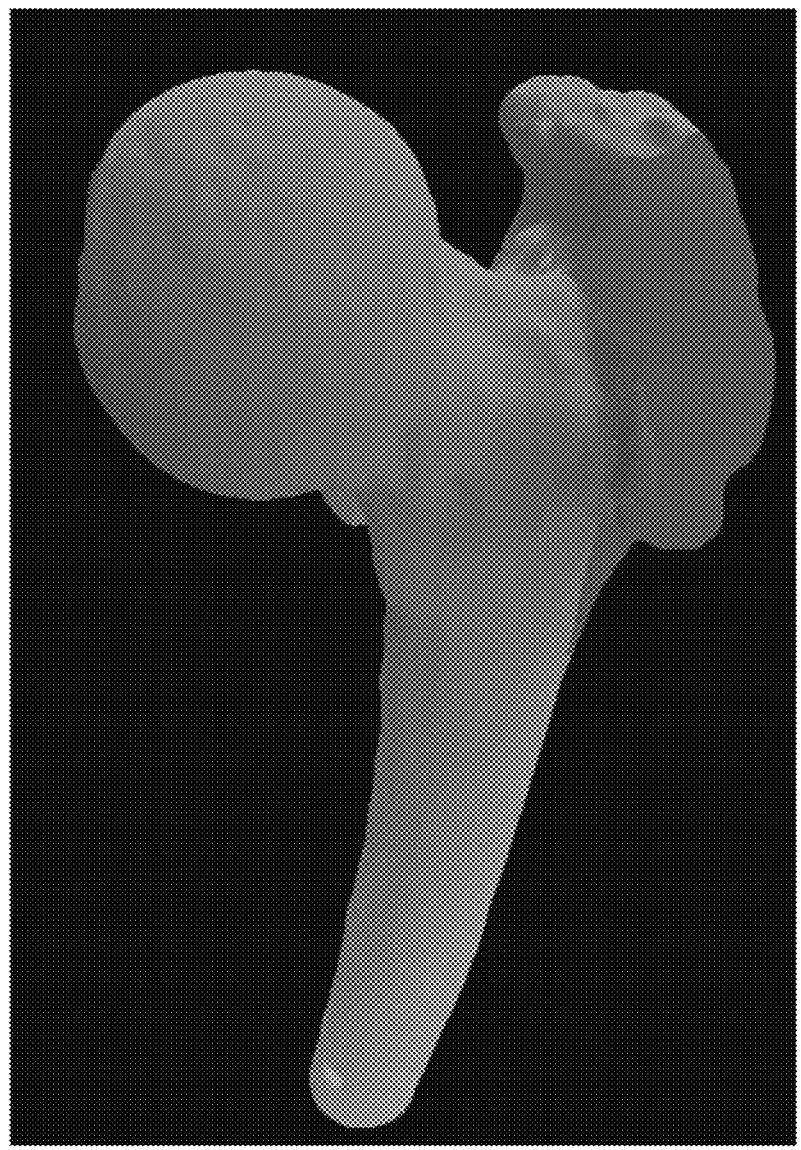

Computing the mass of an object, or a portion of an object, may have a high value in an embodiment used, for example, to diagnosis osteoporosis. Considerable losses of the mass of the bone with respect to the normal human average could represents a good signal in detecting this disease. FIG. 30 illustrates an image with a red region of interest. FIG. 44 illustrates images with other red regions of interest. For example, regions in which it is desired to estimate the density, for example as part of a diagnostic procedure.

Embodiment of Femur Extraction Tool

An embodiment of a Femur Extraction Tool (FET) addresses the problem of automatic segmentation of femur in MRI datasets using deformable models. A pre-processing of binarization and 3-D dilation is used to reduce the intensity inhomogeneity followed by an appropriate deformable rules derived from an embodiment of a Brain Extraction Tool (BET).

FET System Flow

Characteristic of Femur MRI and Overview of FET

In femur segmentation, the main issues encountered so far are the great variation in the bone intensity in MRI. The normal structure of the femur is an interior of more loosely organized trabecular bone and a cortical shell of compact cortical bone. In MRI, the superficial part of femur appears much more brighter than the interior part. The problem may be even more complex because the interior and superficial kinds may have similar intensity in some parts. Likewise, it is possible to find interior bone structures which exhibit the same intensity as the cortical bone. Moreover, in the MRI with osteoporosis and fracture areas, some holes may scatter over the bone indicating very low intensity compared to the superficial shell. FIG. 31 illustrates intensity issues in bone images, from left to right illustrate: the bright part in a trabecular bone, the dark part in cortical shell and a hole in inside bone.

Therefore, in an FET embodiment, a pre-process is performed before segmentation using MC. A minimum and maximum intensity of the dataset are identified and a threshold is determined based on the two intensities. The image is binarized using the threshold followed by a 3-D dilation. The geometry center of the 3-D femur image is found, together with the roughly estimated radius of the equivalent cylinder representing the femur. An initial cylinder-like mesh with hemispherical caps is created inside of the femur and tessellated with triangles. The mesh may be slowly deformed much like BET embodiment discussed herein with modifications of the update rules. The vertex generated after the modified BET are used to create a 3D mask and the mask is applied to the original MRI dataset with a simple selection/rejection rule to recover the 3D shape of femur.

Figure 47:
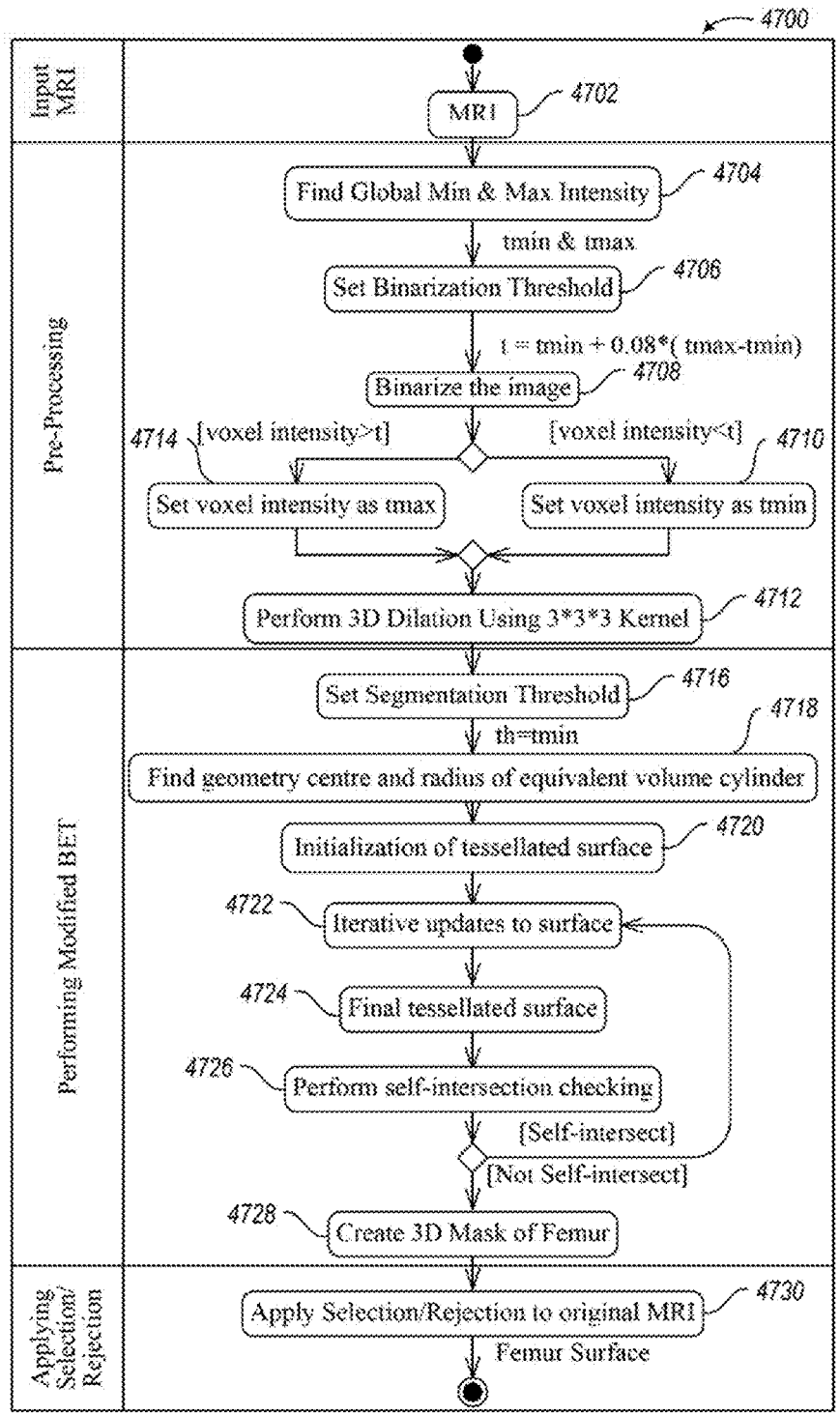
FIG. 47 illustrates an embodiment of femur extraction method.

FIG. 47 illustrates an embodiment of a method 4700 of a FET. An embodiment of the system 500 of FIG. 5 may be employed to perform all or part of the method 4700 of FIG. 47. At 4702, a dataset is received or retrieved. At 4704, minimum $t_{min}$ and maximum $t_{max}$ intensities in the data set are identified. At 4706, a binarization threshold t is determined based on the identified minimum $t_{min}$ and maximum $t_{max}$ intensities. For example, the binarization threshold t may be determined as follows:

$$t = t_{min} + 0.08(t_{max} - t_{min}) \qquad (5)$$

A factor other than 0.08 may be employed.

At 4708, the image is binarized. When the voxel intensity is greater than t, the voxel is set equal to $t_{max}$ at 4714. When the voxel intensity is less than t, the voxel is set equal to $t_{min}$ at 4710. At 4712, 3-D dilation is performed, for example using a three-by-three-by-three kernel.

Figure 41:
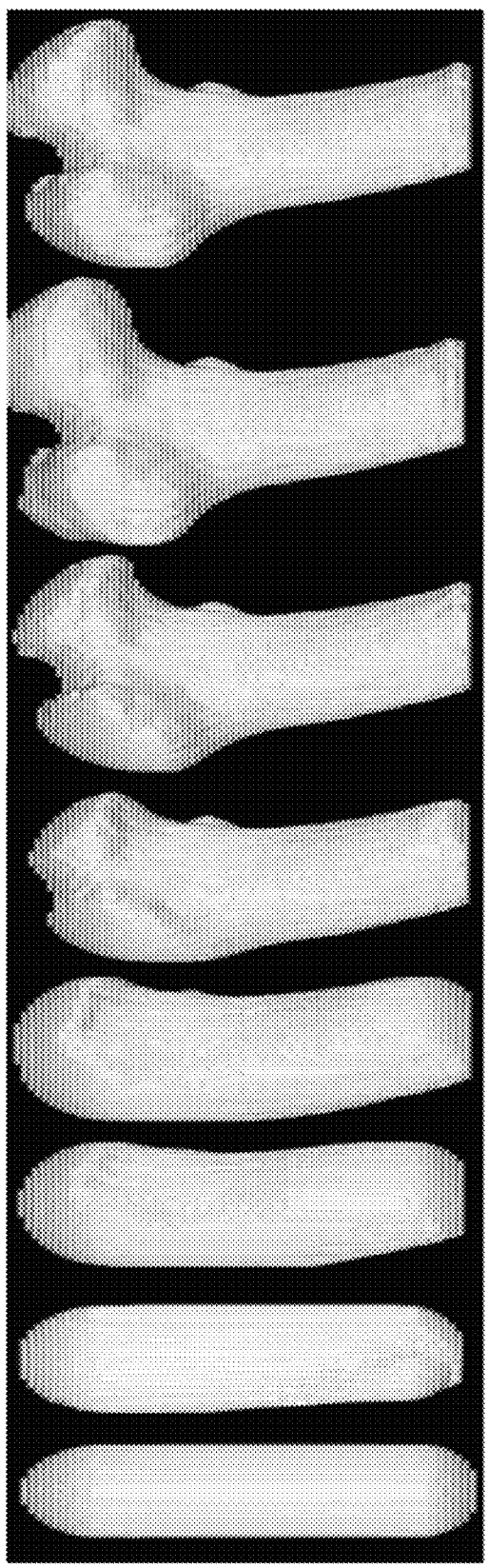
FIG. 41 illustrates an embodiment of deforming an initial femur mask according to an embodiment of an FET.
Figure 42:
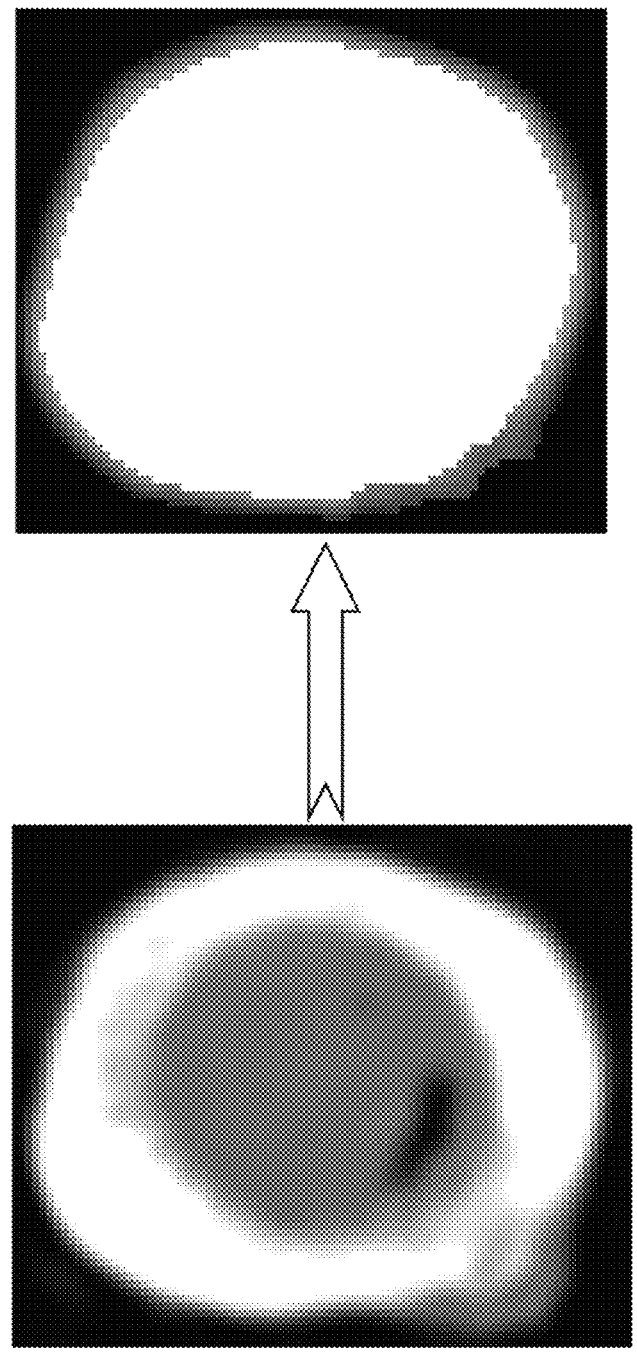

At 4716, a segmentation threshold th is set. For example, the segmentation threshold may be set to $t_{min}$. At 4718 a geometric center and radius for a volume cylinder representing the binarized image are determined. At 4720, tessellation of the surface is initialized. At 4722, iterative updating of the tessellated surface occurs. At 4724, an updated tessellated surface is produced. FIG. 41 illustrates an embodiment of a tessellated surface at various times during an iterative tessellation process. At 4726, optional checking of the produced tessellated surface is performed, for example, a self-intersection test may be performed. If the self-intersection test is not passed, the method returns to 4722 and iteratively updates the tessellated surface. If the self-intersection test is passed, the method proceeds to 4728, where a 3-D mask of the femur is created. At 4730, the mask is applied to the dataset to produce data for use in producing the femur image. Techniques that may be employed in embodiments to implement the blocks shown in FIG. 47 are discussed in more detail below.

Pre-Processing for Femur MRI

As discussed above, femur intensity is not homogeneous in MRI due to differences in cortical and trabecular bones. The bright region in interior bone and dark region in superficial shell can make the BET algorithm which based on a global threshold plus a well-defined local threshold fails to find the femur surface. Moreover, for most of femur MRIs, there exist some regions with very low intensity similar to the background appearing as dark holes inside the femur. These holes may make the iterative updates to the surface in a deformable model behave in an unexpected way. Therefore, a pre-processing of original MRI is performed before deformable model based segmentation.

Binarization

A simple way to reduce inhomogeneity is to binarize the original image. First, the global maximum intensity $t_{max}$ and minimum intensity $t_{min}$ are determined by scanning the 3-D volume. Then the threshold t is determined based on the two intensities. If a high threshold is used to find the clear boundary between femur and background, some dark part of cortical shell is removed while the inside holes also expand; if a low threshold is used to eliminate the inside holes and keep the cortical shell, some background voxels are also included. Therefore, t may be chosen as an experimentally optimal value given by the following equation:

$$t = t_{min} + 0.08 \times (t_{max} - t_{min}) \qquad (15)$$

Binarization is performed using t, the vertex with intensity larger than t is recognized as femur and set to $t_{max}$; the vertex with intensity lower than t is recognized as background and set to $t_{min}$. The binarized image keep a clear surface of femur but still leaves some inner holes with partial shrinkage effects.

3-D Dilation

From the discussion before, any remaining dark holes may affect the performance of deformable model based segmentation. Therefore, a 3-D dilation may be employed following the binarization.

Let A and B be sets in Z, $(B)_x$ denote the translation of B by x and $\hat{B}$ denote the reflection of B with respect to its origin. Based on Minkowski operators, dilation is defined as:

$$A \oplus B = \{x : (\hat{B})_x \cap A \neq \phi\} = \bigcup_{x \in B} A_x \qquad (16)$$

From the above definition, the dilation operator takes two pieces of data as inputs. The first element A is the image which is to be dilated. The second element B is commonly known as a structuring element (also known as a kernel). It is this structuring element that determines the precise effect of the dilation on the input image.

Dilation may be described simply in terms of adding n-voxels in the binary image, according to certain rules which depend on the pattern of the neighboring n-voxels and the size and shape of the structuring element. Therefore, dilation is a process that elongates the interior of the object. This effect may be applied to femur MRI, which is a 3-D image volume, to fill any dark holes left by binarization. Correspondingly, the 3-D dilation is defined as:

$$A \oplus B = \max_{(i,j,k) \in B} (A_{x+i, y+j, z+k}) \qquad (17)$$

Figure 32:
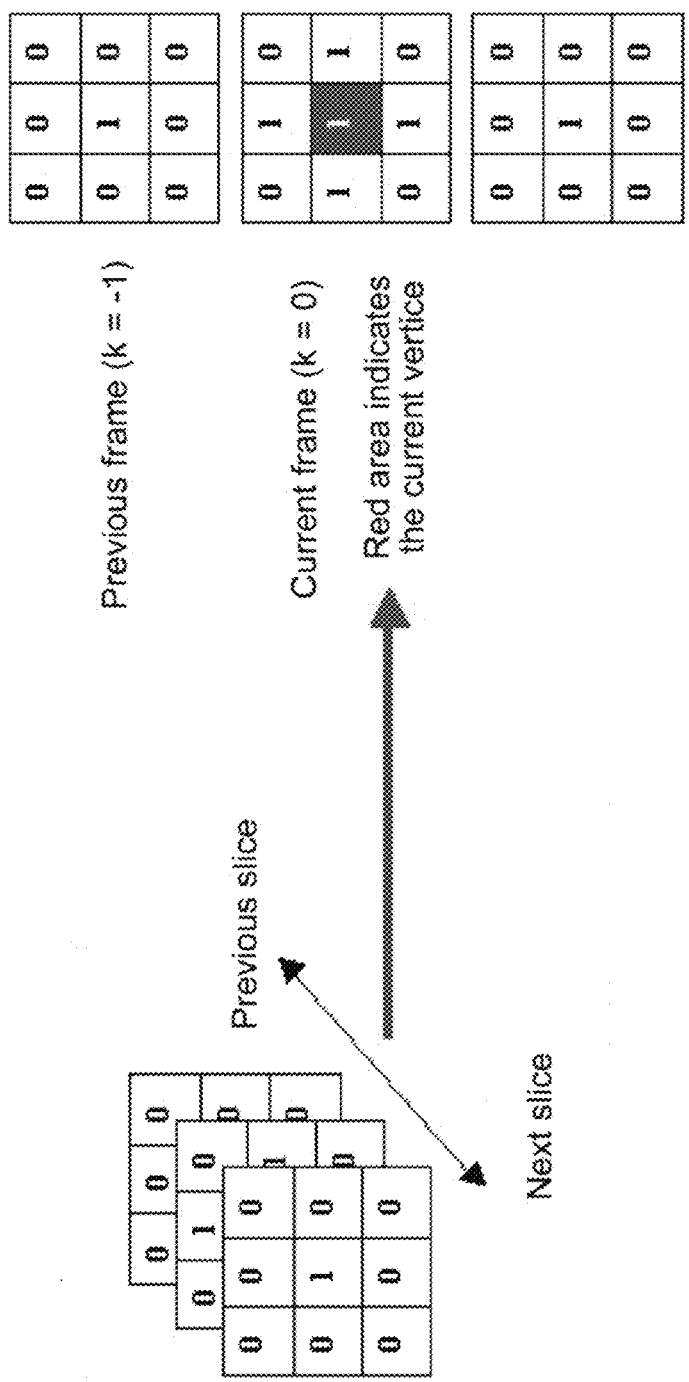
FIG. 32 illustrates an embodiment of 3-D dilation.
Figure 33:
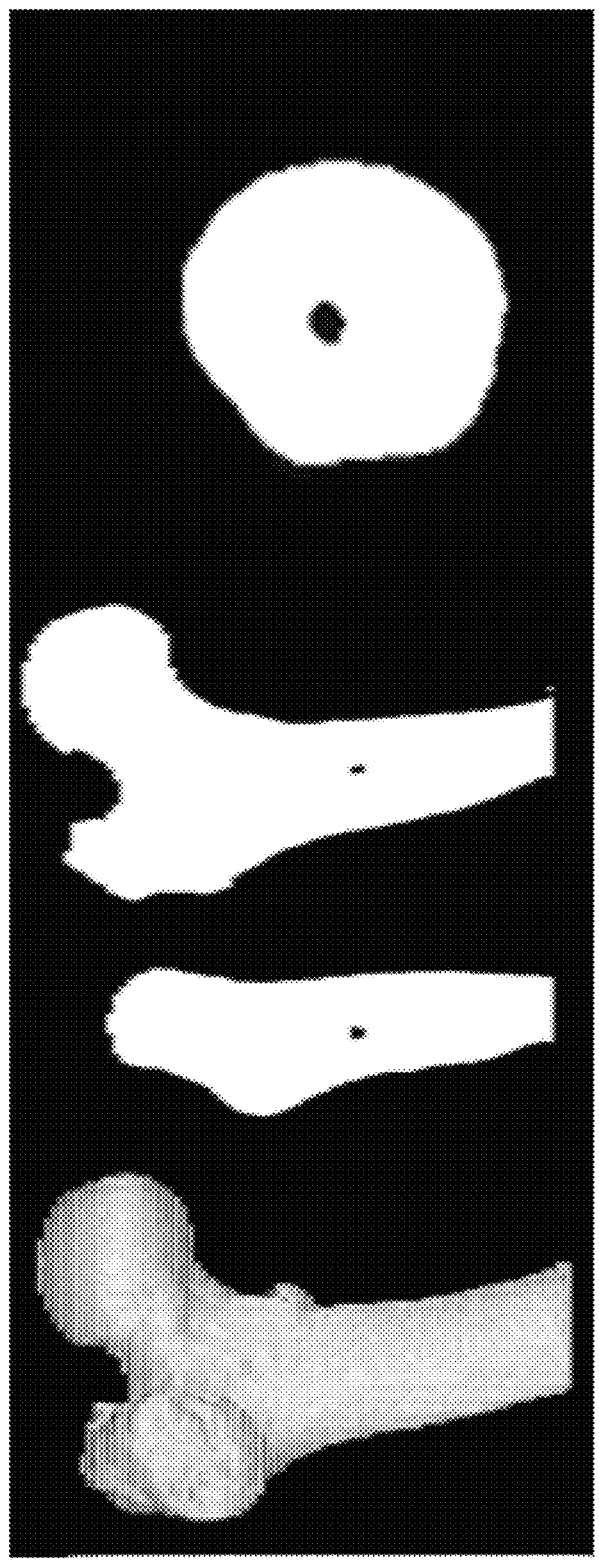
FIG. 33 shows an image of a femur.
Figure 36:
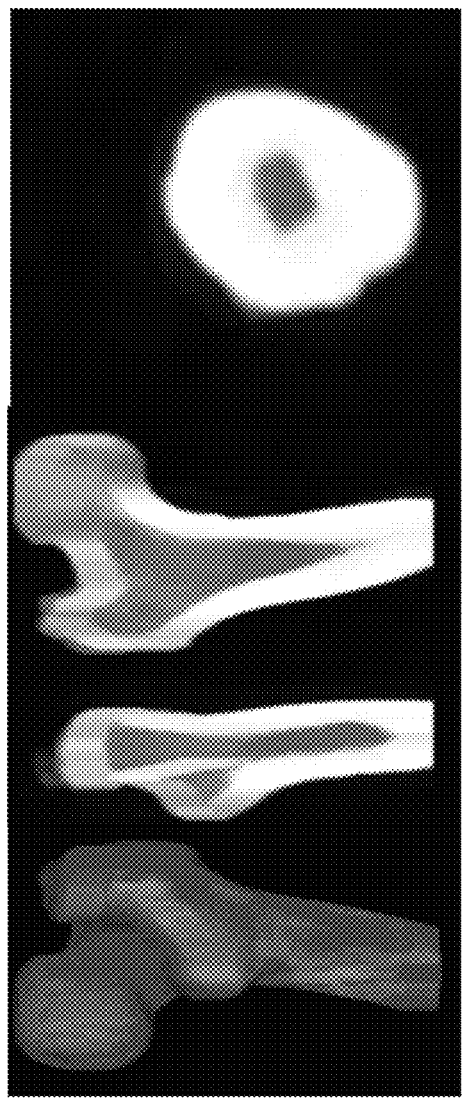
Figure 37:
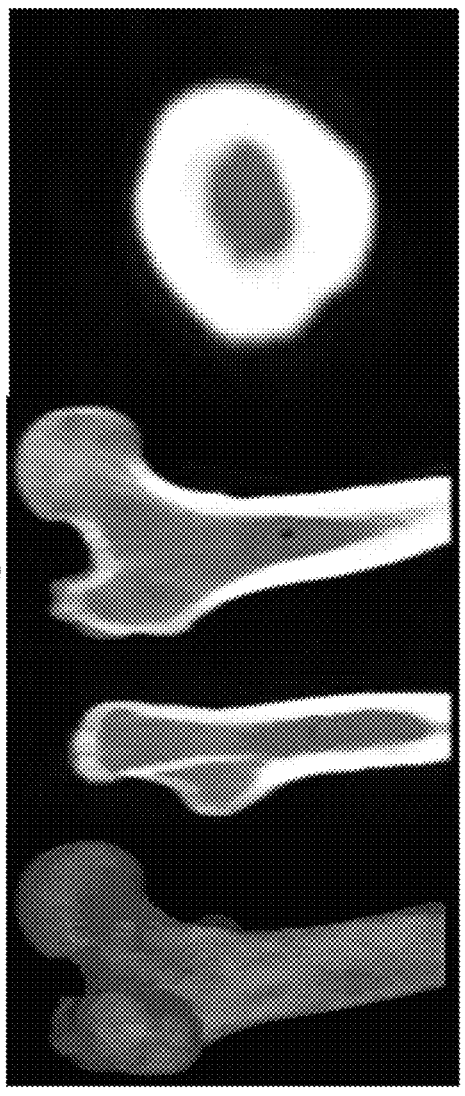

Now the image is 3-D (e.g., a sequence of slices of binarized femur MRI) and the structuring element is now 3-D. The structuring element may be chosen to eliminate the sparse holes while keeping a clear contour of the femur surface as shown in FIG. 32. The structuring element is placed on the first pixel of the first slice and the output is set to the maximum value lying within the structuring element. The structuring element is then moved across the current slice until the entire slice has been processed. Then the next slice is done in exactly the same way. The process is repeated until all the frames have been processed. The structuring element in the 3-D dilation of FIG. 32 takes five vertexes from the current slice as well as the vertex from the previous and next slices. FIG. 33 illustrates images to which 3-D dilation has been applied. The femur surface is not blurred too much because that the structuring element is designed to fit to the intrinsic smoothness of femur surface. To achieve this, a compromise is made that a small dark area is left round the geometry center of the femur. However, a dark region entirely inside the pre-processed image data does not generally lead to unpredictable behavior of a MC segmentation. With reference to FIG. 33, the leftmost image is a binary 3-D image after dilation with a structuring element. The following 3 images are slice views of the same image, instead of scattering all over the trabecular bone, the dark area is concentrated on the geometry center. FIG. 36 illustrates dilution with a kernel of seven, and FIG. 37 illustrates dilation with a kernel of three without pre-binarization.

Segmentation with Modified BET

Initialization of Deformable Model

Since the femur MRI has already been binarized before, calculation of intensity histogram may be avoided. The threshold th to separate femur from back ground may be set, for example as $t_{min}$. The femur region may be roughly estimated by including all the vertex with intensity above th.

Unlike the brain, the shape of femur is more like a cylinder than sphere. The initial frame and end frame from femur head and bottom may be manually located to estimate the height h of the cylinder. Based on h, the radius r of femur in the image may be roughly estimated by using the voxel volume of femur by counting all the voxels with intensity greater than th. It is a very rough estimation which may be used as a starting value in the initialization of deformable model.

With regard to determining an initial center of the model, a center of geometry may be estimated instead of center of gravity. Here, COG is also used as an abbreviation of center of geometry. Considering the femur has a "heavy" head, the center of geometry may be estimated by finding the center of gravity using all voxels inside the femur region with a standard weighted sum of positions and making a translation, which is empirically set as 2h/3, along the vertical axis down to the body.

Figure 34:
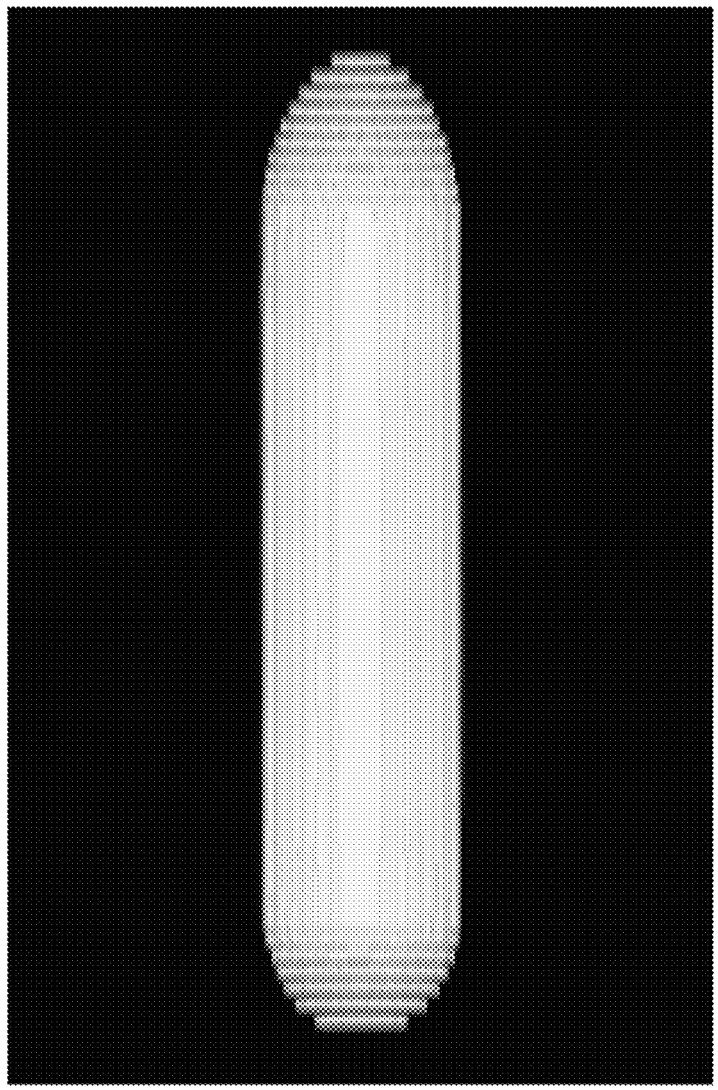
FIG. 34 illustrates an embodiment of an initial mesh of an FET.

After finding the center of geometry, height h and radius r, the mesh is initialized as a sphere and the BET-like tessellation is used to subdivide the mesh into triangles with equally spaced vertex until the required complexity is achieved. The tessellated mesh is then centered at the center of geometry and the radius is set as r/1.2. As discussed before, the shape of femur is far from a sphere and the quality of deformable model based segmentation is affected by the initial shape. The more similar the initial mesh to original shape of object, the better results the method may be expected to produce. Therefore, an adjustment may be made to the initial shape. Considering the fact that the surface of the body is less complicated than the head, fewer voxels may be assigned to the body than to the head. A simple way is to rescale the coordinators along the vertical axis with an elongating factor h/r. The final shape of initial model is a stick-like mesh with round caps on both sides. An embodiment of an initial mesh of a deformable FET model is shown in FIG. 34. As mentioned with reference to a BET, to achieve precise adjustments in the iterations, the vertex positions may be real and floating values.

A Modified BET Deformable Loop

After the pre-processing, the deformable rules of an embodiment of femur segmentation are based on the same procedure as described in BET.

As the basis of deformable rules, a couple of basic vectors are found in the same way, say difference vector s pointing from the central vertex to the mean position of its neighbors and its orthogonal decompositions $s_t$ and $s_n$, $s_t$ is the tangential vector to the local surface and $s_n$ is the normal vector.

The first update component $u_1$ may be designed the same as in BET which takes the movement within the local surface to keep surface vertex equally spaced. The first component may be given by:

$$u_1 = s_t/2 \tag{18}$$

The second update component also follows the same strategy of BET which moves the vertex along the local surface norm to increase the smoothness of the surface. The second component may be given by:

$$u_2 = f_2 s_n \tag{19}$$

Where $f_2$ depends on the local curvature of the surface to enforce a weak smoothing to high curvature part while a strong smoothing to low curvature part to overcome the oversmooth. In an embodiment, $f_2$ may be defined as:

$$f_2 = (1 + \tan h(F^*(1/r - E)))/2 \tag{20}$$

$$E = (1/r_{min} + 1/r_{max})/2 \tag{21}$$

$$F = 6/(1/r_{min} - 1/r_{max}) \tag{22}$$

In an embodiment, what is different from BET is that the upper and lower bound for smoothness controlling, that is $r_{max}$ and $r_{min}$ are modified to be suited for the geometries of human femur. Therefore, a histogram of local curvature of femur MRI is calculated. Based on the histogram, $r_{max}$ is set as curvature value above which lies 5% of the cumulative histogram and $r_{min}$ is set as the value below which lies 70% of the cumulative value. For example, $r_{max}=5$ mm and $r_{min}=0.1$ mm may be employed, which are derived from datasets of different human femur MRI.

The third update component, like the third component of the BET embodiment described herein, is also designed to act along the local norm and to facilitate the vertex tracking the femur surface. However, instead of finding two referential intensities, a single average intensity may be determined in an embodiment of an FET:

$$\bar{I} = AVG(I(0), I(1), \ldots, I(d)) \tag{23}$$

Where d determines the search area defined by the distance from the deformable mesh surface pointing outward along the norm, where all the vertex intensities are counted for the calculation of average value. Here, d may be empirically optimized, for example as 0.5 mm. Since the image has already been binarized, $\bar{I}$ can vary from $t_{max}$ to $t_{min}$ during the update process. $\bar{I}$ is equal to $t_{max}$ when the current surface vertice is tightly inside the femur that all the vertex in the search area is inside the femur; according, $\bar{I}$ is equal to $t_{min}$ when the current surface vertice is entirely outside the femur that all the vertex in the search area is outside the femur.

Then, a biased average intensity $I_b$ that used in the calculation of third update component may be determined using $\bar{I}$:

$$I_b = \begin{cases} \bar{I} & \bar{I} > t_{min} \\ \bar{I} - f_a * t_{max} & \bar{I} = t_{min} \end{cases} \tag{24}$$

A bias factor is enforced on the average intensity $\bar{I}$ when the current vertice is entirely outside the femur. The reason for introducing a biased intensity of $\bar{I}$ is to let the deformation move the surface point both outward and inward. Otherwise, the surface will be forced as convex. The factor $f_a$ may be set empirically, for example as 0.01, which was found to provide a good result for most of the testing femur MRI. The third update component may then given by:

$$f_3 = \frac{I_b - th}{I} \tag{25}$$

Where I is calculated by:

$$I = 0.5 * (t_{max} - t_{min}) \tag{26}$$

The constant intensity I act as a normalized factor to limit the update component to a small value with absolute value less than 1. If the current vertice lies tightly inside the femur, $f_3$ and causes the deformable model to expand; while, if the current vertice goes entirely outside of femur, $f_3$ causes the deformable model to shrink. The deformable model ceases to change only when the vertice is on the surface of femur.

Like in BET, the third component may be multiplied with 0.051, which balances the intensity-based term and the previously calculated smoothness term, where the I represents the mean intensity-based distance. Then, the full version of the third update component is:

$$u_3 = 0.05 f_3 l \hat{s}_n \tag{27}$$

Based on the three components, the final update equation is formed to calculate the deformation vector u in each iteration:

$$u = 0.5 s_t + f_2 s_n + 0.05 f_3 l \hat{s}_n \tag{28}$$

A self-intersection checking may also be performed after the deformable loop. If self-intersection is detected, the modified BET iteration is repeated following the same smoothness increasing method described in BET.

3-D Mask and Selection/Resection Rule

Since the modified BET deformation takes the pre-processed MRI dataset as input, the output is also a binary image. However, a multi-intensity segmented femur MRI is desired rather than a binary image. Actually, the mesh generated by modified BET can be used as a 3-D mask and applied to the original femur MRI. Adopting a simple selection/rejection rule, all vertex inside the mesh/3-D mask are assigned with the corresponding intensity in original MRI and all vertex outside are set to $t_{min}$. After the selection/rejection procedure, the segmented femur MRI is obtained.

Figure 48:
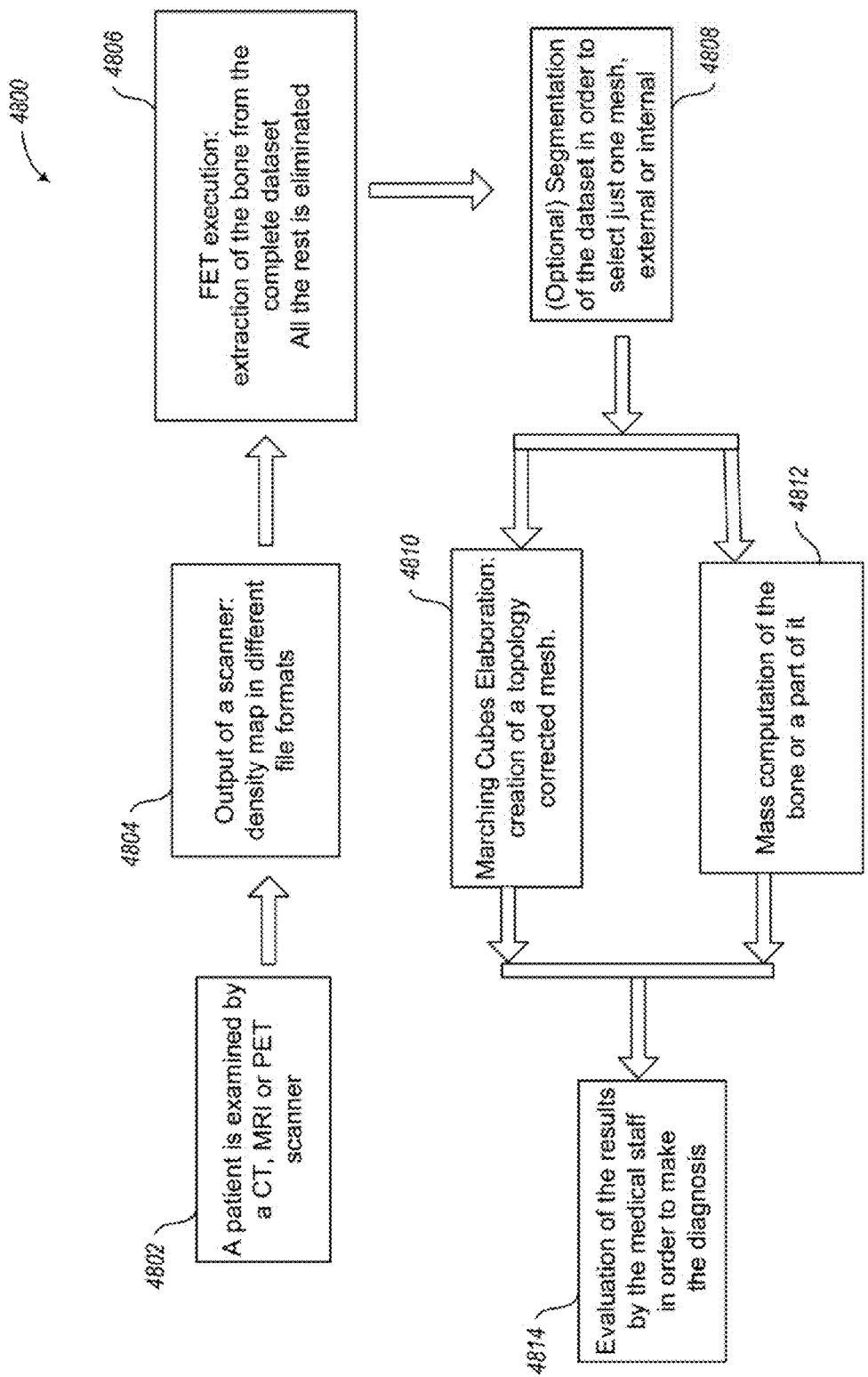
FIG. 48 illustrates an embodiment of a femur extraction method.

FIG. 48 illustrates an embodiment of a method 4800 of an FET. At 4802, an patient is examined, for example by a CT, MRI, PET scanner, etc. At 4804, the output of a scan is received or retrieved. At 4806, the bone is extracted from the data set, and the tissue is excluded. At 4808, the dataset is optionally segmented to select a mesh, e.g., an internal or an external mesh. At 4810, MC is employed to create a topology of the corrected mesh. At 4812, the mass of the bone is estimated. At 4814, the results are evaluated, which may include both automated analysis and analysis by medical personnel. Looking at this scheme of an embodiment it is possible to appreciate the whole path of a medical exam, from the scan to the diagnosis made by one or more doctors. The scanner produces a density map in a certain file format. This stream of data is processed by a first algorithm of the FET. This procedure at 4806 has the role to eliminate the soft tissues from the dataset and preserve just the elements belonging to the bone. The following optional step 4808, may be useful for successive re-mesh. It chooses a single mesh to visualize from s set of surfaces available. It is possible to choose the most internal one to reveal some particular details or the external one to better appreciate the shape of the superficial part of the bone.

Figure 40:
FIG. 40 shows images of femurs.

Next follows Marching Cubes re-meshing step 4810, which creates a polygonal model of the dataset received in input, according to a threshold, which may be chosen by the user. A mass computation step 4812, which may exploit the parallelization of the MC, estimates the mass of the object shown by Marching Cubes step. The data produced by those steps may be evaluated in order to arrive to the diagnosis. FIG. 40 compares an image generated by an embodiment of an FET with an original image. As can be seen, the image is brighter because the dark part of the bone shell has been removed.

The inventors introduced an extension of a linear elastic tensor-mass method allowing fast computation of non-linear and visco-elastic mechanical forces and deformations for the simulation of biological tissue. The inventors developed a simulation tool for the planning of bone surgical treatment based on CT data of a patient. Surgery simulation requires accurate modeling of the mechanical behavior of soft tissue and bone. In the inventor's systems, all joints were defined as contact surfaces, which allow relative articulating movement. The major ligaments were simulated using tension-only truss elements by connecting the corresponding attachment points on the bone surfaces. The bony and ligamentous structures were embedded in a volume of soft tissues. The muscles were defined as non-linear visco-elastic material, the skin, ligaments and tendons were defined as hyperelastic, while the bony structures were assumed to be linearly elastic. The multilayer FEM model containing thighbone, tibia, fibula, kneecap, soft tissue was formed after meshing. Diverse forces were imposed on the FEM model. The results showed that the multilayer FEM model may represent tissue deformation more accurately.

The inventors propose a method for automatically correcting the spherical topology of any segmentation under any digital connectivity. A multiple region growing process, concurrently acting on the foreground and the background, divides the segmentation into connected components and successive minimum cost decisions facilitate convergence to correct spherical topology. In contrast to existing procedures that suppose specific initial segmentation (full connectivity, no cavities . . . ) and are designed for a particular task (cortical representation), no assumption is made on the initial image. The method applied to subcortical segmentations was able to correct the topology of fourteen non-cortical structures in less than a minute.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems, circuitry and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), state machines, complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Example lines of code that implement an embodiment of a procedure for determining the mass of the cubes crossed by the iso-surface are set forth below.

```
total_grid_value = 0;
    small_cube_number = 0;
        for (fc = 0; fc < glob->dimension; fc++) {
            for (sc = 0; sc < glob->dimension; sc++) {
                for (tc = 0; tc < glob->dimension; tc++) {
//let's make trilinear interpolation!!
q=(fc+0.5)/glob->dimension;
s=(sc+0.5)/glob->dimension;
t=(tc+0.5)/glob->dimension;
        partial_grid_value    =(1-q)  *  (1-s)  * (1-t)  * grid.m_val_original[0] +
                    (1-q)  *  (1-s)  *          t      * grid.m_val_original[1] +
                    (1-q)  *    s    *          t      * grid.m_val_original[2] +
                    (1-q)  *    s    *        (1-t)    * grid.m_val_original[3] +
                      q    *  (1-s)  *        (1-t)    * grid.m_val_original[4] +
                      q    *  (1-s)  *          t      * grid.m_val_original[5] +
                      q    *    s    *          t      * grid.m_val_original[6] +
                      q    *    s    *        (1-t)    * grid.m_val_original[7];
        trilinear_isolevel    =(1-q)  *  (1-s)  * (1-t)  * grid.iso_level[0] +
                    (1-q)  *  (1-s)  *          t      * grid.iso_level[1] +
                    (1-q)  *    s    *          t      * grid.iso_level[2] +
                    (1-q)  *    s    *        (1-t)    * grid.iso_level[3] +
                      q    *  (1-s)  *        (1-t)    * grid.iso_level[4] +
                      q    *  (1-s)  *          t      * grid.iso_level[5] +
                      q    *    s    *          t      * grid.iso_level[6] +
                      q    *    s    *        (1-t)    * grid.iso_level[7];
if (partial_grid_value <= trilinear_isolevel) {
        small_cube_number++;
        total_grid_value += partial_grid_value;}
}}}
if (small_cube_number != 0) {
average_grid_value = total_grid_value / (double)small_cube_number;
volume_fraction = (double)small_cube_number / (double)(glob->dimension*glob-
                                        >dimension*glob->dimension);
total_mass += volume_fraction * glob->dists[0] * glob->dists[1] * glob-
                                        >dists[2] * average_grid_value;
```

The invention claimed is:

1. A system, comprising:
a memory; and
one or more processing devices configured to:
determine intersection points of a representation of a surface in an image space with cubes defining the image space, the surface defining a surface of an object, the determining the intersection points including:
defining an initial representation of the surface in the image space;
refining the initial representation of the surface in the image space by segmenting the object and refining the initial representation to correspond to a segmented portion of the object; and
determining the intersection points of the refined representation of the surface with the cubes defining the image space; and
determine an estimated mass of at least a portion of the object by:
determining an estimated mass contribution of a first set of cubes contained entirely within the representation of the surface;
determining an estimated mass contribution of a second set of cubes having intersection points with the representation of the surface; and
estimating a mass of the at least a portion of the object based on the estimated mass contribution of the first set of cubes and the estimated mass contribution of the second set of cubes, wherein refining the initial representation comprises deforming the initial representation by iteratively applying local movement vectors to vertexes of a plurality of triangles defining the surface and a local movement vector u of a vertex of a triangle is defined by:

$$u = u_1 + u_2 + u_3,$$

where $u_1$ is a vector component representing local movement within the surface, $u_2$ is a vector component representing local movement along surface normal, and $u_3$ is a vector component representing local movement deforming the surface toward a surface of the segmented object.

2. The system of claim 1 wherein the object is one of a human brain and a human femur.

3. A system, comprising:
a memory; and
one or more processing devices configured to:
determine intersection points of a representation of a surface in an image space with cubes defining the image space, the surface defining a surface of an object; and
determine an estimated mass of at least a portion of the object by:
determining an estimated mass contribution of a first set of cubes contained entirely within the representation of the surface;
determining an estimated mass contribution of a second set of cubes having intersection points with the representation of the surface; and
estimating a mass of the at least a portion of the object based on the estimated mass contribution of the first set of cubes and the estimated mass contribution of the second set of cubes, wherein the one or more processing devices are configured to determine the estimated mass, Mass, of the at least a portion of the object according to:

$$\text{Mass} = \sum_1^n V_{bc} d_a + \sum_1^m V_p d_{ati},$$

where n is a number of cubes in the first set of cubes, $V_{bc}$ is a volume of a cube in the first set of cubes, $d_a$ is an average density of the cube in the first set of cubes, m is a number of cubes in the second set of cubes, $V_p$ is a volume of a portion of a cube in the second set of cubes contained within the surface, and $d_{ati}$ is an average density of the portion of the cube in the second set of cubes.

4. The system of claim 3 wherein the one or more processing devices are configured to determine the intersection points by:
  defining an initial representation of the surface in the image space;
  refining the initial representation of the surface in the image space; and
  determining the intersection points of the refined representation of the surface with the cubes defining the image space.

5. The system of claim 4 wherein refining the initial representation of the surface in the image space comprises segmenting the object and refining the initial representation to correspond to a segmented portion of the object.

6. The system of claim 5 wherein refining the initial representation comprises applying a marching cubes algorithm to the segmented portion of the object.

7. The system of claim 5 wherein refining the initial representation comprises deforming the initial representation.

8. The system of claim 5 wherein the one or more processing devices are configured to process an image dataset associating vertexes of the cubes defining the image space with intensity values indicative of density and the defining the initial representation comprises:
  determining a maximum intensity threshold based on the dataset;
  determining a minimum intensity threshold based on the dataset; and
  determining an intensity threshold based on the maximum and minimum intensity thresholds.

9. The system of claim 8 wherein refining the initial representation comprises deforming the initial representation by iteratively applying local movement vectors to vertexes of a plurality of triangles defining the surface.

10. The system of claim 9 wherein a local movement vector u of a vertex of a triangle is defined by:

$$u = u_1 + u_2 + u_3,$$

where $u_1$ is a vector component representing local movement within the surface, $u_2$ is a vector component representing local movement along surface normal, and $u_3$ is a vector component representing local movement deforming the surface toward a surface of the segmented object.

11. The system of claim 3 wherein determining the estimated mass contribution of a second set of cubes comprises representing a cube in the second set of cubes as a plurality of sub-cubes and $V_p$ is a total volume of the cube in the second set of cubes multiplied by a ratio of a number of sub-cubes of the cube in the second set of cubes determined to be within the at least a portion of the object to a total number of sub-cubes of the cube in the second set of cubes.

12. The system of claim 11 wherein the total number of sub-cubes in the cube is four.

13. A method, comprising:
  determining intersection points of a representation of a surface in an image space with cubes defining the image space, the surface representing a surface of an object; and
  estimating a mass of at least a portion of the object, the estimating including:

estimating a mass contribution of a first set of cubes contained entirely within the representation of the surface;
estimating a mass contribution of a second set of cubes having intersection points with the representation of the surface; and
estimating a mass of the at least a portion of the object based on the estimated mass contribution of the first set of cubes and the estimated mass contribution of the second set of cubes, wherein the estimated mass of the at least a portion of the object is:

$$\text{Mass} = \sum_1^n V_{bc} d_a + \sum_1^m V_p d_{ati},$$

where n is a number of cubes in the first set of cubes, $V_{bc}$ is a volume of a cube in the first set of cubes, $d_a$ is an average density of the cube in the first set of cubes, m is a number of cubes in the second set of cubes, $V_p$ is a volume of a portion of a cube in the second set of cubes contained within the surface, and $d_{ati}$ is an average density of the portion of the cube in the second set of cubes.

14. The method of claim 13 wherein determining the intersection points comprises:
  defining an initial representation of the surface in the image space;
  refining the initial representation of the surface in the image space; and
  determining the intersection points of the refined representation of the surface with the cubes defining the image space.

15. The method of claim 14 wherein refining the initial representation of the surface in the image space comprises segmenting the object and refining the initial representation to correspond to a segmented portion of the object.

16. The method of claim 14 wherein refining the initial representation comprises deforming the initial representation.

17. The method of claim 13 comprising processing an image dataset associating vertexes of the cubes defining the image space with intensity values indicative of density.

18. The method of claim 13 comprising applying a marching cubes algorithm.

19. The method of claim 13 wherein estimating the mass contribution of a second set of cubes comprises representing a cube in the second set of cubes as a plurality of sub-cubes and $V_p$ is a total volume of the cube in the second set of cubes multiplied by a ratio of a number of sub-cubes of the cube in the second set of cubes determined to be within the at least a portion of the object to a total number of sub-cubes of the cube in the second set of cubes.

20. A non-transitory computer-readable memory containing instructions configured to cause a processing device to estimate a mass of an object by performing a method, the method comprising:
  determining intersection points of a representation of a surface in an image space with cubes defining the image space, the surface representing a surface of an object; and
  estimating a mass of at least a portion of the object, the estimating including:
    estimating a mass contribution of a first set of cubes contained entirely within the representation of the surface;

estimating a mass contribution of a second set of cubes having intersection points with the representation of the surface; and estimating a mass of the at least a portion of the object based on the estimated mass contribution of the first set of cubes and the estimated mass contribution of the second set of cubes, wherein the estimated mass of the at least a portion of the object is:

$$\text{Mass} = \sum_1^n V_{bc}d_a + \sum_1^m V_p d_{ati},$$

where n is a number of cubes in the first set of cubes, $V_{bc}$ is a volume of a cube in the first set of cubes, $d_a$ is an average density of the cube in the first set of cubes, m is a number of cubes in the second set of cubes, $V_p$ is a volume of a portion of a cube in the second set of cubes contained within the surface, and $d_{ati}$ is an average density of the portion of the cube in the second set of cubes.

21. The non-transitory computer-readable medium of claim 20 wherein determining the intersection points comprises:

defining an initial representation of the surface in the image space;

refining the initial representation of the surface in the image space; and determining the intersection points of the refined representation of the surface with the cubes defining the image space.

22. The non-transitory computer-readable medium of claim 21 wherein refining the initial representation comprises deforming the initial representation.

23. A system, comprising:

a memory; and one or more processing devices configured to:

define an initial representation of a surface in an image space having cubes defining the image space, the surface representing a surface of an object; and deform the initial representation of the surface by iteratively applying local movement vectors to vertexes of a plurality of triangles defining the surface, wherein a local movement vector u of a vertex of a triangle is defined by:

$u=u_1+u_2+u_3$, where $u_1$ is a vector component representing local movement within the surface, $u_2$ is a vector component representing local movement along surface normal, and $u_3$ is a vector component representing local movement deforming the surface toward a surface of the segmented object.

24. The system of claim 23 wherein the one or more processing devices are configured to:

segment the object in the image space;

refine the initial representation to correspond to a segmented portion of the object; and apply a marching cubes algorithm to the refined representation.

25. A method, comprising:

defining an initial representation of a surface in an image space having cubes defining the image space, the surface representing a surface of an object; and deforming the initial representation of the surface by iteratively applying local movement vectors to vertexes of a plurality of triangles defining the surface, wherein a local movement vector u of a vertex of a triangle is defined by:

$u=u_1+u_2+u_3$, where $u_1$ is a vector component representing local movement within the surface, $u_2$ is a vector component representing local movement along surface normal, and $u_3$ is a vector component representing local movement deforming the surface toward a surface of the segmented object.

26. The method of claim 25 comprising:

segmenting the object in the image space;

refining the initial representation to correspond to a segmented portion of the object; and applying a marching cubes algorithm to the refined representation.

27. The method of claim 25 wherein the object is one of a human brain and a human femur.

28. A system, comprising:

means for defining an initial representation of a surface in an image space having cubes defining the image space, the surface representing a surface of an object;

means for iteratively applying local movement vectors to vertexes of a plurality of triangles defining the surface to produce a refined representation of the surface; and means for estimating a mass of the object based on the refined representation of the surface, wherein a local movement vector u of a vertex of a triangle is defined by:

$u=u_1+u_2+u_3$, where $u_1$ is a vector component representing local movement within the surface, $u_2$ is a vector component representing local movement along surface normal, and $u_3$ is a vector component representing local movement deforming the surface toward a surface of the segmented object.

* * * * *